United States Patent
Ono et al.

(10) Patent No.: US 10,078,247 B2
(45) Date of Patent: *Sep. 18, 2018

(54) LIQUID CRYSTAL DISPLAY

(71) Applicant: DIC CORPORATION, Tokyo (JP)

(72) Inventors: Yoshiyuki Ono, Kita-adachi-gun (JP); Jouji Kawamura, Kita-adachi-gun (JP); Yoshinori Iwashita, Kita-adachi-gun (JP); Hiroyuki Takeda, Sakura (JP)

(73) Assignee: DIC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/500,571

(22) PCT Filed: Aug. 1, 2014

(86) PCT No.: PCT/JP2014/070331
§ 371 (c)(1),
(2) Date: Jan. 31, 2017

(87) PCT Pub. No.: WO2016/017026
PCT Pub. Date: Feb. 4, 2016

(65) Prior Publication Data
US 2017/0219860 A1 Aug. 3, 2017

(51) Int. Cl.
| | |
|---|---|
| *G02F 1/1333* | (2006.01) |
| *G02F 1/1339* | (2006.01) |
| *C09K 19/10* | (2006.01) |
| *C09K 19/12* | (2006.01) |
| *C09K 19/30* | (2006.01) |
| *C09K 19/38* | (2006.01) |
| *C09K 19/54* | (2006.01) |
| *C09K 19/56* | (2006.01) |
| *G02F 1/13* | (2006.01) |
| *G02F 1/01* | (2006.01) |
| *G02F 1/1341* | (2006.01) |

(Continued)

(52) U.S. Cl.
CPC ............ *G02F 1/1339* (2013.01); *C09K 19/10* (2013.01); *C09K 19/12* (2013.01); *C09K 19/20* (2013.01); *C09K 19/30* (2013.01); *C09K 19/3066* (2013.01); *C09K 19/3402* (2013.01); *C09K 19/38* (2013.01); *C09K 19/54* (2013.01); *C09K 19/542* (2013.01); *C09K 19/56* (2013.01); *G02F 1/0107* (2013.01); *G02F 1/13* (2013.01); *G02F 1/1341* (2013.01); *G02F 1/161* (2013.01); *C09K 2019/0448* (2013.01); *C09K 2019/0466* (2013.01); *C09K 2019/122* (2013.01); *C09K 2019/123* (2013.01); *C09K 2019/124* (2013.01); *C09K 2019/301* (2013.01); *C09K 2019/3004* (2013.01); *C09K 2019/3009* (2013.01); *C09K 2019/3016* (2013.01); *C09K 2019/3019* (2013.01); *C09K 2019/3025* (2013.01); *C09K 2019/3422* (2013.01); *C09K 2019/521* (2013.01)

(58) Field of Classification Search
CPC ........ G02F 1/1333; G02F 1/1339; G02F 1/13; G02F 1/0107; G02F 1/1341; G02F 1/161; C09K 19/10; C09K 19/12; C09K 19/30; C09K 19/38; C09K 19/54; C09K 19/56; C09K 19/20; C09K 19/3066; C09K 19/3402; C09K 19/542; C09K 2019/0448; C09K 2019/0466; C09K 2019/122–2019/124; C09K 2019/3009; C09K 2019/301; C09K 2019/3016; C09K 2019/3019; C09K 2019/3025; C09K 2019/3422; C09K 2019/521
USPC .................................................... 252/299.63
See application file for complete search history.

(56) References Cited

U.S. PATENT DOCUMENTS

| | | | | |
|---|---|---|---|---|
| 8,980,384 B2 * | 3/2015 | Kawamura | ............ | C09K 19/20 252/299.61 |
| 9,200,202 B2 | 12/2015 | Kawamura | | |

(Continued)

FOREIGN PATENT DOCUMENTS

| | | | |
|---|---|---|---|
| JP | 200518022 A | 1/2005 | |
| JP | 2006-23582 A | 1/2006 | |

(Continued)

OTHER PUBLICATIONS

International Search Report dated Mar. 10, 2015, issued in counterpart International Application No. PCT/JP2014/070331 (2 pages).

(Continued)

*Primary Examiner* — Geraldina Visconti
(74) *Attorney, Agent, or Firm* — Westerman, Hattori, Daniels & Adrian, LLP

(57) ABSTRACT

The present invention relates to a liquid crystal display that incorporates a particular liquid crystal composition and a sealant in which a cured form of a particular curable resin composition is used. The present invention provides a liquid crystal display that prevents reduced voltage holding ratio (VHR) and increased ionic density (ID) in the liquid crystal layer and solves the problems of display defects such as voids, alignment irregularities, and image-sticking. Liquid crystal displays according to the present invention, featuring the ability to prevent reduced voltage holding ratio (VHR) in the liquid crystal layer and reduce the occurrence of display defects such as alignment irregularities and image-sticking, are useful particularly to liquid crystal displays in the IPS and FFS modes for active matrix drive and applicable to liquid crystal displays of equipment such as liquid crystal TVs, monitors, mobile phones, and smartphones.

17 Claims, 1 Drawing Sheet

(51) Int. Cl.
*G02F 1/161* (2006.01)
*C09K 19/20* (2006.01)
*C09K 19/34* (2006.01)
*C09K 19/04* (2006.01)
*C09K 19/52* (2006.01)

(56) References Cited

U.S. PATENT DOCUMENTS

| | | | |
|---|---|---|---|
| 9,624,433 B2* | 4/2017 | Ono | C09K 19/20 |
| 9,624,434 B2* | 4/2017 | Kawamura | C09K 19/42 |
| 2014/0231712 A1 | 8/2014 | Kawamura | |
| 2015/0028257 A1 | 1/2015 | Kawamura | |
| 2015/0299569 A1 | 10/2015 | Kawamura | |
| 2016/0244667 A1 | 8/2016 | Ono et al. | |

FOREIGN PATENT DOCUMENTS

| | | | |
|---|---|---|---|
| JP | 2008-116825 A | 5/2008 | |
| JP | 2009-175180 A | 8/2009 | |
| JP | 5282989 B1 | 9/2013 | |
| JP | 5311168 B1 | 10/2013 | |
| KR | 20090067159 A | 6/2009 | |
| TW | 201303440 A | 1/2013 | |
| WO | 2009/054276 A1 | 4/2009 | |
| WO | 2014/006767 A1 | 1/2014 | |
| WO | 2014/083636 A1 | 6/2014 | |
| WO | 2014/109266 A1 | 7/2014 | |

OTHER PUBLICATIONS

International Search Report dated Feb. 10, 2014, issued in International Application No. PCT/JP2013/080673.
Non-Final Office Action dated Sep. 9, 2016, issued in U.S. Appl. No. 14/442,198.
Notice of Allowance dated Feb. 16, 2017, issued in U.S. Appl. No. 14/442,198.

* cited by examiner

LIQUID CRYSTAL DISPLAY

TECHNICAL FIELD

The present invention relates to a liquid crystal display.

BACKGROUND ART

Liquid crystal displays have come to be in use in equipment including household electric appliances, measuring instruments, automotive panels, word processors, electronic organizers, printers, computers, and televisions as well as in clocks and calculators. Representative examples of types of liquid crystal display technologies include TN (twisted nematic), STN (super-twisted nematic), DS (dynamic scattering), GH (guest-host), IPS (in-plane switching), OCB (optically compensated bend), OCB (optically compensated birefringence), ECB (electrically controlled birefringence), VA (vertical alignment), CSH (color super-homeotropic), and FLC (ferroelectric liquid crystal). The current standard driving technique is multiplex driving, replacing the conventional static driving, and the mainstream is the simple matrix technology, or more recently the active matrix (AM) technology, which uses devices such as TFTs (thin-film transistors) and TFDs (thin-film diodes) to drive the display.

A commonly used method for the production of a liquid crystal display is a one-drop filling process in which a photocurable and thermosetting sealant is used. In this method, a rectangular seal pattern is first formed on one of two transparent substrates with electrodes using a dispenser or by screen-printing. Liquid crystal droplets are then applied to the entire inside of the frame on the transparent substrate with the sealant uncured, and the other transparent substrate is immediately bonded to the first one. The seal section is irradiated with ultraviolet radiation for precuring. The sealant is then heated during the annealing of liquid crystals for postcuring to complete the liquid crystal display. Bonding the substrates together under reduced pressure conditions leads to extremely efficient production of liquid crystal displays.

When a photocurable and thermosetting sealant is used for a small liquid crystal display panel, however, complicated metallic wiring or the black matrix overlaps with the pattern of the sealant, shielding the seal pattern from the light for precuring in some areas. In such a shielded area, the uncured sealant can elute into liquid crystals and contaminate them during the process from light irradiation to thermal curing. Liquid crystal panels in recent years tend to use liquid crystals with a low drive voltage requirement (low-voltage liquid crystals) because of reduced power consumption for applications such as mobile use. Owing to their especially high dielectric anisotropy, low-voltage liquid crystals are likely to entrap impurities such as residues in the sealant, e.g., an unreacted polymerization initiator and a cured initiator, chlorine and other ionic impurities, and a silane coupling agent, and this causes the problems of misalignment and a decrease in voltage holding ratio over time.

As a solution to this, a thermosetting sealant for one-drop filling has been proposed that requires no precuring through irradiation with light. Known thermosetting sealants, however, are made from resins that become less viscous when heated and thus still pose some problems such as partial deformation of the seal pattern and damage to the electrical characteristics of the liquid crystal display associated with the elution of ingredients of the sealant into liquid crystals.

Under these circumstances, a proposal has been made to use an epoxy resin with an increased softening point in a sealant to limit the elution of ingredients of the sealant into the liquid crystal material in order to avoid contamination of the liquid crystal material through contact between the liquid crystal material and uncured sealant and reduce color irregularities (PTL 1).

In general, epoxy resins feature high adhesive strength but on the other hand are very liable to contaminate liquid crystal materials. A possible way of reducing the contamination of a liquid crystal material is acrylic modification, and this is expected to reduce the contamination of the liquid crystal material while improving adhesive strength. In some cases, however, acrylic modification has affected thermosetting properties and resulted in contamination of the liquid crystal material by eluted ingredients of the sealant. Another proposal has been made as a solution to this, which suggests that a tertiary amine such as imidazole be added for curing the acrylic component and in order for the acrylic resin to be thermally cured through the interaction between the amine and a small amount of epoxy resin that coexists with the amine (PTL 2).

Furthermore, known thermosetting curable sealants, made from resins that become less viscous when heated, still pose some problems such as partial deformation of the seal pattern and leakage of liquid crystals breaking through the seal pattern. As a solution to this, a composition with improved curability and preserved adhesion to substrates has been proposed (PTL 3).

All of these proposals, however, assume commonly used liquid crystal materials and focus only on sealant composition. These are attempts to avoid issues by finding a new sealant composition and do not necessarily provide satisfactory display characteristics when applied to specific liquid crystal displays. In particular, the phenomenon of image-sticking to a liquid crystal display has not been sufficiently improved.

CITATION LIST

Patent Literature

PTL 1: Japanese Unexamined Patent Application Publication No. 2006-23582

PTL 2: Japanese Unexamined Patent Application Publication No. 2008-116825

PTL 3: Japanese Unexamined Patent Application Publication No. 2009-175180

SUMMARY OF INVENTION

Technical Problem

The present invention focuses on the interactions between the composition of a liquid crystal material and a sealant, which has not hitherto been given full attention, and proposes a combination of liquid crystal and sealant compositions that improves the characteristics of liquid crystal displays such as image-sticking.

More specifically, the present invention provides a liquid crystal display in which a particular liquid crystal composition and a cured form of a particular curable resin composition are used as sealants to prevent decreases in the voltage holding ratio (VHR) of the liquid crystal layer and solve the problems of display defects such as voids, alignment irregularities, and image-sticking while giving the liquid crystal display a practical temperature range of the liquid crystal phase, a large absolute dielectric anisotropy (Δε), low viscosity, and a moderate refractive index anisotropy (Δn).

Solution to Problem

To solve this problem, the inventors conducted extensive research on combinations of a curable resin composition as a component of a sealant and the structure of a liquid crystal material as a component of a liquid crystal layer. After finding that a liquid crystal display that incorporates a particular structure of a liquid crystal material and a sealant in which a cured form of a particular curable resin composition is used prevents reduced voltage holding ratio (VHR) and increased ionic density (ID) in the liquid crystal layer and solves the problems of display defects such as voids, alignment irregularities, and image-sticking, the inventors completed the present invention.

The present invention therefore provides:

a liquid crystal display that includes a first substrate, a second substrate, a liquid crystal layer sandwiched between the first and second substrates and containing a liquid crystal composition, and a sealant joining the first and second substrates together using a cured form of a curable resin composition that cures when heated. The liquid crystal composition contains one or two or more compounds represented by general formula (I):

[Chem. 1]

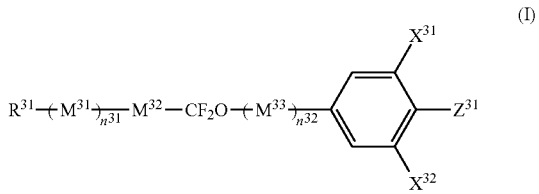

(I)

(where $R^{31}$ designates an alkyl or alkoxy group having one to ten carbon atoms or an alkenyl or alkenyloxy group having two to ten carbon atoms, $M^{31}$ to $M^{33}$ independently of one another designate trans-1,4-cyclohexylene or 1,4-phenylene, wherein one or two —$CH_2$-s in the trans-1,4-cyclohexilene are optionally substituted with an —O— unless an oxygen atom is directly next to another and wherein one or two hydrogen atoms in the phenylene are optionally substituted with fluorine, $X^{31}$ and $X^{32}$ independently of each other designate hydrogen or fluorine, $Z^{31}$ designates fluorine, trifluoromethoxy, or trifluoromethyl, $n^{31}$ and $n^{32}$ independently of each other designate 0, 1, or 2, $n^{31}+n^{32}$ designates 0, 1, or 2, and if there are a plurality of $M^{31}$s or $M^{33}$s, the $M^{31}$s or $M^{33}$s may be the same or different). The liquid crystal composition also contains one or two or more compounds selected from the group consisting of compounds represented by general formulae (II-a) to (II-f):

[Chem. 2]

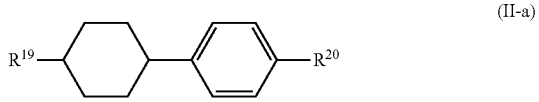

(II-a)

(II-b)

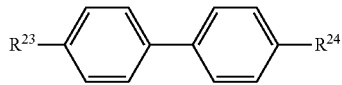

(II-c)

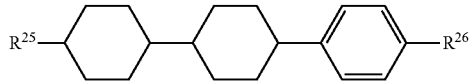

(II-d)

(II-e)

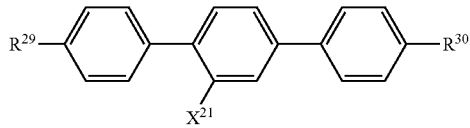

(II-f)

(where $R^{19}$ to $R^{30}$ independently of one another designate an alkyl group having one to ten carbon atoms, an alkoxy group having one to ten carbon atoms, or an alkenyl group having two to ten carbon atoms, and $X^{21}$ designates hydrogen or fluorine).

The curable resin composition contains a compound that has at least one epoxy group per molecule and a weight average molecular weight of 300 to 10000.

Advantageous Effects of Invention

A liquid crystal display according to the present invention, which incorporates a particular liquid crystal composition and a sealant based on a cured form of a particular curable resin composition, has a practical temperature range of the liquid crystal phase, a large absolute dielectric anisotropy (Δε), low viscosity, and a moderate refractive index anisotropy (Δn), experiences only limited decreases in the voltage holding ratio (VHR) of the liquid crystal layer, and is not prone to display defects such as voids, alignment irregularities, and image-sticking.

REFERENCE SIGNS LIST

1 . . . Substrate
2 . . . Sealant
3 . . . Liquid crystals
4 . . . Driver
5 . . . Wires from pixel electrodes
6 . . . Overcoat layer
7 . . . Pixel electrodes or wiring
8 . . . Alignment layer

DESCRIPTION OF EMBODIMENTS

Figure 1:
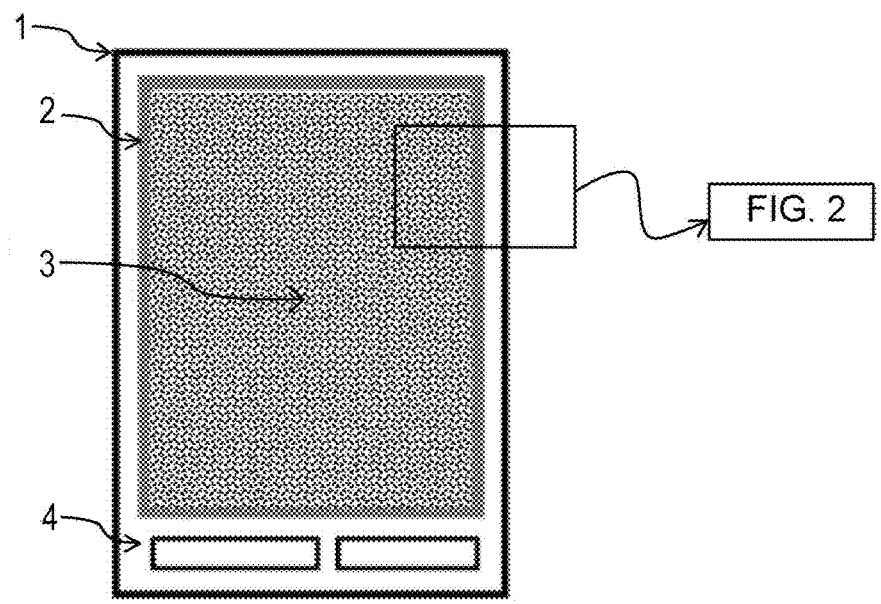
FIG. 1 is a plan view of a liquid crystal display according to the present invention.
Figure 2:
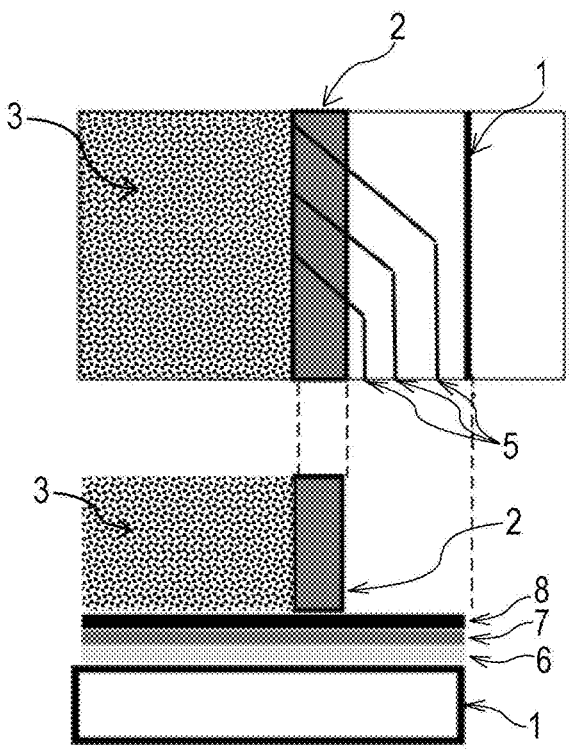
FIG. 2 is an enlarged view of a liquid crystal display according to the present invention.

FIG. 1 is a plan view of a liquid crystal display according to the present invention. The details including pixel electrodes, TFTs, and wiring are omitted. The upper half of FIG. 2 is a partial view in which part of the above plan view is enlarged. The diagram illustrates wires extending from pixel electrodes to drivers under a sealant. The lower half of FIG. 2 is a cross-sectional view of the upper half of FIG. 2. The sealant is in contact with liquid crystals and an alignment layer. The drawing does not illustrate all cases; depending on the position of the sealant, the sealant or liquid crystals may be in contact with an overcoat layer.

(Liquid Crystal Layer)

The liquid crystal layer of a liquid crystal display according to the present invention is made from a liquid crystal composition that contains one or two or more compounds represented by general formula (I):

[Chem. 3]

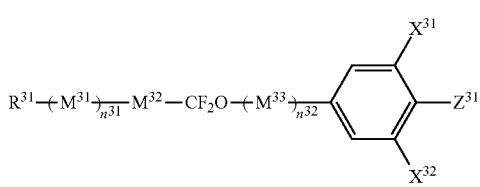

(I)

(where $R^{31}$ designates an alkyl group having one to ten carbon atoms, an alkoxy group having one to ten carbon atoms, an alkenyl group having two to ten carbon atoms, or an alkenyloxy group having two to ten carbon atoms, $M^{31}$ to $M^{33}$ independently of one another designate trans-1,4-cyclohexylene or 1,4-phenylene, wherein one or two —CH$_2$-s in the trans-1,4-cyclohexylene group are optionally substituted with an —O— unless an oxygen atom is directly next to another and wherein one or two hydrogen atoms in the phenylene group are optionally substituted with fluorine, $X^{31}$ and $X^{32}$ independently of each other designate hydrogen or fluorine, $Z^{31}$ designates fluorine, trifluoromethoxy, or trifluoromethyl, $n^{31}$ and $n^{32}$ independently of each other designate 0, 1, or 2, $n^{31}+n^{32}$ designates 0, 1, or 2, and if there are a plurality of $M^{31}$s or $M^{33}$s, the $M^{33}$s, or $M^{31}$s or $M^{33}$s may be the same or different). The liquid crystal composition also contains one or two or more compounds selected from the group consisting of compounds represented by general formulae (II-a) to (II-f):

[Chem. 4]

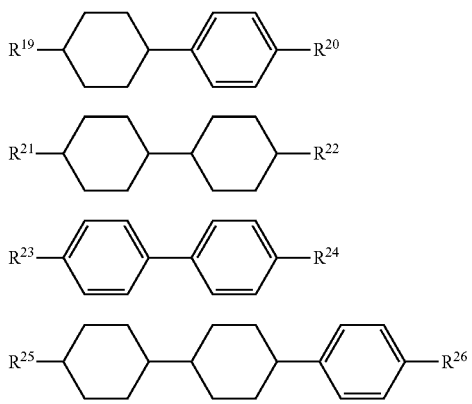

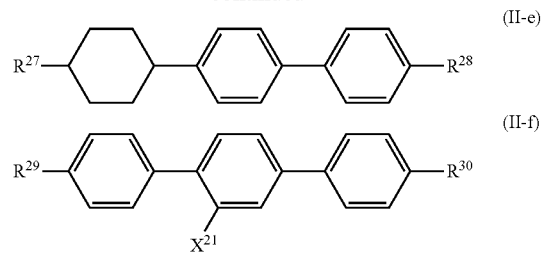

(where $R^{19}$ to $R^{30}$ independently of one another designate an alkyl group having one to ten carbon atoms, an alkoxy group having one to ten carbon atoms, or an alkenyl group having two to ten carbon atoms, and $X^{21}$ designates hydrogen or fluorine).

In general formula (I), preferred options for $R^{31}$ are linear alkyl groups having one to five carbon atoms, linear alkoxy groups having one to four (or more) carbon atoms, and alkenyl groups having four or five carbon atoms if the ring structure it binds to is a phenyl group (an aromatic), or linear alkyl groups having one to five carbon atoms, linear alkoxy groups having one to four (or more) carbon atoms, linear alkenyl groups having two to five carbon atoms if the ring structure it binds to is a saturated ring structure, such as cyclohexane, pyran, or dioxane.

If priority is given to good chemical stability against heat and light, alkyl is preferred for $R^{32}$. If priority is given to the production of a liquid crystal display with small viscosity and quick response, alkenyl is preferred for $R^{31}$. If the viscosity is small, the nematic-isotropic phase transition temperature (Tni) is high, and the purpose is to further reduce the response time, it is preferred to use an alkenyl group with a non-unsaturated terminal bond, in particular an alkenyl group with a terminal methyl group next to it. If priority is given to good dissolution at low temperatures, one preferred solution is to make $R^{31}$ alkoxy. Another preferred solution is to use different $R^{31}$s in combination. For example, it is preferred to use compounds that have alkyl or alkenyl groups having two, three, and four carbon atoms as $R^{31}$s, to use compounds having three and five carbon atoms, and to use compounds having three, four, and five carbon atoms.

For $M^{31}$ to $M^{33}$:

[Chem. 5]

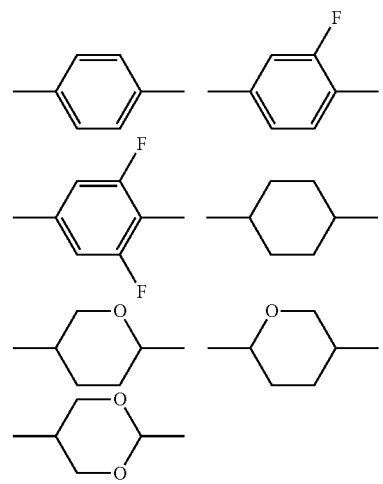

The above are preferred.

For M³¹:

[Chem. 6]

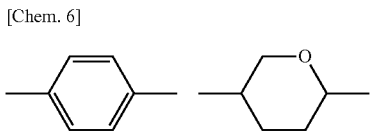

The above are preferred.

[Chem. 7]

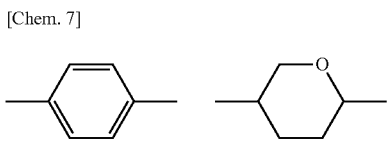

The above are more preferred.
For M³²:

[Chem. 8]

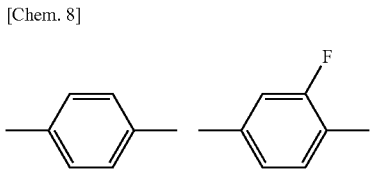

The above are preferred.

[Chem. 9]

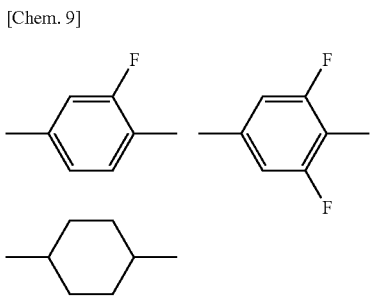

The above are more preferred.

[Chem. 10]

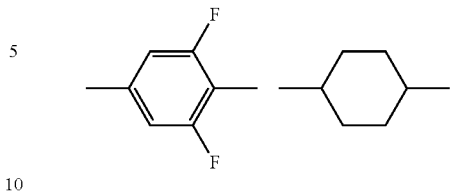

The above are even more preferred.
For M³³:

[Chem. 11]

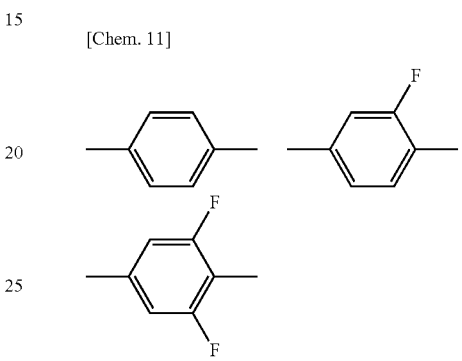

The above are preferred.

[Chem. 12]

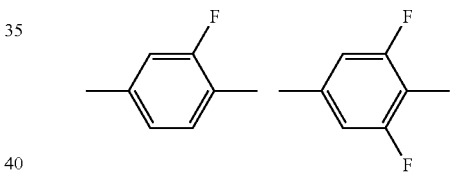

The above are more preferred.

[Chem. 13]

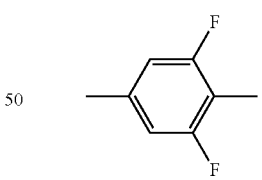

The above is even more preferred.

For $X^{31}$ and $X^{32}$, it is preferred that at least one of them, more preferably both, be fluorine.

$Z^{31}$ is preferably fluorine or trifluoromethoxy.

As for the combination of $X^{31}$, $X^{32}$, and $Z^{31}$, $X^{31}$=F, $X^{32}$=F, and $Z^{31}$=F in an embodiment. In another embodiment, $X^{31}$=F, $X^{31}$=H, and $Z^{31}$=F. In yet another embodiment, $X^{31}$=F, $X^{32}$=H, and $Z^{31}$=OCF$_3$. In yet another embodiment, $X^{31}$=F, $X^{32}$=F, and $Z^{31}$=OCF$_3$. In yet another embodiment, $X^{31}$=H, $X^{32}$=H, and $Z^{31}$=OCF$_3$.

$n^{31}$ is preferably 1 or 2. $n^{32}$ is preferably 0 or 1, more preferably 0. $n^{31}$+$n^{32}$ is preferably 1 or 2, more preferably 2.

More specifically, a compound represented by general formula (I) is preferably a compound represented by any of general formulae (I-a) to (I-f) below.

[Chem. 14]

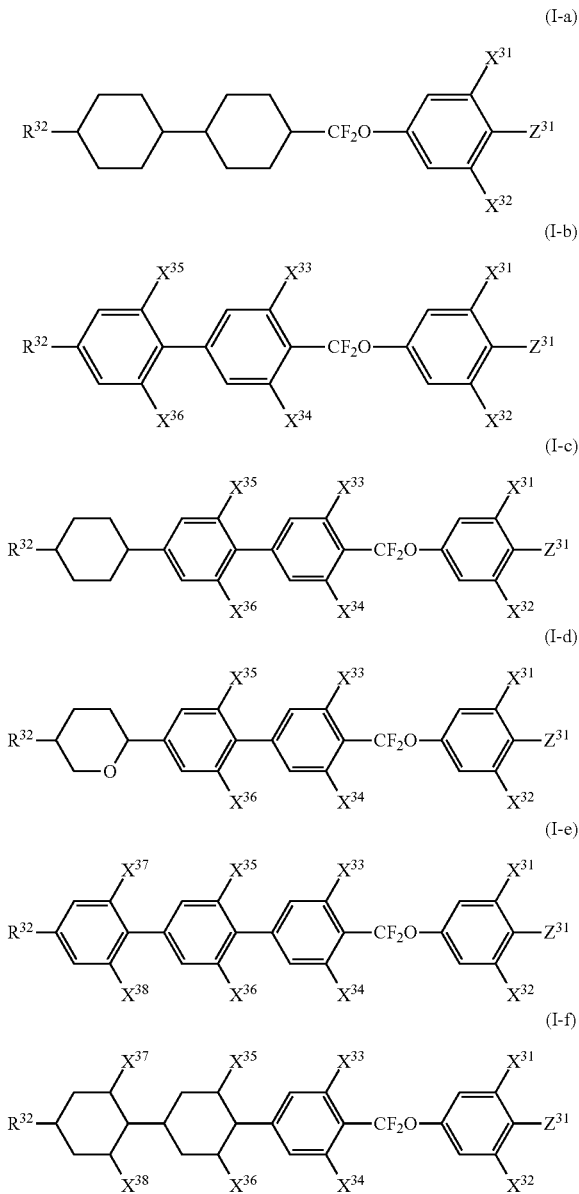

(where $R^{32}$ designates an alkyl group having one to ten carbon atoms, an alkoxy group having one to ten carbon atoms, an alkenyl group having two to ten carbon atoms, or an alkenyloxy group having two to ten carbon atoms, $X^{31}$ to $X^{38}$ independently of one another designated hydrogen or fluorine, and $Z^{31}$ designates fluorine, trifluoromethoxy, or trifluoromethyl).

In general formulae (Ia) to (If), preferred options for $R^{32}$ are linear alkyl groups having one to five carbon atoms, linear alkoxy groups having one to four (or more) carbon atoms, and alkenyl groups having four or five carbon atoms if the ring structure it binds to is a phenyl group (an aromatic), or linear alkyl groups having one to five carbon atoms, linear alkoxy groups having one to four (or more) carbon atoms, and linear alkenyl groups having two to five carbon atoms if the ring structure it binds to is a saturated ring structure, such as cyclohexane, pyran, or dioxane.

If priority is given to good chemical stability against heat and light, alkyl is preferred for $R^{31}$. If priority is given to the production of a liquid crystal display with small viscosity and quick response, alkenyl is preferred for $R^{31}$. If the viscosity is small, the nematic-isotropic phase transition temperature (Tni) is high, and the purpose is to further reduce the response time, it is preferred to use an alkenyl group with a non-unsaturated terminal bond, in particular an alkenyl group with a terminal methyl group next to it. If priority is given to good dissolution at low temperatures, one preferred solution is to make $R^{31}$ alkoxy. Another preferred solution is to use different $R^{31}$s in combination. For example, it is preferred to use compounds that have alkyl or alkenyl groups having two, three, and four carbon atoms as $R^{31}$s, to use compounds having three and five carbon atoms, and to use compounds having three, four, and five carbon atoms.

For $X^{31}$ and $X^{32}$, it is preferred that at least one of them, more preferably both, be fluorine.

$Z^{31}$ is preferably fluorine or trifluoromethoxy.

As for the combination of $X^{31}$, $X^{32}$, and $Z^{31}$, $X^{31}$=F, $X^{32}$=F, and $Z^{32}$=F in an embodiment. In another embodiment, $X^{31}$=F, $X^{32}$=H, and $Z^{31}$=F. In yet another embodiment, $X^{31}$=F, $X^{32}$=H, and $Z^{31}$=OCF$_3$. In yet another embodiment, $X^{31}$=F, $X^{32}$=F, and $Z^{31}$=OCF$_3$. In yet another embodiment, $X^{31}$=H, $X^{32}$=H, and $Z^{31}$=OCF$_3$.

$n^{31}$ is preferably 1 or 2. $n^{32}$ is preferably 0 or 1, more preferably 0. $n^{31}+n^{32}$ is preferably 1 or 2, more preferably 2.

For $X^{33}$ and $X^{34}$, it is preferred that at least one of them, more preferably both, be fluorine.

For $X^{35}$ and $X^{36}$, it is preferred that at least one of them be fluorine. Making both of them fluorine is effective when increasing Δε, but is unfavorable with respect to Tni, solubility at low temperatures, and chemical stability in the finished liquid crystal display.

For $X^{37}$ and $X^{38}$, it is preferred that at least one of them, preferably both, be hydrogen. Making one or both of $X^{37}$ and $X^{38}$ fluorine is unfavorable with respect to Tni, solubility at low temperatures, and chemical stability in the finished liquid crystal display.

The liquid crystal composition preferably contains one to eight, in particular one to five, compounds represented by general formula (I). The amount of such a compound or compounds in the liquid crystal composition is preferably from 3% to 50% by mass, more preferably from 5% to 40% by mass.

In general formulae (IIa) to (IIf), preferred options for $R^{19}$ to $R^{30}$ are linear alkyl groups having one to five carbon atoms, linear alkoxy groups having one to four (or more) carbon atoms, and alkenyl groups having four or five carbon atoms if the ring structure they bind to is a phenyl group (an aromatic), or linear alkyl groups having one to five carbon atoms, linear alkoxy groups having one to four (or more) carbon atoms, and linear alkenyl groups having two to five carbon atoms if the ring structure they bind to is a saturated ring structure, such as cyclohexane, pyran, or dioxane.

If priority is given to good chemical stability against heat and light, alkyl is for $R^{19}$ to $R^{30}$. If priority is given to the production of a liquid crystal display with small viscosity and quick response, alkenyl is preferred for $R^{19}$ to $R^{30}$. If the viscosity is small, the nematic-isotropic phase transition temperature (Tni) is high, and the purpose is to further reduce the response time, it is preferred to use an alkenyl group with a non-unsaturated terminal bond, in particular an alkenyl group with a terminal methyl group next to it. If priority is given to good dissolution at low temperatures, one preferred solution is to make $R^{19}$ to $R^{30}$ alkoxy. Another preferred solution is to use different $R^{19}$ to $R^{30}$ in combination. For example, it is preferred to use compounds that have alkyl or alkenyl groups having two, three, and four carbon atoms as $R^{19}$ to $R^{30}$, to use compounds having three and five carbon atoms, and to use compounds having three, four, and five carbon atoms.

$R^{19}$ and $R^{20}$ are preferably alkyl or alkoxy, and it is preferred that at least one of them be alkoxy. More preferably, $R^{19}$ is alkyl, and $R^{20}$ is alkoxy. It is even more preferred that $R^{19}$ be an alkyl group having three to five carbon atoms and that $R^{20}$ be an alkoxy group having one or two carbon atoms.

$R^{21}$ and $R^{22}$ are preferably alkyl or alkenyl, and it is preferred that at least one of them be alkenyl. Making both of them alkenyl is preferred when quickening response, but is unfavorable when good chemical stability of the liquid crystal display is wanted.

It is preferred that at least one of $R^{23}$ and $R^{24}$ be an alkyl group having one to five carbon atoms, an alkoxy group having one to five carbon atoms, or an alkenyl group having four or five carbon atoms. For good balance between response and Tni, it is preferred that at least one of $R^{21}$ and $R^{24}$ be alkenyl. For good balance between response and solubility at low temperatures, it is preferred that at least one of $R^{23}$ and $R^{24}$ be alkoxy.

It is preferred that at least one of $R^{25}$ and $R^{26}$ be an alkyl group having one to five carbon atoms, an alkoxy group having one to five carbon atoms, or an alkenyl group having two to five carbon atoms. For good balance between response and Tni, it is preferred that at least one of $R^{25}$ and $R^{26}$ be alkenyl. For good balance between response and solubility at low temperatures, it is preferred that at least one of $R^{25}$ and $R^{26}$ be alkoxy. More preferably, $R^{25}$ is alkenyl, and $R^{26}$ is alkyl. It is also preferred that $R^{25}$ be alkyl and that $R^{26}$ be alkoxy.

It is preferred that at least one of $R^{27}$ and $R^{28}$ be an alkyl group having one to five carbon atoms, an alkoxy group having one to five carbon atoms, or an alkenyl group having two to five carbon atoms. For good balance between response and Tni, it is preferred that at least one of $R^{27}$ and $R^{28}$ be alkenyl. For good balance between response and solubility at low temperatures, it is preferred that at least one of $R^{27}$ and $R^{28}$ be alkoxy. More preferably, $R^{27}$ is alkyl or alkenyl, and $R^{28}$ is alkyl. It is also preferred that $R^{27}$ be alkyl and that $R^{28}$ be alkoxy. It is particularly preferred that $R^{27}$ be alkyl and that $R^{28}$ be alkyl.

$X^{21}$ is preferably fluorine.

It is preferred that at least one of $R^{29}$ and $R^{30}$ be an alkyl group having one to five carbon atoms or an alkenyl group having four or five carbon atoms. For good balance between response and Tni, it is preferred that at least one of $R^{29}$ and $R^{30}$ be alkenyl. For good reliability, it is preferred that at least one of $R^{29}$ and $R^{30}$ be alkyl. More preferably, $R^{29}$ is alkyl or alkenyl, and $R^{30}$ is alkyl or alkenyl. It is also preferred that $R^{29}$ be alkyl and that $R^{30}$ be alkenyl. It is also preferred that $R^{29}$ be alkyl and that $R^{30}$ be alkyl.

The liquid crystal composition preferably contains one to ten, in particular one to eight, compounds represented by general formulae (II-a) to (II-f). The amount of such a compound or compounds in the liquid crystal composition is preferably from 5% to 80% by mass, more preferably from 10% to 70% by mass, in particular from 20% to 60% by mass.

The liquid crystal composition layer of a liquid crystal display according to the present invention may contain one or two or more compounds selected from the group of compounds represented by general formulae (III-a) to (III-f):

[Chem. 15]

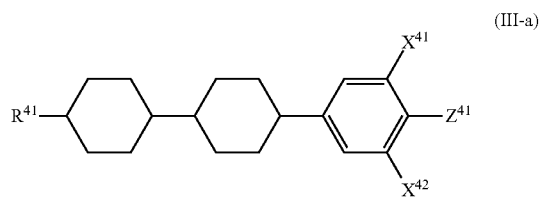
(III-a)

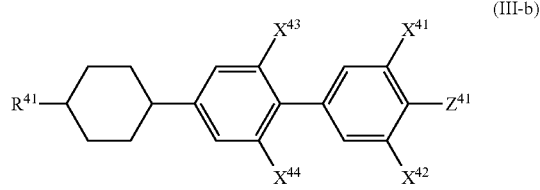
(III-b)

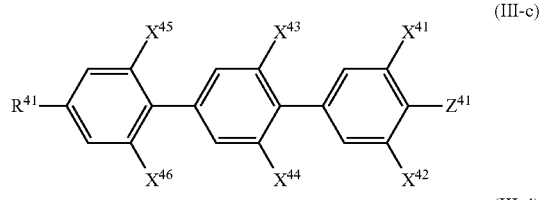
(III-c)

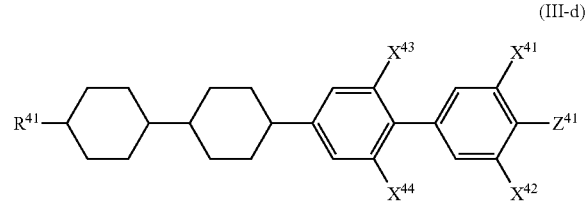
(III-d)

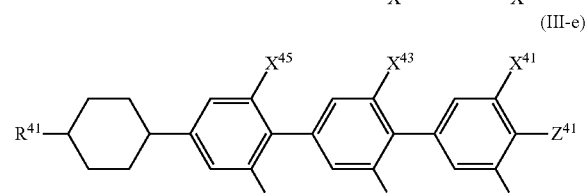
(III-e)

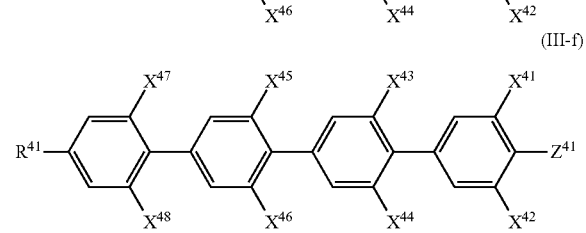
(III-f)

(where $R^{41}$ designates an alkyl group having one to ten carbon atoms, an alkoxy group having one to ten carbon atoms, an alkenyl group having two to ten carbon atoms, or an alkenyloxy group having two to ten carbon atoms, $X^{41}$ to $X^{40}$ independently of one another designate hydrogen or fluorine, and $Z^{41}$ designates fluorine, trifluoromethoxy, or trifluoromethyl).

In general formulae (IIIa) to (IIIf), preferred options for $R^{41}$ are linear alkyl groups having one to five carbon atoms, linear alkoxy groups having one to four (or more) carbon atoms, and alkenyl groups having four or five carbon atoms if the ring structure it binds to is a phenyl group (an aromatic), or linear alkyl groups having one to five carbon atoms, linear alkoxy groups having one to four (or more) carbon atoms, linear alkenyl groups having two to five carbon atoms if the ring structure it binds to is a saturated ring structure, such as cyclohexane, pyran, or dioxane.

If priority is given to good chemical stability against heat and light, alkyl is preferred for $R^{41}$. If priority is given to the production of a liquid crystal display with small viscosity and quick response, alkenyl is preferred for $R^{41}$. If the viscosity is small, the nematic-isotropic phase transition temperature (Tni) is high, and the purpose is to further reduce the response time, it is preferred to use an alkenyl group with a non-unsaturated terminal bond, in particular an alkenyl group with a terminal methyl group next to it. If priority is given to good dissolution at low temperatures, one preferred solution is to make $R^{41}$ alkoxy. Another preferred solution is to use different $R^{41}$s in combination. For example, it is preferred to use compounds that have alkyl or alkenyl groups having two, three, and four carbon atoms as $R^{41}$s, to use compounds having three and five carbon atoms, and to use compounds having three, four, and five carbon atoms.

For $X^{41}$ and $X^{42}$, it is preferred that at least one of them, more preferably both, be fluorine.

$Z^{41}$ is preferably fluorine or trifluoromethoxy.

As for the combination of $X^{41}$, $X^{42}$, and $Z^{41}$, $X^{41}$=F, $X^{42}$=F, and $Z^{41}$=F in an embodiment. In another embodiment, $X^{41}$=F, $X^{42}$=H, and $Z^{41}$=F. In yet another embodiment, $X^{41}$=F, $X^{42}$=H, and $Z^{41}$=OCF$_3$. In yet another embodiment, $X^{41}$=F, $X^{42}$=F, and $Z^{41}$=OCF$_3$. In yet another embodiment, $X^{41}$=H, $X^{42}$=H, and $Z^{41}$=OCF$_3$.

For $X^{43}$ and $X^{44}$, it is preferred that at least one of them be fluorine. Making both of them fluorine is preferred in order to obtain a large Δε, but is rather unfavorable when achieving good solubility at low temperatures.

For $X^{45}$ and $X^{46}$, it is preferred that at least one of them, preferably both, be hydrogen. The use of much fluorine is unfavorable with respect to Tni, solubility at low temperatures, and chemical stability in the finished liquid crystal display.

For $X^{47}$ and $X^{4.4}$, it is preferred that at least one of them, preferably both, be hydrogen. Making one or both of $X^{47}$ and $X^{48}$ fluorine is unfavorable with respect to Tni, solubility at low temperatures, and chemical stability in the finished liquid crystal display.

The liquid crystal composition preferably contains one to ten, in particular one to eight, compounds represented by general formulae (III-a) to (III-f). The amount of such a compound or compounds in the liquid crystal composition is preferably from 5% to 50% by mass, more preferably from 10% to 40% by mass.

The liquid crystal composition in the liquid crystal composition layer of a liquid crystal display according to the present invention preferably has a Δε at 25° C. of 4-1.5 or more. For quick response, it is preferred that the Δε at 25° C. be from +1.5 to +4.0, more preferably from +1.5 to +3.0. For low-voltage driving, it is preferred that the Δε at 25° C. be from +8.0 to +18.0, more preferably from +10.0 to +15.0. It is preferred that the Δn at 25° C. be from 0.08 to 0.14, more preferably from 0.09 to 0.13. More specifically, to support a thin cell gap, it is preferred that the Δn at 25° C. be from 0.10 to 0.13, and to support a thick cell gap, it is preferred that the Δn at 25° C. be from 0.08 to 0.10. It is preferred that the η at 20° C. is preferably from 5 to 45 mPa·s, more preferably from 5 to 25 mPa·s, in particular from 10 to 20 mPa·s. The $T_{n1}$ at 20° C. is preferably from 60° C. to 120° C., more preferably from 70° C. to 100° C., in particular from 70° C. to 85° C.

In addition to these compounds, a liquid crystal composition according to the present invention may contain ordinary nematic liquid crystals, smectic liquid crystals, cholesteric liquid crystals, and so forth.

A liquid crystal composition according to the present invention may contain one or two or more polymerizable compounds for the production of liquid crystal displays in a mode such as PS, in-plane PSA, or in-plane PSVA. Examples of polymerizable compounds that can be used include photopolymerizable monomers, which polymerize in response to light or any other kind of radiation, and examples of their structures include polymerizable compounds that have a liquid crystal backbone formed as a series of multiple six-member rings such as biphenyl derivatives and terphenyl derivatives. More specifically, bifunctional monomers represented by general formula (V) are preferred:

[Cheem. 16]

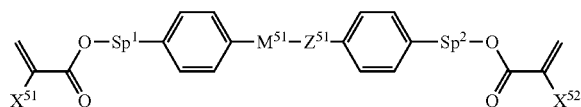

(V)

(where $X^{51}$ and $X^{52}$ each independently designate hydrogen or methyl, Sp$^1$ and Sp$^2$ each independently designate a single bond, an alkylene group having one to eight carbon atoms, or —O—(CH$_2$)$_s$— (where s designates an integer of 2 to 7, and the oxygen binds to the aromatic ring), $Z^{51}$ designates —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$OCO—, —COO—CH$_2$—, —OCO—CH$_2$—, —CH$_2$—COO—, —CH$_2$—OCO—, —CY$^1$=CY$^2$— (where Y$^1$ and Y$^2$ each independently designate fluorine or hydrogen), —C≡C—, or a single bond, M$^{51}$ designates 1,4-phenylene, trans-1,4-cyclohexylene, or a single bond, and for all 1,4-phenylene groups in the formula, any hydrogen atom may be substituted with fluorine).

For $X^{51}$ and $X^{52}$, diacrylate derivatives, in which both designate hydrogen, and dimethacrylate derivatives, in which both have methyl, are both preferred. Compounds in which one designates hydrogen and the other designates methyl are also preferred. For the rate of polymerization of these compounds, diacrylate derivatives are the fastest, dimethacrylate derivatives are the slowest, and asymmetric compounds are intermediate; a preferred form can be used according to the purpose of use. For PSA displays, dimethacrylate derivatives are particularly preferred.

Sp$^1$ and Sp$^2$ each independently designate a single bond, an alkylene group having one to eight carbon atoms, or —O—(CH$_2$)$_a$—. For PSA displays, it is preferred that at least one be a single bond, preferably the compound being one in which both designate a single bond or in a form in which one designates a single bond and the other designates an alkylene group having one to eight carbon atoms or —O—(CH$_2$)$_a$—. In the latter case, alkyl groups of one to four are preferred, and s is preferably 1 to 4.

$Z^{51}$ is preferably —OCH$_2$—, —CH$_2$O—, —COO—, —OCO—, —CF$_2$O—, —OCF$_2$—, —CH$_2$CH$_2$—

—CF$_2$CF$_2$—, or a single bond, more preferably —COO—, —OCO—, or a single bond, in particular a single bond.

M$^{51}$, which designates a 1,4-phenylene group in which any hydrogen atom may be substituted with fluorine, trans-1,4-cyclohexylene, or a single bond, is preferably 1,4-phenylene or a single bond. When C designates a ring structure and does not a single bond, linking groups other than a single bond are also preferred for Z$^{51}$, and when M$^{51}$ is a single bond, it is preferred that Z$^{51}$ be a single bond.

In light of these points, the following are specific examples of preferred structures for the ring structure located between Sp$^1$ and Sp$^2$ in general formula (V).

When the ring structure in general formula (V) is formed by two rings with M$^{51}$ designating a single bond, it is preferred that the ring structure represent any of formulae (Va-1) to (Va-5) below, more preferably any of formulae (Va-1) to (Va-3), in particular formula (Va-1):

[Chem. 17]

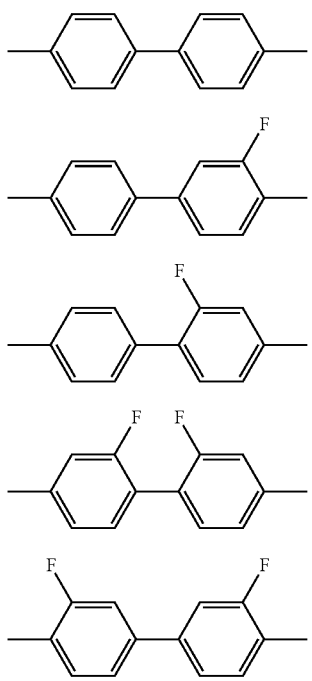

(where either end binds to Sp$^1$ or Sp$^2$).

Polymerizable compounds including these backbones, which provide an anchoring strength ideal for PSA liquid crystal displays after polymerization and ensure good alignment, limit or completely prevent display irregularities.

Particularly preferred polymerizable compounds are therefore general formulae (V-1) to (V-4), with the most preferred of these being general formula (V-2):

[Chem. 18]

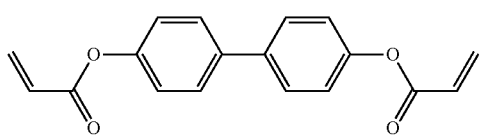

(V-1)

-continued

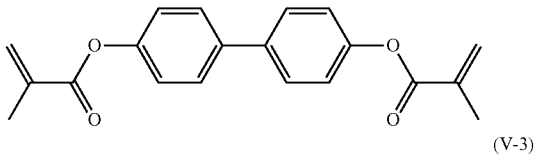

(V-2)

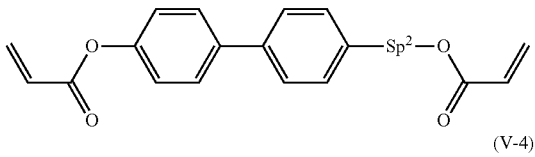

(V-3)

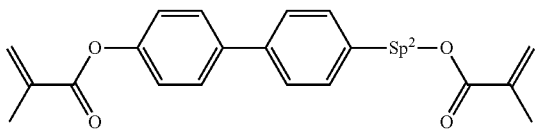

(V-4)

(where Sp$^2$ designates an alkylene group having two to five carbon atoms).

When a polymerizable compound is added to a liquid crystal composition according to the present invention, it polymerizes even without a polymerization initiator, but a polymerization initiator may be contained to promote polymerization. Examples of polymerization initiators include benzoin ethers, benzophenones, acetophenones, benzyl ketals, and acylphosphine oxides.

A liquid crystal composition according to the present invention with a polymerizable compound therein, which acquires the potential to align liquid crystals when the polymerizable compound it contains is polymerized through ultraviolet irradiation, is used in liquid crystal displays that use birefringence of the liquid crystal composition to control the transmission of light. Such a liquid crystal composition has use in AM-LCDs (active-matrix liquid crystal displays), TN (nematic liquid crystal displays), STN-LCDs (super-twisted nematic liquid crystal displays), OCB-LCDs, and IPS-LCDs (in-plane switching liquid crystal displays), in particular AM-LCDs, and can be applied to transmissive or reflective liquid crystal displays.

(Sealant)

The sealant in a liquid crystal display according to the present invention is a cured form of a curable resin composition that contains a compound that has at least one epoxy group per molecule and a weight average molecular weight of 300 to 10000.

The compound that has at least one epoxy group per molecule is, for example, a novolac or bisphenol epoxy resin. To be specific, compounds such as biphenyl, naphthalene, tris(hydroxyphenyl)alkyl, and tetrakis(hydroxyphenyl)alkyl epoxy resins are preferred. More specific examples include bisphenol A, bisphenol E, bisphenol F, bisphenol S, 2,2'-diallyl bisphenol A, hydrogenated bisphenol, polyoxypropylene bisphenol A, propoxylated bisphenol A, resorcinol, biphenyl, sulfide, diphenyl ether, dicyclopentadiene, naphthalene, phenol novolac, cresol novolac, trisphenol novolac, dicyclopentadiene novolac, biphenyl novolac, naphthalene phenol novolac, glycidyl amine, alkylpolyol, and rubber-modified epoxy resins, glycidyl ester compounds, and bisphenol A episulfide resins. Particularly preferred are bisphenol A, bisphenol E, bisphenol F, resorcinol, phenol novolac, and diphenyl ether epoxy resins.

Examples of commercially available epoxy compounds of these types include bisphenol A epoxy resins such as jER828EL and jER1004 (both available from Mitsubishi Chemical) and EPICLON 850-S (DIC), bisphenol F epoxy resins such as jER806 and jER4004 (both available from Mitsubishi Chemical), bisphenol E epoxy resins such as R-710, bisphenol S epoxy resins such as EPICLON EXA1514 (DIC), 2,2'-diallyl bisphenol A epoxy resins such as RE-810NM (Nippon Kayaku), hydrogenated bisphenol epoxy resins such as EPICLON EXA7015 (DIC), propoxylated bisphenol A epoxy resins such as EP-4000S (ADEKA), resorcinol epoxy resins such as EX-201 (Nagase ChemteX), biphenyl epoxy resins such as jERYX-4000H (Mitsubishi Chemical), sulfide epoxy resins such as YSLV-50TE (Nippon Steel Chemical), biphenyl ether epoxy resins such as YSLV-80DE (Nippon Steel Chemical), dicyclopentadiene epoxy resins such as EP-4088S (ADEKA), naphthalene epoxy resins such as EPICLON HP4032 and EPICLON EXA-4700 (both available from DIC), phenol novolac epoxy resins such as EPICLON N-740, EPICLON N-770, and EPICLON N-775 (DIC) and jER152 and jER154 (Mitsubishi Chemical), ortho-cresol novolac epoxy resins such as EPICLON N-670-EXP-S (DIC), cresol novolac epoxy resins such as EPICLON N660, EPICLON N665, EPICLON N670, EPICLON N673, EPICLON N680, EPICLON N695, EPICLON N665EXP, and EPICLON N672EXP (DIC), dicyclopentadiene novolac epoxy resins such as EPICLON HP7200 (DIC), biphenyl novolac epoxy resins such as NC-3000P (Nippon Kayaku), naphthalene phenol novolac epoxy resins such as ESN-165S (Nippon Steel Chemical), glycidyl amine epoxy resins such as jER630 (Mitsubishi Chemical), EPICLON 430 (DIC), TETRAD-X (Mitsubishi Gas Chemical), alkylpolyol epoxy resins such as ZX-1542 (Nippon Steel Chemical), EPICLON 726 (DIC), EPOLIGHT 80MFA (Kyoeisha Chemical), and DENACOL EX-611 (Nagase ChemteX), rubber-modified epoxy resins such as YR-450 and YR-207 (both available from Nippon Steel Chemical) and EPOLEAD PB (Daicel), glycidyl ester compounds such as DENACOL EX-147 (Nagase ChemteX), bisphenol A episulfide resins such as jERYL-7000 (Mitsubishi Chemical), and YDC-1312, YSLV-80XY, YSLV-90CR (all available from Nippon Steel Chemical), XAC4151 (Asahi Kasei), jER1031 and jER1032 (both available from Mitsubishi Chemical), EXA-7120 (DIC), and TEPIC (Nissan Chemical).

The compound that has at least one epoxy group per molecule has a weight average molecular weight of 300 to 10000. A weight average molecular weight of 300 or more is advantageous in that the composition is of low potential for contamination of liquid crystals, and a weight average molecular weight of 10000 or less is advantageous in that it ensures easy control of sealant viscosity. The lower limit of the weight average molecular weight is preferably 500 or more, preferably 1000 or more, and the upper limit is preferably 7000 or less, preferably 5000 or less, in particular 3000 or less.

The curable resin composition that contains a compound that has at least one epoxy group per molecule preferably has a hydrogen-bonding functional group value of $1 \times 10^{-4}$ to $5 \times 10^{-2}$ mol/g, preferably $5 \times 10^{-4}$ to $1 \times 10^{-2}$ mol/g, preferably $1 \times 10^{-3}$ to $5 \times 10^{-3}$ mol/g. When used as a sealant, such a curable resin composition is advantageously unlikely to elute into liquid crystals, and thus unlikely to contaminate the liquid crystals, in both uncured and cured states and reduces the problems of display defects such as voids, alignment irregularities, and image-sticking because of intramolecular hydrogen bonding.

The hydrogen bonds are formed in the presence of a compound that has a hydrogen bonding moiety such as a functional group or residue, examples including compounds with functional groups such as —OH, —SH, —NH$_2$, —NHR (where R designates an aromatic or aliphatic hydrocarbon or a derivative thereof), —COOH, —CONH$_2$, and —NHOH groups and compounds with residues such as —NHCO—, —NH—, —CONHCO—, and —NH—NH— bonds in their molecules. The hydrogen-bonding functional group value is a value calculated according to (Formula 1) below when there is one hydrogen bonding functional group-bearing compound.

Hydrogen-bonding functional group value ($HX$)
(mol/g)=(Number of hydrogen bonding functional groups per molecule of compound $X$)/
(Molecular weight of compound $X$)   (Formula 1)

When there is a mixture of multiple resins each of which is a hydrogen bonding functional group-bearing compound, the hydrogen-bonding functional group value can be calculated through proportioning according to the amount per unit weight (weight fraction) of each of the hydrogen bonding functional group-bearing compounds. For example, when there are compounds A, B, and C having hydrogen bonding functional groups, the hydrogen-bonding functional group value is represented by (Formula 2) below.

Hydrogen-bonding functional group value
($H_{ABC}$)=$H_A P_A$+$H_B P_B$+$H_C P_C$   (Formula 2)

(where P$\alpha$ is the weight fraction of compound $\alpha$)

With a hydrogen-bonding functional group value of less than $1 \times 10^{-4}$ mol/g, ingredients of the curable resin composition are likely to elute into liquid crystals and disturb the alignment of the liquid crystals, and with a hydrogen-bonding functional group value of more than $5 \times 10^{-2}$ mol/g, the moisture permeability of the cured resin composition is so high that water easily penetrates into the liquid crystal display.

There may be used a single hydrogen bonding functional group-bearing compound with a hydrogen bond-forming functional group content that falls within the above range or two or more hydrogen bonding functional group-bearing compounds with hydrogen-bonding functional group value levels that are controlled into the above range when the compounds are mixed. In other words, only the mean hydrogen-bonding functional group value of the hydrogen bonding functional group-bearing compounds used needs to be in the above range.

The curable resin composition that contains a compound that has at least one epoxy group per molecule preferably has a volume resistivity of $1 \times 10^{13}$ Ω·cm or more in the cured state. A volume resistivity of less than $1 \times 10^{13}$ Ω·cm means that the sealant contains ionic impurities, and when used as a sealant with such a volume resistivity, the resin composition causes reduced voltage holding ratio (VHR) and increased ionic density in the liquid crystal layer and display defects such as voids, alignment irregularities, and image-sticking upon as a result of the elution of the ionic impurities into liquid crystal upon turning on the liquid crystal display.

The curable resin composition that contains a compound that has at least one epoxy group per molecule preferably has a specific resistance of $1.0 \times 10^6$ to $1.0 \times 10^{10}$ Ω·cm in the uncured state. When used as a sealant with a specific resistance of less than $1.0 \times 10^6$ Ω·cm, the resin composition causes reduced voltage holding ratio (VHR) and increased ionic density in the liquid crystal layer and display defects such as voids, alignment irregularities, and image-sticking if these elute into liquid crystals. With a specific resistance of more than $1.0 \times 10^{10}$ Ω·cm, the resin composition can be poorly adhesive to the substrates.

The compound that has at least one epoxy group per molecule is preferably a compound that has at least one ethylenic unsaturated bond per molecule. Particularly preferred of such compounds are compounds that have at least one epoxy group and at least one (meth)acrylic group per molecule.

The compound that has at least one epoxy group and at least one (meth)acrylic group per molecule can be of any kind, and examples include (meth)acrylic acid-modified epoxy resins and urethane-modified (meth)acrylic epoxy resins.

(1) (Meth)Acrylic Acid-Modified Epoxy Resins

The (meth)acrylic acid-modified epoxy resins can be of any kind and can be obtained by, for example, reacting (meth)acrylic acid with an epoxy resin in the presence of a basic catalyst as in the conventional process.

Examples of (meth)acrylic acid-modified epoxy resins include partially (meth)acrylated forms of novolac, bisphenol, and other epoxy resins. Examples of preferred epoxy resins include biphenyl, naphthalene, tris(hydroxyphenyl)alkyl, and tetrakis(hydroxyphenyl)alkyl epoxy resins.

A specific example of a process to obtain such an epoxy resin is to stir 360 parts by weight of resorcinol epoxy resin (Nagase ChemteX "EX-201"), 2 parts by weight of p-methoxyphenol as a polymerization inhibitor, 2 parts by weight of triethylamine as a reaction catalyst, and 210 parts of acrylic acid under reflux at 90° C. with a blow of air for 5 hours of reaction. Examples of commercially available (meth)acrylic acid-modified epoxy resins of the above kinds include EBECRYL 860, EBECRYL 1561, EBECRYL 3700, EBECRYL 3600, EBECRYL 3701, EBECRYL 3703, EBECRYL 3200, EBECRYL 3201, EBECRYL 3702, EBECRYL 3412, EBECRYL 860, EBECRYL RDX63182, EBECRYL 6040, and EBECRYL 3800 (all available from Daicel-Cytec), EA-1020, EA-1010, EA-5520, EA-5323, EA-CHD, and EMA-1020 (all available from Shin-Nakamura Chemical), EPOXY ESTER M-600A, EPOXY ESTER 40EM, EPOXY ESTER 70PA, EPOXY ESTER 200PA, EPOXY ESTER 80MFA, EPOXY ESTER 3002M, EPOXY ESTER 3002A, EPOXY ESTER 1600A, EPOXY ESTER 3000M, EPOXY ESTER 3000A, EPOXY ESTER 200EA, and EPOXY ESTER 400EA (all available from Kyoeisha Chemical), and Denacol Acrylate DA-141, Denacol Acrylate DA-314, and Denacol Acrylate DA-911 (all available from Nagase ChemteX).

(2) Urethane-Modified (Meth)Acrylic Epoxy Resins

The urethane-modified (meth)acrylic epoxy resins can be obtained by, for example, the following method. That is, such an epoxy resin can be produced through a process such as reacting a polyol with a bifunctional or multifunctional isocyanate and then reacting the product with a hydroxy-bearing (meth)acrylic monomer and glycidol, reacting a bifunctional or multifunctional isocyanate with a hydroxy-bearing (meth)acrylic monomer and glycidol not using a polyol, or reacting an isocyanate-bearing (meth)acrylate with glycidol. A specific example of a production process is to react 1 mole of trimethylolpropane with 3 moles of isophorone diisocyanate in the presence of a tin catalyst first and then react the residual isocyanate groups in the resulting compound with hydroxyethyl acrylate, which is a hydroxy-bearing acrylic monomer, and glycidol, which is a hydroxy-bearing epoxy.

The polyol can be of any kind, and examples include ethylene glycol, glycerol, sorbitol, trimethylolpropane, and (poly)propylene glycol.

The isocyanate can be of any kind that is bifunctional or multifunctional. Examples include isophorone diisocyanate, 2,4-tolylene diisocyanate, 2,6-tolylene diisocyanate, hexamethylene diisocyanate, trimethyl hexamethylene diisocyanate, diphenylmethane-4,4'-diisocyanate (MDI), hydrogenated MDI, polymeric MDI, 1,5-naphthalene diisocyanate, norbornane diisocyanate, tolidine diisocyanate, xylylene diisocyanate (XDI), hydrogenated XDI, lysine diisocyanate, triphenylmethane triisocyanate, tris(isocyanatophenyl)thiophosphate, tetramethyl xylene diisocyanate, and 1,6,10-undecane triisocyanate.

The hydroxy-bearing (meth)acrylic monomer can be of any kind. For monomers that have one hydroxy group in the molecule, examples include hydroxyethyl (meth)acrylate, hydroxypropyl (meth)acrylate, and hydroxybutyl (meth)acrylate, and for monomers that have two or more hydroxy groups in the molecule, examples include epoxy (meth)acrylates such as bisphenol A-modified epoxy (meth)acrylate. These can be used alone, and two or more can also be used in combination.

The compound that has at least one epoxy group and at least one (meth)acrylic group per molecule preferably has a hydrogen bonding group, e.g., a hydroxy group and/or a urethane bond, to reduce compatibility with liquid crystals and eliminate contamination and reduce the problems of display defects such as voids, alignment irregularities, and image-sticking.

The compound that has at least one epoxy group and at least one (meth)acrylic group per molecule preferably has at least one molecular backbone selected from the biphenyl, naphthalene, and bisphenol backbones and partially (meth)acrylated novolac epoxy resins. This improves the heat resistance of the curable resin composition according to the present invention.

The curable resin composition that contains a compound that has at least one epoxy group per molecule may contain a compound that has an ethylenic unsaturated bond. Particularly preferred are (meth)acryloyloxy-bearing compounds. Examples of (meth)acryloyloxy-bearing compounds include ester compounds obtained by reacting (meth)acrylic acid with a hydroxy-bearing compound and urethane (meth)acrylates obtained by reacting an isocyanate with a hydroxy-bearing (meth)acrylic acid derivative.

(1) Ester Compounds Obtained by Reacting (Meth)acrylic Acid with a Hydroxy-Bearing Compound The ester compounds obtained by reacting (meth)acrylic acid with a hydroxy-bearing compound can be of any kind. Examples of monofunctional ones include 2-hydroxyethyl (meth)acrylate, 2-hydroxypropyl (meth)acrylate, 4-hydroxybutyl (meth)acrylate, 2-hydroxybutyl (meth)acrylate, isobutyl (meth)acrylate, t-butyl (meth)acrylate, isooctyl (meth)acrylate, lauryl (meth)acrylate, stearyl (meth)acrylate, isobornyl (meth)acrylate, cyclohexyl (meth)acrylate, 2-methoxyethyl (meth)acrylate, methoxyethylene glycol (meth)acrylate, 2-ethoxyethyl (meth)acrylate, tetrahydrofurfuryl (meth)acrylate, benzyl (meth)acrylate, ethyl carbitol (meth)acrylate, phenoxyethyl (meth)acrylate, phenoxydiethylene glycol (meth)acrylate, phenoxypolyethylene glycol (meth)acrylate, methoxypolyethylene glycol (meth)acrylate, 2,2,2-trifluoroethyl (meth)acrylate, 2,2,3,3-tetrafluoropropyl (meth)acrylate, 1H,1H,5H-octafluoropentyl (meth)acrylate, imide (meth)acrylate, methyl (meth)acrylate, ethyl (meth)acrylate, n-butyl (meth)acrylate, propyl (meth)acrylate, n-butyl (meth)acrylate, cyclohexyl (meth)acrylate, 2-ethylhexyl (meth)acrylate, n-octyl (meth)acrylate, isononyl (meth)acrylate, isomyristyl (meth)acrylate, 2-buthoxyethyl (meth)acrylate, 2-phenoxyethyl (meth)acrylate, bicyclopentenyl (meth)acrylate, isodecyl (meth)acrylate, diethylaminoethyl (meth)acrylate, dimethylaminoethyl (meth)acrylate, 2-(meth)acryloyloxyethyl succinate, 2-(meth)acryloyloxyethyl hexahydrophthalate, 2-(meth)acryloyloxyethyl 2-hydroxypropyl phthalate, glycidyl (meth)acrylate, and 2-(meth)acryloyloxyethyl phosphate.

Bifunctional ones of the ester compounds obtained by reacting (meth)acrylic acid with a hydroxy-bearing compound can be of any kind. Examples include 1,4-butanediol di(meth)acrylate, 1,3-butanediol di(meth)acrylate, 1,6-hexanediol di(meth)acrylate, 1,9-nonanediol di(meth)acrylate, 1,10-decanediol di(meth)acrylate, 2-n-butyl-2-ethyl-1,3-propanediol di(meth)acrylate, dipropylene glycol di(meth)acrylate, tripropylene glycol di(meth)acrylate, polypropylene glycol di(meth)acrylate, ethylene glycol di(meth)acrylate, diethylene glycol di(meth)acrylate, tetraethylene glycol di(meth)acrylate, polyethylene glycol di(meth)acrylate, propoxylated bisphenol A di(meth)acrylate, ethoxylated bisphenol A di(meth)acrylate, ethoxylated bisphenol F di(meth)acrylate, dimethylol dicyclopentadiene di(meth)acrylate, 1,3-butylene glycol di(meth)acrylate, neopentyl glycol di(meth)acrylate, ethylene oxide-modified isocyanuric acid di(meth)acrylate, 2-hydroxy-3-acryloyloxypropyl di(meth)acrylate, carbonate diol di(meth)acrylate, polyether diol di(meth)acrylate, polyester diol di(meth)acrylate, polycaprolactone diol di(meth)acrylate, and polybutadiene diol di(meth)acrylate.

Trifunctional and other multifunctional ones of the ester compounds obtained by reacting (meth)acrylic acid with a hydroxy-bearing compound can be of any kind. Examples include pentaerythritol tri(meth)acrylate, trimethylolpropane tri(meth)acrylate, propoxylated trimethylolpropane tri(meth)acrylate, ethoxylated trimethylolpropane tri(meth)acrylate, caprolactone-modified trimethylolpropane tri(meth)acrylate, ethoxylated isocyanuric acid tri(meth)acrylate, dipentaerythritol penta(meth)acrylate, dipentaerythritol hexa(meth)acrylate, ditrimethylolpropane tetra(meth)acrylate, pentaerythritol tetra(meth)acrylate, glycerol tri(meth)acrylate, propoxylated glycerol tri(meth)acrylate, and tris(meth)acryloyloxyethyl phosphate.

(2) Urethane (Meth)Acrylates Obtained by Reacting an Isocyanate with a Hydroxy-Bearing (Meth)Acrylic Acid Derivative The urethane (meth)acrylates obtained by reacting an isocyanate with a hydroxy-bearing (meth)acrylic acid derivative can be of any kind and can be obtained by, for example, reacting 1 equivalent of a compound that has two isocyanate groups with 2 equivalents of a hydroxy-bearing (meth)acrylic acid derivative in the presence of a tin compound as a catalyst.

The isocyanate as a starting material for the urethane (meth)acrylates obtained by reacting an isocyanate with a hydroxy-bearing (meth)acrylic acid derivative can be of any kind. Examples include isophorone diisocyanate, 2,4-tolylene diisocyanate, 2,6-tolylene diisocyanate, hexamethylene diisocyanate, trimethyl hexamethylene diisocyanate, diphenylmethane-4,4'-diisocyanate (MDI), hydrogenated MDI, polymeric MDI, 1,5-naphthalene diisocyanate, norbornane diisocyanate, tolidine diisocyanate, xylylene diisocyanate (XDI), hydrogenated XDI, lysine diisocyanate, triphenylmethane triisocyanate, tris(isocyanatophenyl)thiophosphate, tetramethyl xylene diisocyanate, and 1,6,10-undecane triisocyanate.

The isocyanate as a starting material for the urethane (meth)acrylates obtained by reacting an isocyanate with a hydroxy-bearing (meth)acrylic acid derivative can also be, for example, a chain-extended isocyanate compound obtained through the reaction of a polyol such as ethylene glycol, glycerol, sorbitol, trimethylolpropane, (poly)propylene glycol, carbonate diol, polyether diol, polyester diol, or polycaprolactone diol with an excess of isocyanate.

The hydroxy-bearing (meth)acrylic acid derivative can be of any kind. Examples include commercially available ones such as 2-hydroxyethyl (meth)acrylate, 2-hydroxypropyl (meth)acrylate, 4-hydroxybutyl (meth)acrylate, and 2-hydroxybutyl (meth)acrylate, mono(meth)acrylates of dihydric alcohols such as ethylene glycol, propylene glycol, 1,3-propanediol, 1,3-butanediol, 1,4-butanediol, and polyethylene glycol, mono(meth)acrylates or di(meth)acrylates of trihydric alcohols such as trimethylolethane, trimethylolpropane, and glycerol, and epoxy (meth)acrylates such as bisphenol A-modified epoxy (meth)acrylates.

A specific example of a process to obtain such a urethane (meth)acrylate is to combine 134 parts by weight of trimethylolpropane with 0.2 parts by weight of BHT as a polymerization initiator, 0.01 parts by weight of dibutyltin dilaurate as a reaction catalyst, and 666 parts by weight of isophorone diisocyanate, stir the mixture under reflux at 60° C. for 2 hours of reaction, then add 51 parts of 2-hydroxyethyl acrylate, and stir the mixture under reflux at 90° C. with a blow of air for 2 hours of reaction.

Examples of commercially available urethane (meth)acrylates of the above kinds include M-1100, M-1200, M-1210, and M-1600 (all available from Toagosei), EBECRYL 230, EBECRYL 270, EBECRYL 4858, EBECRYL 8402, EBECRYL 8804, EBECRYL 8803, EBECRYL 8807, EBECRYL 9260, EBECRYL 1290, EBECRYL 5129, EBECRYL 4842, EBECRYL 210, EBECRYL 4827, EBECRYL 6700, EBECRYL 220, and EBECRYL 2220 (all available from Daicel-Cytec), Art-Resin UN-9000H, Art-Resin UN-9000A, Art-Resin UN-7100, Art-Resin UN-1255, Art-Resin UN-330, Art-Resin UN-3320HB, Art-Resin UN-1200TPK, and Art-Resin SH-500B (all available from Negami Chemical Industrial), U-122P, U-108A, U-340P, U-4HA, U-6HA, U-324A, U-15HA, UA-5201P, UA-W2A, U-1084A, U-6LPA, U-2HA, U-2PHA, UA-4100, UA-7100, UA-4200, UA-4400, UA-340P, U-3HA, UA-7200, U-2061BA, U-10H, U-122A, U-340A, U-108, U-6H, and UA-4000 (all available from Shin-Nakamura Chemical), and AH-600, AT-600, UA-306H, AI-600, UA-101T, UA-101I, UA-306T, and UA-306I.

Thermosetting sealants, made from resins that become less viscous when heated, pose the problems of elution of ionic impurities contained in the sealant into liquid crystals touching the sealant and leakage of liquid crystals associated with deformation of the seal pattern. Effective prevention of reduced resin viscosity caused by heating can be achieved by improving the curing rate so that the sealant can cure quickly before losing its viscosity. A curable resin composition according to the present invention preferably contains a compound that has an ethylenic unsaturated bond as stated above, and it is preferred that the carbon-carbon double bond content of the curable resin composition be in the range of 0.001 to 0.006 mol/g as a result of a (meth)acrylic-containing resin able to undergo free-radical reaction being used in combination with (2) a thermal radical polymerization initiator. This ensures that neighboring carbon-carbon double bonds quickly react in the resin composition, further accelerating the curing rate of the resin composition. As a result, excellent leakage barrier is provided.

A carbon-carbon double bond content of the curable resin composition exceeding 0.006 mol/g, however, may affect the strength of the adhesion between the substrates as a component of the liquid crystal display panel and the cured material because of a high density of crosslinks in the cured material, although the curing rate would be high. On the other hand, a carbon-carbon double bond content of less than 0.001 mol/g leads to a low curing rate. A resin composition with a carbon-carbon double bond content in the above range is therefore well balanced between curability and adhesion to the substrates. In particular, it is preferred that the carbon-carbon double bond content be 0.002 mol/g or more and 0.003 mol/g or less for good balance between the curability and adhesion to the substrates of the resin composition.

When there is a mixture of multiple resins each of which is a compound that has a carbon-carbon double bond content, the carbon-carbon double bond content can be calculated through proportioning according to the amount per unit weight (weight fraction) of each of the compounds that have a carbon-carbon double bond content. For example, when there are compounds A, B, and C having a carbon-carbon double bond content, the carbon-carbon double bond content is represented by (Formula 3) below.

$$\text{Carbon-carbon double bond content } (N_{ABC}) = N_A P_A + N_B P_B + N_C P_C \quad \text{(Formula 3)}$$

(where $N\alpha$ and $P\alpha$ represent the carbon-carbon double bond content (mol/g) of compound $\alpha$ and the weight fraction to the compounds (A+B+C))

The carbon-carbon double bond content of a curable resin is calculated by dividing the number of carbon-carbon double bonds in the molecule by the molecular weight of the resin, with a unit of mol/g. The molecular weight of each single curable resin is preferably measured by GPC with polystyrene as the standard. This gives a number-average molecular weight and a weight-average molecular weight, and the carbon-carbon double bond content is preferably calculated using the number-average molecular weight.

There may be used a single resin with a carbon-carbon double bond content that falls within the above range or two or more resins with carbon-carbon double bond content levels that are controlled into the above range when the resins are mixed. In other words, only the mean carbon-carbon double bond content of the compounds used needs to be in the above range.

A curable resin composition according to the present invention may contain a compound that has at least one epoxy group and at least one (meth)acrylic group per molecule or a (meth)acryloyloxy-bearing compound, and the ratio of epoxy to (meth)acrylic groups in the curable resin composition in such a case, epoxy:(meth)acrylic, is preferably from 15:85 to 95:5, preferably from 25:75 to 90:10, preferably from 25:75 to 70:30. A relative equivalent weight of (meth)acrylic of less than 5 leads to low reactivity which causes the curing of the applied sealant not to proceed immediately upon heating and can even result in a great deal of elution into liquid crystals. A relative equivalent weight of (meth)acrylic exceeding 85 can lead to insufficient adhesion and moisture permeability. More preferably, the epoxy:(meth)acrylic ratio is from 50:50 to 30:70.

The curable resin composition that contains a compound that has at least one epoxy group per molecule preferably contains a heat-activated hardener. The heat-activated hardener is an agent for initiating epoxy groups and/or ethylenic unsaturated bonds existing in the curable resin composition into reaction and crosslinking through heating and has the role of improving the adhesion and moisture resistance of the curable resin composition in its cured state.

This heat-activated hardener for the reaction of epoxy groups can be of any kind, but latent heat-activated hardeners with melting points of 100° C. or more are preferably used. The use of a heat-activated hardener with a melting point of 100° C. or less may lead to significantly degraded storage stability.

For a curable resin composition that contains a compound that has at least one (meth)acrylic or other ethylenic unsaturated bond per molecule, it is also preferred that it contain a thermal radical initiator. The thermal radical initiator is an agent that initiates ethylenic unsaturated bonds existing in the curable resin composition into reaction and crosslinking through heating, contributes particularly to the acceleration of the curing rate, and has the role of preventing the penetration of ionic impurities. The thermal radical initiator can be of any kind, but it is preferred that its 10-hour half-life temperature be from 40° C. to 80° C. The use of a heat-activated hardener with a 10-hour half-life temperature of 40° C. or less may lead to significantly degraded storage stability.

Preferred examples of such heat-activated hardeners include hydrazide compounds such as 1,3-bis[hydrazinocarbonoethyl-5-isopropyl hydantoin] (melting point: 120° C.), adipic acid dihydrazide (melting point: 181° C.), 7,11-octadecadiene-1,18-dicarbohydrazide (melting point: 160° C.), dodecanedioic acid dihydrazide (melting point: 190° C.), and sebacic acid dihydrazide (melting point: 189° C.), dicyandiamide compounds such as dicyandiamide (melting point: 209° C.), guanidine derivatives, imidazole derivatives such as 1-cyanoethyl-2-phenylimidazole, N-[2-(2-methyl-1-imidazolyl)ethyl]urea, 2,4-diamino-6-[2'-methylimidazolyl-(1')]-ethyl-s-triazine, N,N'-bis(2-methyl-1-imidazolylethyl)urea, N,N'-(2-methyl-1-imidazolylethyl)-adipamide, 2-phenyl-4-methyl-5-hydroxymethylimidazole, and 2-phenyl-4,5-dihydroxymethylimidazole, 2-hydroxymethylimidazole (molecular weight, 98.1; melting point, 115° C.) and 2-phenyl-4,5-dihydroxymethylimidazole (molecular weight, 204; solid; melting point, higher than 230° C. (decomposition)), which elute into liquid crystals only to a limited extent because of the presence of hydroxy, and 2-methylimidazole (molecular weight, 82; solid; melting point, 137° C. to 145° C.), and other examples include modified aliphatic polyamines, acid anhydrides such as tetrahydrophthalic anhydride and ethylene glycol bis(anhydrotrimellitate), adducts of amines and epoxy resin, and phenolic compounds such as phenol novolac, cresol novolac, and Xylok-type novolac resins. These can be used alone or as a combination of two or more.

When an acrylic acid-modified epoxy resin is used as the aforementioned compound that has at least one (meth)acrylic group and at least one epoxy group per molecule, mildly reactive heat-activated hardeners with melting points of 100° C. or more are preferred from the storage stability perspective. The reactivity of an acrylic epoxy resin varies more greatly than its structure: Urethane-modified epoxy resins ensure excellent storage stability even when a highly reactive heat-activated hardener is used because of their stability, but (meth)acrylic acid-modified epoxy resins are highly reactive.

The proportion of the heat-activated hardener is preferably from 5 to 60 parts by weight, more preferably from 10 to 50 parts by weight, per 100 parts by weight of the curable compound. When outside of this range, reduced adhesiveness and chemical resistance of the cured material may lead to early degradation of the characteristics of liquid crystals during a high-temperature and high-humidity performance test.

The heat-activated hardener is preferably a coated heat-activated hardener described below. The use of a heat-activated hardener according to the present invention ensures very high storage stability even when the sealant is made as a one-component sealant.

More specifically, the use of a coated heat-activated hardener, which is a solid heat-activated hardener whose surface has been coated with fine particles that are hardly volatile and sparingly soluble in organic compounds, makes the sealant highly stable during storage even when the hardener is premixed with it.

The solid heat-activated hardener herein refers to a hardener that is solid at room temperature and melts or softens and starts reacting with the curable resin when heated. Such a solid heat-activated hardener can be any kind of heat-activated hardener that has a melting or softening point higher than room temperature, and examples include solid amine compounds, phenolic compounds, and acid anhydrides. In particular, solid amine compounds are preferred because of their excellent reactivity at low temperatures.

The solid amine compounds refer to solid compounds that have one or more primary to tertiary amine groups in the molecule, and examples include aromatic amines such as meta-phenylene diamine, imidazole compounds such as 2-methylimidazole, 1,2-dimethylimidazole, and 1-cyanoethyl-2-methylimidazole, imidazoline compounds such as 2-methylimidazoline, and dihydrazide compounds such as sebacic acid dihydrazide and isophthalic acid dihydrazide. Examples of commercially available solid amine compounds of these types include amine adducts such as AJICURE PN-23 and AJICURE MY-24 (both available from Ajinomoto Fine-Techno) and dicyandiamide.

Examples of the polyhydric phenol compounds include polyphenolic compounds and novolac phenolic resins. Examples of commercially available polyhydric phenol compounds of these types include jERCURE 170, jERCURE YL6065, and jERCURE MP402FPI (all available from Mitsubishi Chemical).

Examples of the acid anhydrides include glycerol bis(anhydrotrimellitate), ethylene glycol-bis(anhydrotrimellitate), tetrahydrophthalic anhydride, hexahydrophthalic anhydride, 4-methylhexahydrophthalic anhydride, and 3-methyltetrahydrophthalic anhydride. Examples of commercially available acid anhydrides of these types include jERCURE YH-306 and YH-307 (both available from Mitsubishi Chemical).

The average particle diameter of the particles of the solid heat-activated hardener is not limited, but it is preferred that the average particle diameter be from 0.1 to 50 μm. An average particle diameter of less than 0.1 μm may prevent efficient coating of the surfaces with fine particles. An average particle diameter exceeding 50 μm may result in the hardener precipitating when the sealant is stored with the hardener mixed therein and the sealant curing unevenly. More preferably, the average particle diameter is from 0.5 to 10 μm.

Examples of fine particles with which the surfaces of the particles of the solid heat-activated hardener are coated include those of oxides, hydroxide, and halides of elements such as Si, Al, Ti, Fe, Mn, and Mg, styrene beads, and particulate rubber. These fine particles can be used alone, and it is also possible to use two or more kinds in combination.

The average particle diameter of the fine particles is preferably 0.05 μm or less. An average particle diameter exceeding 0.05 μm may prevent efficient coating of the surfaces of the particles of the solid heat-activated hardener. More preferably, the average particle diameter is 0.03 μm or less. The particle diameters of the fine particles are preferably 10% or less of those of the particles of the solid heat-activated hardener. A particle diameter of 10% or more may lead to insufficient performance in the control of reactivity.

The weight proportions of the solid heat-activated hardener and the fine particles in the coated heat-activated hardener are preferably from 50:1 to 3:1. A weight proportion of the solid heat-activated hardener exceeding 50 may lead to insufficient performance in the control of reactivity. A weight proportion of the solid heat-activated hardener of less than 3, which means that there exists an excess of fine particles, may result in reduced curing capability. More preferably, the weight proportions are from 20:1 to 5:1.

The method used to coat the particles of the solid heat-activated hardener with the fine particles is particularly not limited and can be, for example, one in which the particles of the solid heat-activated hardener and the fine particles are mixed to uniformity in a container using equipment such as a commercially available blender.

The ratio between the curable resin composition and the coated heat-activated hardener is preferably from 1 to 100 parts by weight per 100 parts by weight of the curable resin composition. A ratio of less than 1 part by weight may result in insufficient curing. A ratio exceeding 100 parts by weight may lead to the characteristics of the resulting cured material such as toughness being affected by an excess of residual heat-activated hardener.

Adding the coated heat-activated hardener to the curable resin composition improves the storage stability of the curable resin composition. When stored at normal temperature, the resin composition exhibits high storage stability because the fine particles on the surfaces of the hardener minimize the contact between the solid heat-activated hardener and the polymerizable resin. At the time of curing, the solid heat-activated hardener melts through heating and touches the polymerizable resin without being restricted by the fine particles, initiating the curing reaction quickly. The coated heat-activated hardener can be produced very easily at normal temperature in a short time without using special reactions.

A curable resin composition according to the present invention preferably contains a thermal radical polymerization initiator. A thermal radical polymerization initiator is a compound that generates free radicals when heated, i.e., a compound that absorbs heat energy and decomposes generating radical species. The thermal radical polymerization initiator preferably represents from 0.01 to 3.0 parts by mass per 100 parts by mass of the resin unit. Too high a thermal radical polymerization initiator content leads to poor stability in viscosity, and too low a thermal radical polymerization initiator content leads to poor curability.

For a curable resin composition that contains a compound that has at least one (meth)acrylic or other ethylenic unsaturated bond per molecule, it is also preferred that it contain a thermal radical initiator. The thermal radical initiator is an agent that initiates ethylenic unsaturated bonds existing in the curable resin composition into reaction and crosslinking through heating, contributes particularly to the acceleration of the curing rate, and has the role of preventing the penetration of ionic impurities.

When a curable resin composition according to the present invention is used as a liquid crystal sealant, it is preferred to minimize the viscosity drop the curable resin composition experiences when heated because, as stated above, too low a viscosity of the heated liquid crystal sealant leads to the elution of impurities and the leakage of liquid crystals. Useful reduction of the drop in resin viscosity associated with heating can be achieved through the aforementioned adjustment of the carbon-carbon double bond content of the curable resin composition within a certain range for accelerating the curing rate of the curable resin composition and promoting gelation. However, proper use of a thermal radical polymerization initiator further reduces this drop in resin viscosity.

The gelation of the curable resin composition is promoted by the use of a thermal radical polymerization initiator with a low 10-hour half-life temperature. The 10-hour half-life temperature is a temperature at which thermally decomposing a thermal radical polymerization initiator for 10 hours at a certain temperature in the presence of an inert gas reduces the concentration of the thermal radical polymerization initiator by half. When this 10-hour half-life temperature is low, free radicals easily form even at relatively low temperatures and the curable resin composition easily cures even at low temperatures. When this temperature is high, free radicals do not easily form and the curability of the curable resin composition is reduced.

Thus, it is preferred that the 10-hour half-life temperature of the thermal radical polymerization initiator be from 40° C. to 80° C., more preferably from 50° C. to 70° C., for promoted gelation of the curable resin composition. Making this 10-hour half-life temperature 80° C. or less, or even 70° C. or less, ensures easy formation of free radicals during the curing of the composition which promotes the curing reaction (the curing temperature is usually from 80° C. to 150° C.), thereby mitigating the viscosity drop during the heat curing.

Too low a 10-hour half-life temperature of the thermal radical polymerization initiator, however, affects the stability of the liquid crystal sealant because it allows the curing reaction to proceed easily even at room temperature. Making the 10-hour half-life temperature of the thermal radical polymerization initiator 40° C., preferably 50° C., or more provides a curable resin composition with good stability during storage and in the process of application to a substrate (usually performed at room temperature).

The 10-hour half-life temperature of a thermal radical polymerization initiator can be determined as a specific value in the following way.

First, assuming the thermal decomposition reaction to be a first-order equation, the relationship described by the following formula holds.

$$\ln(C_0/C_t) = kd \times t \quad \text{[Math. 1]}$$

$C_0$: Initial concentration of the thermal radical polymerization initiator
$C_t$: Concentration of the thermal radical polymerization initiator at t hours
kd: Thermal decomposition rate constant
t: Duration of reaction The half-life is the time taken for the concentration of the thermal radical polymerization initiator to fall to half, i.e., the case where $C_t = C_0/2$. If the thermal radical polymerization initiator reaches its half-life at t hours, the following formula holds.

$$kd = (1/t) \cdot \ln 2 \quad \text{[Math. 2]}$$

The temperature dependence of a rate constant is described by the Arrhenius equation. Therefore, the following formula holds.

$$kd = A\exp(-\Delta E/RT)$$

$$(1/t)*\ln 2 = A\exp(-\Delta E/RT) \quad \text{[Math. 3]}$$

A: Frequency factor
$\Delta E$: Activation energy
R: Gas constant (8.31.4 J/mol·K)
T: Absolute temperature (K)

The values of A and $\Delta E$ are provided in J. Brandrup et al., *Polymer Hand Book fourth edition volum* 1, pages 11-2 to 11-69, John & Wiley, (1999). The 10-hour half-life temperature T is therefore derived when t=10 hours.

The thermal radical polymerization initiator is preferably organic peroxide or an azo compound. Examples of organic peroxides include ketone peroxides, peroxyketals, hydroperoxides, dialkyl peroxides, peroxyesters, diacyl peroxides, and peroxydicarbonates.

The following are specific examples of these. The number in parentheses next to each compound is the 10-hour half-life temperature (see Wako Pure Chemical Industries catalogue, API Corporation catalogue, and the aforementioned Polymer Hand Book).

Examples of ketone peroxides include methyl ethyl ketone peroxide (109° C.) and cyclohexanone peroxide (100° C.).

Examples of peroxyketals include 1,1-bis(t-hexylperoxy) 3,3,5-trimethylcyclohexane (87° C.), 1,1-bis(t-hexylperoxy)cyclohexane (87° C.), 1,1-bis(t-butylperoxy)cyclohexane (91° C.), 2,2-bis(t-butylperoxy)butane (103° C.), 1,1-(t-amylperoxy)cyclohexane (93° C.), n-butyl 4,4-bis(t-butylperoxy)valerate (105° C.), and 2,2-bis(4,4-di-t-butylperoxycyclohexyl)propane (95° C.).

Examples of hydroperoxides include P-methane hydroperoxide (128° C.), diisopropylbenzene peroxide (145° C.), 1,1,3,3-tetramethylbutyl hydroperoxide (153° C.), cumene hydroperoxide (156° C.), and t-butyl hydroperoxide (167° C.).

Examples of dialkyl peroxides include α,α-bis(t-butylperoxy)diisopropylbenzene (119° C.), dicumyl peroxide (116° C.), 2,5-dimethyl-2,5-bis(t-butylperoxy)hexane (118° C.), t-butylcumyl peroxide (120° C.), t-amyl peroxide (123° C.), di-t-butyl peroxide (124° C.), and 2,5-dimethyl-2,5-bis (t-butylperoxy)hexane-3 (129° C.).

Examples of peroxyesters include cumyl peroxyneodecanoate (37° C.), 1,1,3,3-tetramethylbutyl peroxyneodecanoate (41° C.), t-hexyl peroxyneodecanoate (45° C.), t-butyl peroxyneodecanoate (46° C.), t-amyl peroxyneodecanoate (46° C.), t-hexyl peroxypivalate (53° C.), t-butyl peroxypivalate (55° C.), t-amyl peroxypivalate (55° C.), 1,1,3,3-tetramethylbutyl peroxy-2-ethylhexanoate (65° C.), 2,5-dimethyl-2,5-bis (2-ethylhexanoylperoxy)hexane (66° C.), t-hexyl peroxy-2-ethylhexanoate (70° C.), t-butyl peroxy-2-ethylhexanoate (72° C.), t-amyl peroxy-2-ethylhexanoate (75° C.), t-butyl peroxyisobutyrate (82° C.), t-hexyl peroxyisopropylmonocarbonate (95° C.), t-butyl peroxymaleic acid (96° C.), t-amyl peroxy-normal-octoate (96° C.), t-amyl peroxyisonanoate (96° C.), t-butyl peroxy-3,5,5-trimethyhexanoate (97° C.), t-butyl peroxylaurate (98° C.), t-butyl peroxyisopropylmonocarbonate (99° C.), t-butyl peroxy-2-ethylhexylmonocarbonate (99° C.), t-hexyl peroxybenzoate (99° C.), 2,5-dimethyl-2,5 bis (benzoylperoxy) hexane (100° C.), t-amyl peroxyacetate (100° C.), t-amyl peroxybenzoate (100° C.), t-butyl peroxyacetate (102° C.), and t-butyl peroxybenzoate (104° C.).

Examples of diacyl peroxides include diisobutyryl peroxide (33° C.), di-3,5,5-trimethylhexanoyl peroxide (60° C.), dilauroyl peroxide (62° C.), disuccinic acid peroxide (66° C.), and dibenzoyl peroxide (73° C.).

Examples of peroxydicarbonates include di-n-propyl peroxydicarbonate (40° C.), diisopropyl peroxydicarbonate (41° C.), bis(4-t-butylcyclohexyl) peroxydicarbonate (41°

C.), di-2-ethylhexyl peroxydicarbonate (44° C.), t-amyl peroxypropylcarbonate (96° C.), and t-amyl peroxy 2 ethylhexylcarbonate (99° C.).

The curable resin composition that contains a compound that has at least one epoxy group per molecule may contain a radical polymerization inhibitor.

Examples of such radical polymerization inhibitors include 2,6-di-t-butylcresol, butylated hydroxyanisole, 2,6-di-t-butyl-4-ethylphenol, stearyl β-(3,5-di-t-butyl-4-hydroxyphenyl)propionate, 2,2'-methylenebis(4-methyl-6-t-butylphenol), 2,2'-methylenebis(4-ethyl-6-t-butylphenol), 4,4'-thiobis-3-methyl-6-t-butylphenol), 4,4-butylidenebis(3-methyl-6-t-butylphenol), 3,9-bis[1,1-dimethyl-2-[β-(3-t-butyl-4-hydroxy-5-methylphenyl]propionyloxy]ethyl], 2,4,8,10-tetraoxaspiro[5,5]undecane, tetrakis-[methylene-3-(3',5'-di-t-butyl-4'-hydroxyphenyl]propionate]methane, 1,3,5-tris(3',5'-di-t-butyl-4'-hydroxybenzyl)-sec-triazin-2,4,6-(1H,3H,5H)trione, hydroquinone, para-methoxyphenol, para-benzoquinone, toluquinone, tertiary-butyl-para-benzoquinone, 2,5-ditertiary-butyl-para-benzoquinone, and 2,5-diphenyl-para-benzoquinone, and particularly preferred examples include para-benzoquinone, toluquinone, and tertiary-butyl-para-benzoquinone. These radical polymerization inhibitors can be used alone, and it is also possible to use two or more in combination.

The amount of the radical polymerization inhibitor is 0.1 parts by weight at its lower limit and 0.4 parts by weight at its upper limit per 100 parts by weight of the curable resin composition. An amount of the radical polymerization inhibitor of less than 0.1 parts by weight leads to accidental progress of the curing reaction caused by unintended heating during the storage of the sealant or the production of the liquid crystal display, inducing changes in characteristics such as increased viscosity. An amount of the radical polymerization inhibitor exceeding 0.4 parts by weight may lead to a significantly low thermal curability of the resulting sealant that prevents the sealant from being cured even when heated to cure it.

The curable resin composition that contains a compound that has at least one epoxy group per molecule preferably further contains a silane coupling agent. The silane coupling agent has the main role of an adhesion aid for good adhesion between the sealant and the substrates of the liquid crystal display. It may also be used in a method in which the interactions between the resin(s) as a component of the sealant and inorganic or organic filler, which is mixed for purposes such as the improvement of adhesiveness with its effect of dispersing stress and the improvement of the linear expansion coefficient, are improved by treating the surfaces of the filler with a silane coupling agent.

The silane coupling agent is preferably a silane compound that has at least one functional group represented by group (2-A) below and at least one functional group represented by group (2-B) below.

[Chem. 19]

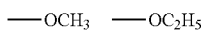 (2-A)

[Chem. 20]

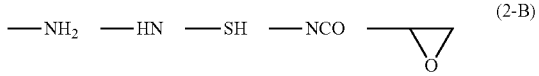 (2-B)

Specific examples of such silane compounds include γ-aminopropyltrimethoxysilane, γ-mercaptopropyltrimethoxysilane, and γ-isocyanatopropyltrimethoxysilane. These silane compounds can be used alone, and it is also possible to use two or more in combination.

The use of a silane compound with such a structure as a silane coupling agent improves the adhesion to the substrates and prevents the curable resin from flowing into liquid crystals because the silane compound binds with the resin via the functional group(s) represented by group 2-B.

When the surfaces of filler are treated with a silane coupling agent, the silane compound and the curable resin component are mixed together and then heated. The heat treatment drives the silane compound to chemically bind with the curable resin component via the functional group(s) represented by group 2-B. The heat treatment is preferably performed by stirring the resin mixture for higher efficiency of the reaction. The method of stirring is not limited and can be, for example, a commonly used method such as a stirrer or rotating stirring blades using equipment such as a motor. The heating temperature is preferably from 3° C. to 70° C. A heating temperature of less than 30° C. can lead to incomplete reaction between the silane compound and the curable resin, and a heating temperature exceeding 70° C. can cause the heat to initiate the curing. More preferably, the heating temperature is from 40° C. to 60° C. The duration of heating is preferably from 1 to 2 hours. A duration of heating of less than 1 hour can cause the functional group(s) in the silane compound to react incompletely and leave unreacted residue.

After the heat treatment, the percent amount remaining of the at least one functional group represented by group 2-B above is 10% or less. A percent amount remaining exceeding 10% causes the agent to increase viscosity during storage through reaction with the resin component and to contaminate liquid crystals by flowing into them. The percent amount remaining of the at least one functional group represented by group 2-B can be determined from the ratio of the peak intensity of the functional group(s) in the silane compound to that after the heat treatment using 1H-NMR.

The curable resin composition that contains a compound that has at least one epoxy group per molecule may contain filler for viscosity adjustment and the improvement of adhesiveness with its effect of dispersing stress.

The filler can be of any kind and can be, for example, inorganic filler such as talc, asbestos, silica, diatomaceous earth, smectite, bentonite, calcium carbonate, magnesium carbonate, alumina, montmorillonite, diatomaceous earth, zinc oxide, iron oxide, magnesium oxide, tin oxide, titanium oxide, magnesium hydroxide, aluminum hydroxide, glass beads, silicon nitride, barium sulfate, gypsum, calcium silicate, sericite activated clay, or aluminum nitride or organic filler such as fine particles of polyester, polyurethane, a vinyl polymer, an acrylic polymer, or rubber. The shape of the filler is not limited; the filler may be a material having a definite shape such as spheres, needles, or plates or an amorphous material.

The curable resin composition that contains a compound that has at least one epoxy group may contain fine particles of resin.

The fine particles of resin have a core particle made from a resin that is rubbery and has a glass transition temperature of −10° C. or less and a shell layer that has been formed on the surface of the core particle and is made from a resin with a glass transition temperature of 50° C. to 150° C.

Unless otherwise defined, the grass transition temperatures herein refer to those measured using the ordinary DSC method under 10° C./min temperature ramp conditions.

The resin that is rubbery and has a glass transition temperature of −10° C. or less can be of any kind but preferably is a polymer of a (meth)acrylic monomer.

The (meth)acrylic monomer can be, for example, ethyl acrylate, propyl acrylate, n-butyl acrylate, cyclohexyl acrylate, 2-ethylhexyl acrylate, ethyl methacrylate, or butyl methacrylate. These (meth)acrylic monomers can be polymerized alone, and it is also possible to copolymerize two or more.

The resin with a glass transition temperature of 50° C. to 150° C. can be of any kind and can be, for example, a polymer resulting from the polymerization of a monomer such as isopropyl methacrylate, t-butyl methacrylate, cyclohexyl methacrylate, phenyl methacrylate, methyl methacrylate, styrene, 4-chlorostyrene, 2-ethylstyrene, acrylonitrile, or vinyl chloride. These monomers can be used alone, and it is also possible to use two or more in combination.

The particle diameters of the fine particles of resin are selected as appropriate for the purpose of use. However, a preferred lower limit is 0.01 μm, and a preferred upper limit is 5 μm. With particle diameters in this range, the fine particles of resin have sufficiently large surface areas compared with the photocurable resin that ensure advantageous effects of the swelling of the core layer, and do not affect the ease of controlling the gap between the substrates when the resin is used as a sealant for liquid crystal displays.

The method for producing the fine particles of resin is not limited and can be, for example, one in which the core particles are formed by emulsion polymerization using only the monomer as a component of the cores, followed by the addition and polymerization of the monomer as a component of the shell to form the shell layer on the surfaces of the core particles.

A preferred lower limit of the amount of the fine particles of resin in the curable resin composition is 15 parts by weight per 100 parts by weight of the photocurable resin, and a preferred upper limit is 50 parts by weight. When their amount is less than 15 parts by weight, the fine particles of resin may fail to be sufficiently effective in improving adhesiveness. When their amount exceeds 50 parts by weight, the fine particles of resin may increase viscosity more than needed. A more preferred upper limit is 20 parts by weight.

The curable resin composition that contains a compound that has at least one epoxy resin per molecule, which cures upon exposure to heat, preferably cures only when exposed to heat.

(Alignment Layer)

In a liquid crystal display according to the present invention, there may be used an alignment layer for aligning the liquid crystal composition on the first substrate and on the surface of the second substrate where it is in contact with the liquid crystal composition.

The alignment layers can be made of a transparent organic material such as polyimide, polyamide, BCB (benzocyclobutene polymer), or polyvinyl alcohol. Particularly preferred are polyimide alignment layers resulting from the imidization of a polyamic acid, which is synthesized from a diamine such as an aliphatic or alicyclic diamine, e.g., p-phenylenediamine or 4,4'-diaminodiphenylmethane and an aliphatic or alicyclic tetracarboxylic anhydride such as butane tetracarboxylic anhydride or 2,3,5-tricarboxycyclopentyl acetic anhydride or an aromatic tetracarboxylic anhydride such as pyromellitic dianhydride. The method used to give alignment in this case is usually rubbing, but the photodegradation-based light alignment technology can also be used. The layers may be used without alignment given when used in a vertical alignment or similar layer.

The alignment layers can be made of a material that contains a component such as chalcone, cinnamate, cinnamoyl, or azo in the compound. Such a material may be used in combination with materials such as polyimide and polyamide. In this case, the alignment layers may use rubbing and may also use the light alignment technology.

For the alignment layers, it is typical to form resin layers on the substrates by applying such a material for the alignment layers using a method such as spin coating. However, methods such as uniaxial drawing and the Langmuir-Blodgett technique can also be used.

(Transparent Electrodes)

In a liquid crystal display according to the present invention, the transparent electrodes can be made of a conductive metal oxide. The metal oxide can be a material such as indium oxide ($In_2O_3$), tin oxide ($SnO_2$), zinc oxide (ZnO), indium tin oxide ($In_2O_3$—$SnO_2$), indium zinc oxide ($In_2O_3$—ZnO), niobium-doped titanium dioxide ($Ti_{1-x}Nb_xO_2$), fluorine-doped tin oxide, graphene nanoribbons, or metal nanowires, preferably zinc oxide (ZnO), indium tin oxide ($In_2O_3$—$SnO_2$), or indium zinc oxide ($In_2O_3$—ZnO). These transparent conductive films can be patterned using methods such as photoetching and mask methods.

Liquid crystal displays according to the present invention are useful particularly to liquid crystal displays for active matrix drive and applicable to liquid crystal displays for the VA, PSVA, PSA, IPS, FFS, or ECB mode.

A combination of this liquid crystal display and a backlight can be used in various applications including liquid crystal televisions, monitors for personal computer, displays for mobile phones and smartphones, laptops, personal digital assistants, and digital signage. Available backlights include cold-cathode-tube backlights as well as two-peak-wavelength pseudo-white and three-peak-wavelength backlights, in which light-emitting diodes based on inorganic materials or organic EL devices are used.

EXAMPLES

The following describes the prevent invention in further detail by providing examples. However, the present invention is not limited to these examples. The "%" in the compositions in Examples and Comparative Examples below means '% by mass.'

The following characteristics were measured in Examples.

$T_{n1}$: Nematic-isotropic liquid phase transition temperature (° C.)

Δn: Refractive-index anisotropy at 25° C.

ΔE: Dielectric anisotropy at 25° C.

η: Viscosity at 20° C. (mPa·s)

γ1: Rotational viscosity at 25° C. (mPa·s)

VHR: Voltage holding ratio at 70° C. (%)

(the % representation of the ratio of a voltage determined by applying 5 V to the liquid crystal composition into a 3.5-μm thick cell and measuring the voltage under 200-ms frame time and 64-μs pulse width conditions to the initial voltage)

Alignment Irregularities:

The level of alignment irregularity at the point of contact between the sealant and liquid crystals was visually evaluated on the following four-grade scale in the on and off states.

⊙ No alignment irregularity
○ Minor and acceptable level of alignment irregularity
Δ Obvious and unacceptable level of alignment irregularity
× Considerably serious alignment irregularity Image-Sticking:

To test the liquid crystal display for image-sticking, a predetermined fixed pattern was displayed in its display area for 1000 hours and then a solid image across the full screen. The level of persistence of the fixed pattern was evaluated on the following four-grade scale.
⊙ No image persistence
○ Minor and acceptable level of image persistence
Δ Obvious and unacceptable level of image persistence
× Considerably serious image persistence Volume Resistivity of Cured Sealant:

On the chromium-coated surface of a chromium-coated glass substrate, a thin and uniform coating of the sealant was cured using ultraviolet radiation to form an ultraviolet-cured material with a size of 85 mm×85 mm and a thickness of 3 m. A chromium-coated glass substrate was placed on this with its chromium-coated surface on the ultraviolet-cured material side and pressed. The substrates were heat-bonded on a hotplate at 120° C. for 1 hour to obtain a test sample. For this test sample, the area of the sealant (S (cm²)) and the current (A (A)) that flowed when a constant voltage (V (V)) was applied across the chromium-coated surfaces of the facing chromium-coated glass substrates using a constant-voltage generator (Kenwood PA36-2A regulated DC power supply) were measured using an ammeter (Advantest R644C digital multimeter). Assuming the thickness of the coating of the sealant (T (cm)), the volume resistivity (Ω·cm) was determined according to the following formula: Volume resistivity (Ω·cm)=(V·S)/(A·T), where the voltage applied was 500 V DC, and the duration of application was 1 minute.

Specific Resistance of Uncured Sealant:

The specific resistance of the sealant in the uncured state was measured under standard temperature and humidity conditions (20° C. and 65% RH) using a specific-resistance tester (Toyo Technica SR-6517) and liquid electrodes (Ando Electric LE-21).

In Examples, the following abbreviations are used to describe compounds.

(Ring Structures)

[Chem. 21]

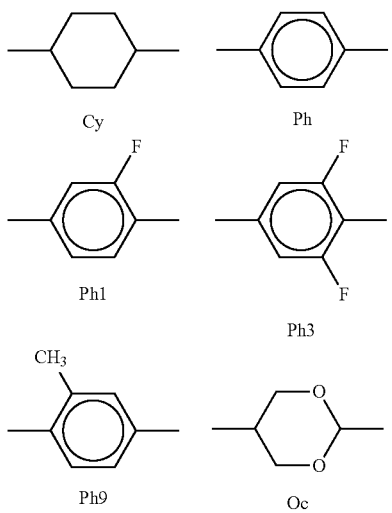

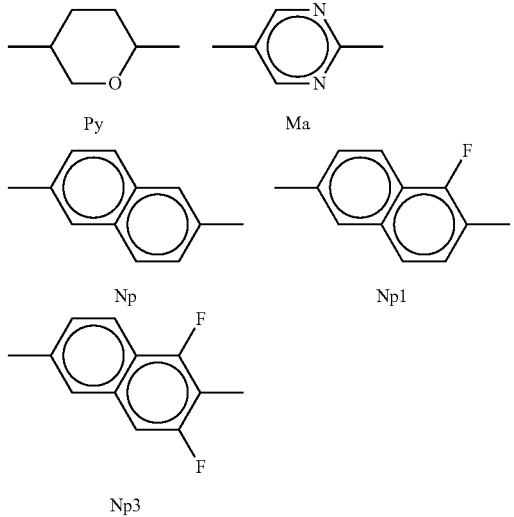

(Side-Chain and Linking Structures)

TABLE 1

| Terminal n (number) | $C_nH_{2n+1}$— |
|---|---|
| -2- | —$CH_2CH_2$— |
| -1O— | —$CH_2O$— |
| —O1- | —$OCH_2$— |
| —V— | —CO— |
| —VO— | —COO— |
| —CFFO— | —$CF_2O$— |
| —F | —F |
| —Cl | —Cl |
| —CN | —C≡N |
| —OCFFF | —$OCF_3$ |
| —CFFF | —$CF_3$ |
| —On | —$OC_nH_{2n+1}$— |
| -T- | —C≡C— |
| —N— | —CH=N—N=CH— |
| ndm- | $C_nH_{2n+1}$—HC=CH—$(CH_2)_{m-1}$— |
| -ndm | —$(CH_2)_{n-1}$—HC=CH—$C_mH_{2m+1}$ |
| ndmO— | $C_nH_{2n+1}$—HC=CH—$(CH_2)_{m-1}$O— |
| —Ondm | —O—$(CH_2)_{n-1}$—HC=CH—$C_mH_{2m+1}$ |
| -ndm- | —$(CH_2)_{n-1}$—HC=CH—$(CH_2)_{m-1}$— |

[Production of the Curable Resin Composition]

(Synthesis Example A) Synthesis of a Modified Epoxy Resin (A)

Solvent was heated to reflux temperature while purging with nitrogen. To this solvent, a liquid mixture was added dropwise over 5 hours in which 100 parts by weight of glycidyl methacrylate, 40 parts by weight of methyl methacrylate, 20 parts by weight of hydroxyethyl methacrylate, 40 parts by weight of styrene, 200 parts by weight of normal-butyl methacrylate, and 40 parts by weight of polymerization initiator (NOF Corporation PERBUTYL 0; 10-hour half-life temperature, 72.1° C.; t-butyl peroxy-2-ethylhexanoate) had been dissolved. The resulting mixture was maintained at 100° C. for 5 hours. One hundred parts by weight of the resulting resin, the reaction product was filtered through a column packed with 30 parts by weight of a natural mixture of quartz and kaolinite (Hoffmann Mineral Sillitin V85) to adsorb ionic impurities in the reaction product, and the solvent was removed to give a modified epoxy resin (A) that contained glycidyl and hydroxy groups.

The modified epoxy resin (A) had a weight-average molecular weight Mw (as measured by GPC) of 4020, an epoxy equivalent weight of 640 g/eq, and a hydrogen-bonding functional group value of $3.4 \times 10^{-4}$ mol/g.

(Synthesis Example B) Synthesis of an Acryl-Modified Epoxy Resin (B)

A uniform solution of 100 parts by weight of bisphenol F epoxy resin (Nippon Steel Chemical YDF-8170C), 22.5 parts by weight of acrylic acid, and 0.125 parts by weight of triethanolamine in solvent was refluxed with stirring at 110° C. for 5 hours. One hundred parts by weight of the resulting resin was filtered through a column packed with 30 parts by weight of a natural mixture of quartz and kaolinite (Hoffmann Mineral Sillitin V85) to adsorb ionic impurities in the reaction product, and the solvent was removed to give an acryl-modified epoxy resin (B).

The acryl-modified epoxy resin (B) had a weight-average molecular weight Mw (as measured by GPC) of 392 and a hydrogen-bonding functional group value of $2.6 \times 10^{-3}$ mol/g. The carbon-carbon double bond content was $2.6 \times 10^{-3}$ mol/g.

(Synthesis Example C) Synthesis of a Monoacrylate-Modified Epoxy Resin (C)

A uniform solution of 100 parts by weight of bisphenol F epoxy resin (Nippon Steel Chemical YDF-8170C), 22.5 parts by weight of acrylic acid, and 0.125 parts by weight of triethanolamine in solvent was refluxed with stirring at 110° C. for 5 hours. One hundred parts by weight of the resulting resin was filtered through a column packed with 30 parts by weight of a natural mixture of quartz and kaolinite (Hoffmann Mineral Sillitin V85) to adsorb ionic impurities in the reaction product, and the solvent was removed to give a monoacrylate-modified epoxy resin (C).

The monoacrylate-modified epoxy resin (C) had a weight-average molecular weight Mw (as measured by GPC) of 398, a hydrogen-bonding functional group value of $2.5 \times 10^{-3}$ mol/g, and a carbon-carbon double bond content of $2.5 \times 10^{-3}$ mol/g.

(Synthesis Example D) Synthesis of a Diacrylate-Modified Epoxy Resin (D)

A uniform solution of 100 parts by weight of bisphenol F epoxy resin (Nippon Steel Chemical YDF-8170C), 45 parts by weight of acrylic acid, and 0.20 parts by weight of triethanolamine in solvent was refluxed with stirring at 110° C. for 5 hours. One hundred parts by weight of the resulting resin was filtered through a column packed with 30 parts by weight of a natural mixture of quartz and kaolinite (Hoffmann Mineral Sillitin V85) to adsorb ionic impurities in the reaction product, and the solvent was removed to give a diacrylate-modified epoxy resin (D).

The diacrylate-modified epoxy resin (D) had a weight-average molecular weight Mw (as measured by GPC) of 484, a hydrogen-bonding functional group value of $4.3 \times 10^{-3}$ mol/g, and a carbon-carbon double bond content of $4.3 \times 10^{-3}$ mol/g.

(Synthesis Example E) Synthesis of a Diacrylate-Modified Epoxy Resin (E)

A uniform solution of 117 parts by weight of resorcinol diglycidyl ether (Nagase ChemteX DENACOL EX-201; epoxy equivalent weight, 117 eq/g), 79 parts by weight of acrylic acid, and 1 part by weight of tertiary-butyl ammonium bromide was stirred at 90° C. for 2 hours and then stirred under reflux for another 6 hours to react. The reaction solution was then water-washed with ultrapure water, and the solvent was removed. One hundred parts by weight of the resulting resin was filtered through a column packed with 30 parts by weight of a natural mixture of quartz and kaolinite (Hoffmann Mineral Sillitin V85) to adsorb ionic impurities in the reaction product, and the solvent was removed to give a diacrylate-modified epoxy resin (E).

The diacrylate-modified epoxy resin (E) had a weight-average molecular weight Mw (as measured by GPC) of 366, a hydrogen-bonding functional group value of $5.3 \times 10^{-3}$ mol/g, and a carbon-carbon double bond content of $5.3 \times 10^{-3}$ mol/g.

(Synthesis Example F) Synthesis of a Diacrylate-Modified Epoxy Resin (F)

A uniform solution of 100 parts by weight of diphenyl ether epoxy resin (Nippon Steel Chemical: YSLV-80DE; melting point, 84° C.), 0.2 parts by weight of polymerization inhibitor (p-methoxyphenol), 0.2 parts by weight of reaction catalyst (triethylamine), and 40 parts by weight of acrylic acid in solvent was stirred at 80° C. for 2 hours with a blow of air and for 36 hours under reflux to react. The reaction solution was then water-washed with ultrapure water, and the solvent was removed. One hundred parts by weight of the resulting resin was filtered through a column packed with 30 parts by weight of a natural mixture of quartz and kaolinite (Hoffmann Mineral Sillitin V85) to adsorb ionic impurities in the reaction product, and the solvent was removed to give a diacrylate-modified epoxy resin (F).

The diacrylate-modified epoxy resin (F) had a weight-average molecular weight Mw (as measured by GPC) of 459, a hydrogen-bonding functional group value of $3.7 \times 10^{-3}$ mol/g, and a carbon-carbon double bond content of $3.7 \times 10^{-3}$ mol/g.

(Synthesis Example G) Synthesis of a Diacrylate-Modified Epoxy Resin (G)

A uniform solution of 296.2 g (2 moles) of phthalic anhydride, 917.0 g (2 moles) of an adduct of 2-hydroxyethyl acrylate with 6-hexanolide (Daicel Chemical Placcel FA3: molecular weight, 459 g/mol), 4 g of triethylamine, and 0.9 g of hydroquinone in solvent was stirred at 110° C. to react. The reaction temperature was changed to 90° C. when the acid value of the reaction mixture reached 96 mg KOH/g. To this reaction mixture were added 680.82 g (2 moles) of bisphenol A diglycidyl ether and 1.6 g of tetrabutylammonium bromide, and the reaction was allowed to proceed at 90° C. until the acid value of the reaction mixture reached 2 mg KOH/g.

Then 144.1 g (2 moles) of acrylic acid and 1.8 g of hydroquinone were added to the reaction mixture. The mixture was allowed to react at 80° C. for 2 hours while blowing air into the flask, and the reaction was continued at an increased temperature of 90° C. The reaction was allowed to proceed until the acid value of the reaction mixture reached 2 mg KOH/g.

The mixture that had completed the reaction, the reaction solution was water-washed with ultrapure water, and the solvent was removed. One hundred parts by weight of the resulting resin was filtered through a column packed with 30 parts by weight of a natural mixture of quartz and kaolinite (Hoffmann Mineral Sillitin V85) to adsorb ionic impurities in the reaction product, and the solvent was removed to give a diacrylate-modified epoxy resin (G).

The diacrylate-modified epoxy resin (G) had a weight-average molecular weight Mw (as measured by GPC) of 1005, a hydrogen-bonding functional group value of $1.9 \times 10^{-3}$ mol/g, and a carbon-carbon double bond content of $1.9 \times 10^{-3}$ mol/g.

(Synthesis Example H) Synthesis of a Partially Acryl-Modified Epoxy Resin (H)

A uniform solution of 100 parts by weight of diphenyl ether epoxy resin (Nippon Steel Chemical YSLV-80DE; melting point, 84° C.), 0.2 parts by weight of polymerization inhibitor (p-methoxyphenol), 20 parts of acrylic acid, and 0.2 parts by weight of reaction catalyst (triethylamine) in solvent was stirred at 80° C. for 2 hours with a blow of air and for 24 hours under reflux to react.

After the completion of the reaction, the reaction mixture was column-purified and water-washed with ultrapure water, and the solvent was removed. One hundred parts by weight of the resulting resin was filtered through a column packed with 30 parts by weight of a natural mixture of quartz and kaolinite (Hoffmann Mineral Sillitin V85) to adsorb ionic impurities in the reaction product, and the solvent was removed to give a partially acryl-modified epoxy resin (H) in which 50% of epoxy groups had been acrylated.

The partially acryl-modified epoxy resin (H) had a weight-average molecular weight Mw (as measured by GPC) of 386, a hydrogen-bonding functional group value of $2.2 \times 10^{-3}$ mol/g, and a carbon-carbon double bond content of $2.2 \times 10^{-3}$ mol/g.

(Synthesis Example I) Synthesis of a Partially Methacryl-Modified Epoxy Resin (I)

In a solution of 163 parts by weight of bisphenol E epoxy resin R-1710 (Printec) in solvent, 0.5 parts by weight of p-methoxyphenol as a polymerization initiator, 0.5 parts by weight of triethylamine as a reaction catalyst, and 40 parts by weight of methacrylic acid were stirred under reflux at 90° C. for 5 hours with a blow of air to react.

After the completion of the reaction, the reaction mixture was column-purified and water-washed with ultrapure water, and the solvent was removed. One hundred parts by weight of the resulting resin was filtered through a column packed with 30 parts by weight of a natural mixture of quartz and kaolinite (Hoffmann Mineral Sillitin V85) to adsorb ionic impurities in the reaction product, and the solvent was removed to give a partially methacryl-modified epoxy resin (I) in which 50% of epoxy groups had been methacrylated.

The partially methacryl-modified epoxy resin (I) had a weight-average molecular weight Mw (as measured by GPC) of 436, a hydrogen-bonding functional group value of $4.6 \times 10^{-3}$ mol/g, and a carbon-carbon double bond content of $2.3 \times 10^{-3}$ mol/g.

(Synthesis Example J) Synthesis of a Urethane-Modified Methacrylic Epoxy Resin (J)

A mixture of 1100 parts by weight of trimethylolpropane, 1.6 parts by weight of 3,5-dibutyl-4-hydroxytoluene as a polymerization inhibitor, 0.08 parts by weight of dibutyltin dilaurate, and 6080 parts by weight of diphenylmethane diisocyanate was stirred under reflux at 60° C. for 2 hours of reaction. Then 235 parts by weight of 2-hydroxyethyl methacrylate and 910 parts by weight of glycidol were added, and the mixture was stirred under reflux at 90° C. with a blow of air for 2 hours of reaction.

After the completion of the reaction, the reaction mixture was column-purified and water-washed with ultrapure water, and the solvent was removed. One hundred parts by weight of the resulting resin was filtered through a column packed with 30 parts by weight of a natural mixture of quartz and kaolinite (Hoffmann Mineral Sillitin V85) to adsorb ionic impurities in the reaction product, and the solvent was removed to give a urethane-modified methacrylic epoxy resin (J).

The urethane-modified methacrylic epoxy resin (J) had a weight-average molecular weight Mw (as measured by GPC) of 4188, a hydrogen-bonding functional group value of $2.9 \times 10^{-3}$ mol/g, and a carbon-carbon double bond content of $2.2 \times 10^{-4}$ mol/g.

[Production of the Sealant]

<Production of Sealant (1)>

One hundred parts by weight of O-cresol novolac epoxy resin (Nippon Kayaku EOCN-1020-20) was dissolved by heating in 160 parts by weight of the modified epoxy resin (A) to give uniform solution. After cooling, the solution was mixed and stirred with 60 parts by weight of hydrazide hardener (Ajinomoto Fine-Techno AJICURE VDH-J) and 4 parts by weight of imidazole hardener (Shikoku Chemicals CUREZOL 2E4MZ-A) as latent heat-activated hardeners, 72 parts by weight of spherical silica (Admatechs ADMA-FINE AO-802) as filler, and 4 parts by weight of silane coupling agent (γ-glycidoxypropyltrimethoxysilane; Shin-Etsu Chemical KBM-403) as an additive using a planetary mixer and then blended using a ceramic three-roll. The mixture was then degassed and mixed and stirred using a planetary mixer, and this was designated sealant (1). The following are the characteristics of the obtained sealant (1).

Hydrogen-bonding functional group value (mol/g): $2.1 \times 10^{-4}$

Specific resistance of uncured sealant (Ω·cm): $4.8 \times 10$

Volume resistivity of cured sealant (Ω·cm): $1.2 \times 10^{13}$

<Production of Sealant (2)>

A mixture obtained through heating dissolution of 100 parts by weight of O-cresol novolac solid epoxy resin (Nippon Kayaku EOCN-1020-75; epoxy equivalent weight, 215 g/eq), 433 parts by weight of PO-modified trisphenol triacrylate (molecular weight, 802; carbon-carbon double bond content, 0.0037 mol/g), and 217 parts by weight of the acryl-modified epoxy resin (B) was mixed and stirred with 42 parts by weight of hydrazide hardener (Ajinomoto AJICURE VDH) as a latent heat-activated hardener, 167 parts by weight of spherical silica (SEAPHOSTER S-30: Nippon Shokubai) as filler, and 42 parts by weight of fine particles of a methacrylic acid-acryl copolymer (Zeon F-325) using a planetary mixer and then blended using a ceramic three-roll. The mixture was then degassed and mixed and stirred using a planetary mixer, and then, after the addition of 8.3 parts by weight of thermal radical polymerization initiator (ARKEMA Yoshitomi LUPEROX 575; 10-hour half-life temperature, 75° C.), degassed and mixed and stirred using a planetary mixer. This was designated sealant (2). The following are the characteristics of the obtained sealant (2).

Epoxy-to-(meth)acrylic equivalent weight ratio: 31:69

Hydrogen-bonding functional group value (mol/g): $7.4 \times 10^{-4}$

Carbon-carbon double bond content (mol/g): $2.9 \times 10^{-3}$

Specific resistance of uncured sealant (Ω·cm): $7.7 \times 10^{8}$

Volume resistivity of cured sealant (Ω·cm): $1.5 \times 10^{13}$

<Production of Sealant (3)>

One hundred parts by weight of O-cresol novolac epoxy resin (Nippon Kayaku EOCN-1020-55) was dissolved in 700 parts by weight of the monoacrylate-modified epoxy resin (C) by heating at 100° C. for 1 hour to give uniform solution. After cooling, the solution was mixed and stirred with 800 parts by weight of the diacrylate-modified epoxy resin (D), 0.2 parts of para-benzoquinone (Seiko Chemical), 300 parts by weight of spherical silica (ADMAFINE A-802; Admatechs) as inorganic filler, 60 parts by weight of thermal latent epoxy hardener (Ajinomoto AJICURE VDH-J), and 20 parts by weight of silane coupling agent (γ-glycidoxypropyltrimethoxysilane; Shin-Etsu Chemical KBM-403) using a planetary mixer and then blended using a ceramic three-roll. The mixture was then degassed and mixed and stirred using a planetary mixer, and then, after the addition of 20 parts by weight of thermal radical polymerization initiator (Wako Pure Chemical Industries V-601; dimethyl 2,2'-azobis(isobutyrate); 10-hour half-life temperature, 66° C.), degassed and mixed and stirred using a planetary mixer to give 10 parts by weight of sealant (3). The following are the characteristics of the obtained sealant (3).

Epoxy-to-(meth)acrylic equivalent weight ratio: 31:69
Hydrogen-bonding functional group value (mol/g): $3.2 \times 10^{-3}$
Carbon-carbon double bond content (mol/g): $3.2 \times 10^{-3}$
Specific resistance of uncured sealant (Ω·cm): $4.9 \times 10^{9}$
Volume resistivity of cured sealant (Ω·cm): $2.3 \times 10^{13}$ <Production of Sealant (4)>

A mixture of 70 parts by weight of bisphenol A epoxy resin (JER EPIKOTE 828EL; epoxy equivalent weight, 190 g/eq), 10 parts by weight of thermal latent epoxy hardener (Ajinomoto AJICURE VDH), 3 parts by weight of imidazole hardener (2-hydroxymethylimidazole), 30 parts by weight of the acryl-modified epoxy resin (B), 15 parts by weight of silicon dioxide (Nippon Shokubai Kagaku S-100), 20 parts by weight of fine particles of a polymer (Zeon Kasei F325; primary particle diameter, 0.5 μm), and 0.5 parts by weight of silane coupling agent (γ-glycidoxypropyltrimethoxysilane; Shin-Etsu Chemical KBM-403) was mixed and stirred using a planetary mixer and then blended using a ceramic three-roll. The mixture was then degassed and mixed and stirred using a planetary mixer to give sealant (4). The following are the characteristics of the obtained sealant (4).

Epoxy-to-(meth)acrylic equivalent weight ratio: 88:12
Hydrogen-bonding functional group value (mol/g): $7.7 \times 10^{-4}$
Carbon-carbon double bond content (mol/g): $7.7 \times 10^{-4}$
Specific resistance of uncured sealant (Ω·cm): $8.6 \times 10^{13}$
Volume resistivity of cured sealant (Ω·cm): $1.3 \times 10^{13}$ <Production of Sealant (5)>

A mixture of 25 parts by weight of bisphenol A epoxy resin-modified diacrylate (Kyoeisha Chemical EPOXY ESTER 3002A; molecular weight, 600), 70 parts by weight of the acryl-modified epoxy resin (B), 5 parts by weight of o-cresol novolac solid epoxy resin (EOCN-1020-75; Nippon Kayaku; epoxy equivalent weight, 215 g/eq), 5 parts by weight of latent epoxy hardener (Ajinomoto AJICURE VDH; melting point, 120° C.), and 20 parts by weight of spherical silica (Nippon Shokubai SEAPHOSTER S-30) was mixed and stirred using a planetary mixer and then blended using a ceramic three-roll. The mixture was then degassed and mixed and stirred using a planetary mixer, and then, after the addition of 1 part by weight of thermal radical polymerization initiator (ARKEMA Yoshitomi LUPEROX 575; 10-hour half-life temperature, 75° C.), degassed and mixed and stirred using a planetary mixer. This was designated sealant (5). The following are the characteristics of the obtained sealant (5).

Epoxy-to-(meth)acrylic equivalent weight ratio: 43:57
Hydrogen-bonding functional group value (mol/g): $2.6 \times 10^{-3}$
Carbon-carbon double bond content (mol/g): $2.6 \times 10^{-3}$
Specific resistance of uncured sealant (Ω·cm): $3.1 \times 10^{9}$
Volume resistivity of cured sealant (Ω·cm): $2.1 \times 10^{13}$ <Production of Sealant (6)>

Fifteen parts by weight of O-cresol novolac solid epoxy resin (Nippon Kayaku EOCN-1020-75; epoxy equivalent weight, 215 g/eq) and 45 parts by weight of bisphenol A epoxy resin-modified diacrylate (Kyoeisha Chemical EPOXY ESTER 3002A: molecular weight, 600) were dissolved by heating at 100° C. for 1 hour to give uniform solution. This solution was then cooled and thereafter mixed and stirred with 20 parts by weight of the acryl-modified epoxy resin (B), 0.5 parts by weight of radical chain transfer agent (Showa Denko Karenz MT NR-1; 1,3,5-tris(3-mercaptobutyloxyethyl)-1,3,5-triazin-2,4,6(1H,3H,5H)-trione), 15 parts by weight of spherical silica (Nippon Shokubai SEAPHOSTER S-30), 3 parts by weight of latent epoxy hardener (Ajinomoto AJICURE VDH; melting point, 120° C.), and 1 part by weight of silane coupling agent (γ-glycidoxypropyltrimethoxysilane; Shin-Etsu Chemical KBM-403) as an additive using a planetary mixer, blended using a ceramic three-roll, and then degassed and mixed and stirred using a planetary mixer. After the addition of 0.5 parts by weight of thermal radical polymerization initiator (Wako Pure Chemical Industries V-601; dimethyl 2,2'-azobis (isobutyrate); 10-hour half-life temperature, 66° C.), the mixture was degassed and mixed and stirred using a planetary mixer. Sealant (6) was prepared in this way. The following are the characteristics of the obtained sealant (6).

Epoxy-to-(meth)acrylic equivalent weight ratio: 37:63
Hydrogen-bonding functional group value (mol/g): $2.51 \times 10^{-3}$
Carbon-carbon double bond content (mol/g): $2.51 \times 10^{-3}$
Specific resistance of uncured sealant (Ω·cm): $1.3 \times 10^{9}$
Volume resistivity of cured sealant (Ω·cm): $1.9 \times 10^{13}$ <Production of Sealant (7)>

Twenty parts by weight of the diacrylate-modified epoxy resin (E), 25 parts by weight of the diacrylate-modified epoxy resin (F), 25 parts by weight of the diacrylate modified epoxy resin (G), 25 parts by weight of the partially acryl-modified epoxy resin (H), 5 parts by weight of o-cresol novolac solid epoxy resin (Nippon Kayaku EOCN-1020-75; epoxy equivalent weight, 215 g/eq), 25 parts by weight of spherical silica (Nippon Shokubai SEAPHOSTER S-30), 8 parts by weight of latent epoxy hardener (Ajinomoto Fine-Techno AJICURE VDH), and 2 parts by weight of fine particles of a methacrylic acid-acryl copolymer (Zeon F-325) were mixed and stirred using a planetary mixer, blended using a ceramic three-roll, and then degassed and mixed and stirred using a planetary mixer. After the addition of 1 part by weight of thermal radical polymerization initiator (Wako Pure Chemical Industries V-65; 2,2'-azobis (2,4-dimethylvaleronitrile); 10-hour half-life temperature, 51° C.), the mixture was degassed and mixed and stirred using a planetary mixer. Sealant (7) was prepared in this way. The following are the characteristics of the obtained sealant (7).

Epoxy-to-(meth)acrylic equivalent weight ratio: 19:81
Carbon-carbon double bond content (mol/g): $3.01 \times 10^{-3}$
Hydrogen-bonding functional group value (mol/g): $3.01 \times 10^{-3}$
Specific resistance of uncured sealant (Ω·cm): $3.5 \times 10^9$
Volume resistivity of cured sealant (Ω·cm): $2.2 \times 10^{13}$ <Production of Sealant (8)>

Fifty parts by weight of the partially methacryl-modified epoxy resin (I), 50 parts by weight of the urethane-modified methacrylic epoxy resin (J), 35 parts by weight of spherical silica (Admatechs SO-C1), 8 parts by weight of latent epoxy hardener (Ajinomoto Fine-Techno AJICURE VDH), 1.5 parts by weight of silane coupling agent ((Shin-Etsu Chemical; γ-glycidoxypropyltrimethoxysilane; KBM5103), and fine particles of a methacrylic acid-acryl copolymer (Zeon F-325) were mixed and stirred using a planetary mixer, blended using a ceramic three-roll, and then degassed and mixed and stirred using a planetary mixer. After the addition of 0.5 parts by weight of thermal radical polymerization initiator (Wako Pure Chemical Industries V-65; 10-hour half-life temperature, 51° C.), the mixture was degassed in a vacuum and mixed and stirred using a planetary mixer. Sealant (8) was prepared in this way. The following are the characteristics of the obtained sealant (8).

Epoxy-to-(meth)acrylic equivalent weight ratio: 60:40
Carbon-carbon double bond content (mol/g): $1.26 \times 10^{-3}$
Hydrogen-bonding functional group value (mol/g): $3.75 \times 10^{-3}$
Specific resistance of uncured sealant (Ω·cm): $1.2 \times 10^9$
Volume resistivity of cured sealant (Ω·cm): $1.8 \times 10^{13}$ <Production of Comparative Sealant (C1)>

A curable resin composition consisting of 35 parts by weight of urethane acrylate (Kyoeisha Chemical AH-600), 15 parts by weight of 2-hydroxybutyl acrylate, 50 parts by weight of isobornyl acrylate, and 0.5 parts by weight of thermal radical polymerization initiator (Wako Pure Chemical Industries V-65; 10-hour half-life temperature, 51° C.) was prepared, stirred using a planetary mixer, and then uniformly blended using a ceramic three-roll to give a photocurable comparative sealant (C1). The following are the characteristics of the obtained comparative sealant (C1).

Hydrogen-bonding functional group value: $2.2 \times 10^{-5}$
Specific resistance of uncured sealant (Ω·cm): $5.0 \times 10^{-5}$
Volume resistivity of cured sealant (Ω·cm): $2.3 \times 10^6$ <Production of Comparative Sealant (C2)>

A curable resin composition consisting of 50 parts by weight of bisphenol A epoxy resin (Mitsubishi Chemical jER828US) and 25 parts by weight of hydrazide hardener (Nippon Hydrazine Kogyo NDH) was prepared, stirred using a planetary mixer, and then uniformly blended using a ceramic three-roll to give comparative sealant (C2). The following are the characteristics of the obtained comparative sealant (C2).

Hydrogen-bonding functional group value: $2.7 \times 10^{-7}$
Specific resistance of uncured sealant (Ω·cm): $5.0 \times 10^{10}$
Volume resistivity of cured sealant (Ω·cm): $3.0 \times 10^{13}$ Examples 1 to 8

Transparent electrodes were formed on a first substrate, and a black matrix (BM) was formed on a second substrate. After the formation of a horizontal alignment layer (AL-1051) on the facing sides of the respective substrates, alignment was performed. Sealants (1) to (8) loaded into dispensing syringes, and bubbles were removed. Each of the sealants was then applied to the alignment layer side of the first substrate to draw a rectangular frame. Droplets of liquid crystal composition 1 as defined in a table below were applied to the entire area inside the frame on the first substrate with the sealant uncured, and the second substrate was immediately bonded at a vacuum of 5 Pa using a vacuum bonding system. After the vacuum was released, display conditions and the substrate gap were adjusted to make the width of the lines of the compressed sealant approximately 1.2 mm with 0.3 mm thereof overlapping with the BM. The bonded liquid crystal display was immediately heated in a thermostat at 150° C. for 90 minutes to perform thermal curing. In this way, IPS liquid crystal displays of Examples 1 to 8 were produced ($d_{gap}$=4.0 μm). The obtained liquid crystal displays were subjected to the measurement of VHR. Furthermore, the obtained liquid crystal displays were tested for alignment irregularities and image-sticking. The results are summarized in tables below.

TABLE 2

| Liquid crystal composition 1 | |
| --- | --- |
| Compound | Amount (%) |
| 3-Cy-Cy-1d0 | 48 |
| 3-Cy-Cy-1d1 | 4 |
| 1-Ph—Ph-3d1 | 8 |
| 3-Cy-Ph—Ph-2 | 5 |
| 2-Ph—Ph1—Ph-3 | 5 |
| 3-Ph—Ph3—CFFO—Ph3—F | 2 |
| 3-Cy-Cy-CFFO—Ph3—F | 3 |
| 3-Ph—Ph1—Ph3—CFFO—Ph3—F | 7 |
| 4-Cy-Cy-Ph3—CFFO—Ph3—F | 5 |
| 2-Pr—Ph—Ph3—CFFO—Ph3—F | 6 |
| 3-Pr—Ph—Ph3—CFFO—Ph3—F | 7 |
| Tni/° C. | 75.5 |
| Δn | 0.112 |
| Δε | 3.5 |
| η/mPa · s | 13.8 |

TABLE 3

| | Example 1 | Example 2 | Example 3 | Example 4 | Example 5 |
| --- | --- | --- | --- | --- | --- |
| Liquid crystal composition | Liquid crystal composition 1 | Liquid crystal composition 1 | Liquid crystal composition 1 | Liquid crystal composition 1 | Liquid crystal composition 1 |
| Sealant | Sealant (1) | Sealant (2) | Sealant (3) | Sealant (4) | Sealant (5) |
| VHR | 99.2 | 99.3 | 99.6 | 99.2 | 99.5 |

TABLE 3-continued

|  | Example 1 | Example 2 | Example 3 | Example 4 | Example 5 |
|---|---|---|---|---|---|
| Alignment irregularities | ○ | ⊙ | ⊙ | ○ | ⊙ |
| Image-sticking | ○ | ○ | ⊙ | ⊙ | ⊙ |

TABLE 4

|  | Example 6 | Example 7 | Example 8 |
|---|---|---|---|
| Liquid crystal composition | Liquid crystal composition 1 | Liquid crystal composition 1 | Liquid crystal composition 1 |
| Sealant | Sealant (6) | Sealant (7) | Sealant (8) |
| VHR | 99.4 | 99.5 | 99.3 |
| Alignment irregularities | ○ | ⊙ | ○ |
| Image-sticking | ⊙ | ⊙ | ⊙ |

It can be understood that liquid crystal composition 1 had a temperature range of the liquid crystal layer practical for use as a liquid crystal composition for TVs, 75.5° C., a large absolute dielectric anisotropy, low viscosity, and an appropriate Δn.

The liquid crystal displays of Examples 1 to 8 achieved high VHRs. In the alignment irregularity testing, furthermore, there was no or only a minor and acceptable level of alignment irregularity observed. In the image-sticking testing, likewise, there was no or only a minor and acceptable level of image persistence observed.

Examples 9 to 24

In the same way as in Example 1, liquid crystal compositions 2 and 3 as defined in tables below were sandwiched, liquid crystal displays of Examples 9 to 24 were produced using sealants (1) to (8), and their VHRs were measured. The liquid crystal displays were also tested for alignment irregularities and image-sticking. The results are summarized in tables below.

TABLE 5

| Compound | Amount (%) |
|---|---|
| Liquid crystal composition 2 | |
| 4-Cy-Cy-1d0 | 15 |
| 0d1-Cy-Cy-Ph-1 | 4 |
| 0d3-Cy-Cy-Ph-1 | 14 |

TABLE 5-continued

| Compound | Amount (%) |
|---|---|
| 3-Cy-Ph—Ph-Cy-3 | 3 |
| 3-Cy-Ph—Ph1-Cy-3 | 4 |
| 1-Cy-Cy-Ph3—F | 9 |
| 2-Cy-Ph—Ph3—F | 10 |
| 3-Cy-Ph—Ph3—F | 10 |
| 5-Cy-Ph—Ph3—F | 5 |
| 0d1-Cy-Cy-Ph1—F | 8 |
| 3-Cy-Cy-Ph1—Ph3—F | 8 |
| 2-Ph—Ph3—CFFO—Ph3—F | 4 |
| 3-Ph—Ph3—CFFO—Ph3—F | 6 |
| Tni/° C. | 100.7 |
| Δn | 0.094 |
| Δε | 8.0 |
| γ1/mPa·s | 108 |
| η/mPa·s | 22.2 |
| Liquid crystal composition 3 | |
| 5-Cy-Cy-1d0 | 5 |
| 3-Cy-Cy-1d1 | 10 |
| 0d1-Cy-Cy-Ph-1 | 8 |
| 5-Cy-Cy-Ph—O1 | 6 |
| 2-Ph—Ph1—Ph-3 | 8 |
| 2-Cy-Cy-Ph3—F | 11 |
| 3-Cy-Cy-Ph3—F | 15 |
| 5-Cy-Cy-Ph3—F | 5 |
| 3-Cy-Ph—Ph3—F | 6 |
| 3-Cy-Ph—Ph1—F | 9 |
| 4-Cy-Cy-Ph—OCFFF | 4 |
| 3-Cy-Cy-CFFO—Ph3—F | 7 |
| 5-Cy-Cy-CFFO—Ph3—F | 4 |
| 3-Cy-Cy-Ph1—Ph3—F | 2 |
| Tni/° C. | 103.2 |
| Δn | 0.102 |
| Δε | 7.1 |
| γ1/mPa·s | 96 |
| η/mPa·s | 20.8 |

TABLE 6

|  | Example 9 | Example 10 | Example 11 | Example 12 | Example 13 |
|---|---|---|---|---|---|
| Liquid crystal composition | Liquid crystal composition 2 | Liquid crystal composition 2 | Liquid crystal composition 2 | Liquid crystal composition 2 | Liquid crystal composition 2 |
| Sealant | Sealant (1) | Sealant (2) | Sealant (3) | Sealant (4) | Sealant (5) |
| VHR | 99.1 | 99.2 | 99.5 | 99.1 | 99.4 |
| Alignment irregularities | ○ | ⊙ | ⊙ | ○ | ⊙ |
| Image-sticking | ○ | ○ | ⊙ | ○ | ⊙ |

TABLE 7

|  | Example 14 | Example 15 | Example 16 |
|---|---|---|---|
| Liquid crystal composition | Liquid crystal composition 2 | Liquid crystal composition 2 | Liquid crystal composition 2 |
| Sealant | Sealant (6) | Sealant (7) | Sealant (8) |
| VHR | 99.3 | 99.5 | 99.3 |
| Alignment irregularities | ◯ | ⊙ | ⊙ |
| Image-sticking | ⊙ | ⊙ | ◯ |

TABLE 8

|  | Example 17 | Example 18 | Example 19 | Example 20 | Example 21 |
|---|---|---|---|---|---|
| Liquid crystal composition | Liquid crystal composition 3 | Liquid crystal composition 3 | Liquid crystal composition 3 | Liquid crystal composition 3 | Liquid crystal composition 3 |
| Sealant | Sealant (1) | Sealant (2) | Sealant (3) | Sealant (4) | Sealant (5) |
| VHR | 99.0 | 99.2 | 99.5 | 99.2 | 99.4 |
| Alignment irregularities | ◯ | ⊙ | ⊙ | ◯ | ⊙ |
| Image-sticking | ◯ | ◯ | ⊙ | ◯ | ⊙ |

TABLE 9

|  | Example 22 | Example 23 | Example 24 |
|---|---|---|---|
| Liquid crystal composition | Liquid crystal composition 3 | Liquid crystal composition 3 | Liquid crystal composition 3 |
| Sealant | Sealant (6) | Sealant (7) | Sealant (8) |
| VHR | 99.3 | 99.4 | 99.3 |
| Alignment irregularities | ⊙ | ⊙ | ⊙ |
| Image-sticking | ⊙ | ⊙ | ◯ |

It can be understood that liquid crystal compositions 2 and 3 had a temperature range of the liquid crystal layer practical for use as a liquid crystal composition for TVs, a large absolute dielectric anisotropy, low viscosity, and an appropriate Δn.

The liquid crystal displays of Examples 9 to 24 achieved high VHRs. In the alignment irregularity testing, furthermore, there was no or only a minor and acceptable level of alignment irregularity observed. In the image-sticking testing, likewise, there was no or only a minor and acceptable level of image persistence observed.

Examples 25 to 48

In the same way as in Example 1, liquid crystal compositions 4 to 6 as defined in tables below were sandwiched, liquid crystal displays of Examples 25 to 48 were produced using sealants (1) to (8), and their VHRs and IDs were measured. The liquid crystal displays were also tested for alignment irregularities and image-sticking. The results are summarized in tables below.

TABLE 10

| Compound | Amount (%) |
|---|---|
| Liquid crystal composition 4 | |
| 5-Cy-Cy-1d0 | 15 |
| 3-Cy-Cy-1d1 | 2 |
| 0d1-Cy-Cy-Ph-1 | 12 |
| 2-Ph—Ph1—Ph-3 | 3 |
| 2-Ph—Ph1—Ph-4 | 3 |
| 2-Cy-Cy-Ph3—F | 8 |
| 2-Cy-Ph—Ph3—F | 3 |

TABLE 10-continued

| Compound | Amount (%) |
|---|---|
| 3-Cy-Ph—Ph3—F | 9 |
| 4-Cy-Cy-Ph—OCFFF | 14 |
| 3-Ph—Ph3—CFFO—Ph3—F | 11 |
| 2-Cy-Cy-CFFO—Ph3—F | 9 |
| 3-Cy-Cy-CFFO—Ph3—F | 8 |
| 3-Cy-Cy-Ph1—Ph3—F | 3 |
| Tni/° C. | 90.2 |
| Δn | 0.098 |
| Δε | 9.1 |
| γ1/mPa · s | 90 |
| η/mPa · s | 18.1 |
| Liquid crystal composition 5 | |
| 5-Cy-Cy-1d0 | 10 |
| 3-Cy-Cy-1d1 | 5 |
| 0d1-Cy-Cy-Ph-1 | 8 |
| 0d3-Cy-Cy-Ph-1 | 12 |
| 2-Ph—Ph1—Ph-5 | 2 |
| 3-Cy-Ph—Ph-Cy-3 | 3 |
| 3-Cy-Ph—Ph1-Cy-3 | 3 |
| 1-Cy-Cy-Ph3—F | 9 |
| 2-Cy-Cy-Ph3—F | 10 |
| 3-Cy-Cy-Ph3—F | 6 |
| 5-Cy-Cy-Ph3—F | 5 |
| 0d1-Cy-Cy-Ph1—F | 8 |
| 2-Ph—Ph3—CFFO—Ph3—F | 4 |
| 3-Ph—Ph3—CFFO—Ph3—F | 6 |
| 3-Cy-Cy-Ph1—Ph3—F | 9 |
| Tni/° C. | 110.0 |
| Δn | 0.099 |
| Δε | 8.3 |
| γ1/mPa · s | 112 |
| η/mPa · s | 23.4 |
| Liquid crystal composition 6 | |
| 5-Cy-Cy-1d0 | 12 |
| 3-Cy-Cy-1d1 | 25 |
| 3-Cy-Cy-1d1 | 12 |
| 0d1-Cy-Cy-Ph-1 | 4 |
| 0d3-Cy-Cy-Ph-1 | 9 |
| 2-Ph—Ph1—Ph3—F | 5 |
| 3-Ph—Ph1—Ph3—F | 9 |
| 2-Ph—Ph3—CFFO—Ph3—F | 4 |
| 3-Ph—Ph3—CFFO—Ph3—F | 6 |
| 3-Cy-Cy-CFFO—Ph3—F | 2 |
| 5-Cy-Cy-CFFO—Ph3—F | 3 |
| 3-Cy-Cy-Ph1—Ph3—F | 9 |
| Tni/° C. | 77.4 |
| Δn | 0.101 |
| Δε | 7.0 |
| γ1/mPa · s | 86 |
| η/mPa · s | 14.2 |

TABLE 11

|  | Example 25 | Example 26 | Example 27 | Example 28 | Example 29 |
|---|---|---|---|---|---|
| Liquid crystal composition | Liquid crystal composition 4 | Liquid crystal composition 4 | Liquid crystal composition 4 | Liquid crystal composition 4 | Liquid crystal composition 4 |
| Sealant | Sealant (1) | Sealant (2) | Sealant (3) | Sealant (4) | Sealant (5) |
| VHR | 99.0 | 99.2 | 99.6 | 99.1 | 99.5 |
| Alignment irregularities | ○ | ○ | ⊙ | ○ | ⊙ |
| Image-sticking | ○ | ○ | ⊙ | ○ | ○ |

TABLE 12

|  | Example 30 | Example 31 | Example 32 |
|---|---|---|---|
| Liquid crystal composition | Liquid crystal composition 4 | Liquid crystal composition 4 | Liquid crystal composition 4 |
| Sealant | Sealant (6) | Sealant (7) | Sealant (8) |
| VHR | 99.4 | 99.6 | 99.2 |
| Alignment irregularities | ⊙ | ⊙ | ○ |
| Image-sticking | ○ | ⊙ | ⊙ |

TABLE 13

|  | Example 33 | Example 34 | Example 35 | Example 36 | Example 37 |
|---|---|---|---|---|---|
| Liquid crystal composition | Liquid crystal composition 5 | Liquid crystal composition 5 | Liquid crystal composition 5 | Liquid crystal composition 5 | Liquid crystal composition 5 |
| Sealant | Sealant (1) | Sealant (2) | Sealant (3) | Sealant (4) | Sealant (5) |
| VHR | 90.0 | 99.2 | 99.5 | 99.1 | 99.4 |
| Alignment irregularities | ○ | ○ | ⊙ | ○ | ⊙ |
| Image-sticking | ○ | ⊙ | ⊙ | ○ | ⊙ |

TABLE 14

|  | Example 38 | Example 39 | Example 40 |
|---|---|---|---|
| Liquid crystal composition | Liquid crystal composition 5 | Liquid crystal composition 5 | Liquid crystal composition 5 |
| Sealant | Sealant (6) | Sealant (7) | Sealant (8) |
| VHR | 99.4 | 99.5 | 99.2 |
| Alignment irregularities | ○ | ⊙ | ○ |
| Image-sticking | ⊙ | ⊙ | ⊙ |

TABLE 15

|  | Example 41 | Example 42 | Example 43 | Example 44 | Example 45 |
|---|---|---|---|---|---|
| Liquid crystal composition | Liquid crystal composition 6 | Liquid crystal composition 6 | Liquid crystal composition 6 | Liquid crystal composition 6 | Liquid crystal composition 6 |
| Sealant | Sealant (1) | Sealant (2) | Sealant (3) | Sealant (4) | Sealant (5) |
| VHR | 99.1 | 99.2 | 99.6 | 99.2 | 99.5 |
| Alignment irregularities | ○ | ⊙ | ⊙ | ⊙ | ⊙ |
| Image-sticking | ○ | ○ | ⊙ | ○ | ⊙ |

TABLE 16

|  | Example 46 | Example 47 | Example 48 |
|---|---|---|---|
| Liquid crystal composition | Liquid crystal composition 6 | Liquid crystal composition 6 | Liquid crystal composition 6 |
| Sealant | Sealant (6) | Sealant (7) | Sealant (8) |
| VHR | 99.4 | 99.6 | 99.4 |
| Alignment irregularities | ⊙ | ⊙ | ⊙ |
| Image-sticking | ⊙ | ⊙ | ○ |

It can be understood that liquid crystal compositions 4 to 6 had a temperature range of the liquid crystal layer practical for use as a liquid crystal composition for TVs, a large absolute dielectric anisotropy, low viscosity, and an appropriate Δn.

The liquid crystal displays of Examples 25 to 48 achieved high VHRs. In the alignment irregularity testing, furthermore, there was no or only a minor and acceptable level of alignment irregularity observed. In the image-sticking testing, likewise, there was no or only a minor and acceptable level of image persistence observed.

Examples 49 to 72

Transparent electrodes were formed on first and second substrates, and a black matrix (BM) was formed on the second substrate. After the formation of a horizontal alignment layer (SE-7492) on the facing sides of the respective substrates, alignment was performed. In the same way as in Example 1, liquid crystal compositions 7 to 9 as defined in tables below were sandwiched, TN liquid crystal displays of Examples 49 to 72 were produced using sealants (1) to (8) ($d_{gap}$=3.5 μm), and their VHRs were measured. The liquid crystal displays were also tested for alignment irregularities and image-sticking. The results are summarized in tables below.

TABLE 17

| Compound | Amount (%) |
|---|---|
| Liquid crystal composition 7 | |
| 3-Cy-Cy-1d0 | 38 |
| 3-Cy-Cy-1d1 | 9 |
| 0d1-Cy-Cy-Ph-1 | 16 |
| 0d3-Cy-Cy-Ph-1 | 4 |
| 2-Ph—Ph3—CFFO—Ph3—F | 2 |
| 3-Ph—Ph3—CFFO—Ph3—F | 12 |
| 3-Cy-Cy-CFFO—Ph3—F | 7 |
| 3-Ph—Ph—Ph1—Ph3—F | 1 |
| 3-Ph—Ph1—Ph3—CFFO—Ph3—F | 2 |
| 2-Py-Ph—Ph3—CFFO—Ph3—F | 9 |
| Tni/° C. | 76.0 |
| Δn | 0.097 |
| Δε | 6.8 |
| γ1/mPa · s | 83 |
| η/mPa · s | 14.5 |
| Liquid crystal composition 8 | |
| 3-Cy-Cy-1d0 | 38 |
| 3-Cy-Cy-1d1 | 14 |
| 0d3-Cy-Cy-Ph-1 | 8 |
| 3-Ph—Ph3—CFFO—Ph3—F | 9 |
| 3-Cy-Cy-CFFO—Ph3—F | 15 |
| 3-Ph—Ph1—Ph3—CFFO—Ph3—F | 2 |
| 4-Ph—Ph1—Ph3—CFFO—Ph3—F | 7 |
| 5-Ph—Ph1—Ph3—CFFO—Ph3—F | 7 |
| Tni/° C. | 81.8 |
| Δn | 0.099 |
| Δε | 8.0 |
| γ1/mPa · s | 83 |
| η/mPa · s | 14.6 |
| Liquid crystal composition 9 | |
| 3-Cy-Cy-1d0 | 30 |
| 3-Cy-Cy-1d1 | 17 |
| 0d1-Cy-Cy-Ph-1 | 7 |
| 0d3-Cy-Cy-Ph-1 | 7 |
| 3-Cy-Cy-Ph-2 | 2 |
| 2-Ph—Ph1—Ph-4 | 2 |
| 2-Ph—Ph1—Ph3—F | 8 |
| 3-Ph—Ph1—Ph3—F | 12 |
| 3-Ph—Ph3—Ph3—F | 4 |
| 3-Cy-Cy-Ph1—CFFO—Ph3—F | 11 |
| Tni/° C. | 75.0 |
| Δn | 0.112 |
| Δε | 8.7 |
| γ1/mPa · s | 87 |
| η/mPa · s | 15.2 |

TABLE 18

| | Example 49 | Example 50 | Example 51 | Example 52 | Example 53 |
|---|---|---|---|---|---|
| Liquid crystal composition | Liquid crystal composition 7 | Liquid crystal composition 7 | Liquid crystal composition 7 | Liquid crystal composition 7 | Liquid crystal composition 7 |
| Sealant | Sealant (1) | Sealant (2) | Sealant (3) | Sealant (4) | Sealant (5) |
| VHR | 99.1 | 99.3 | 99.6 | 99.2 | 99.5 |
| Alignment irregularities | ○ | ○ | ⊙ | ○ | ⊙ |
| Image-sticking | ○ | ⊙ | ⊙ | ○ | ⊙ |

TABLE 19

| | Example 54 | Example 55 | Example 56 |
|---|---|---|---|
| Liquid crystal composition | Liquid crystal composition 7 | Liquid crystal composition 7 | Liquid crystal composition 7 |
| Sealant | Sealant (6) | Sealant (7) | Sealant (8) |
| VHR | 99.4 | 99.5 | 99.3 |
| Alignment irregularities | ⊙ | ⊙ | ⊙ |
| Image-sticking | ⊙ | ⊙ | ○ |

TABLE 20

| | Example 57 | Example 58 | Example 59 | Example 60 | Example 61 |
|---|---|---|---|---|---|
| Liquid crystal composition | Liquid crystal composition 8 | Liquid crystal composition 8 | Liquid crystal composition 8 | Liquid crystal composition 8 | Liquid crystal composition 8 |
| Sealant | Sealant (1) | Sealant (2) | Sealant (3) | Sealant (4) | Sealant (5) |
| VHR | 99.0 | 99.2 | 99.5 | 99.1 | 99.4 |
| Alignment irregularities | ○ | ○ | ⊙ | ○ | ○ |
| Image-sticking | ○ | ○ | ⊙ | ○ | ⊙ |

TABLE 21

|  | Example 62 | Example 63 | Example 64 |
|---|---|---|---|
| Liquid crystal composition | Liquid crystal composition 8 | Liquid crystal composition 8 | Liquid crystal composition 8 |
| Sealant | Sealant (6) | Sealant (7) | Sealant (8) |
| VHR | 99.3 | 99.4 | 99.2 |
| Alignment irregularities | ⊙ | ⊙ | ⊙ |
| Image-sticking | ⊙ | ⊙ | ○ |

TABLE 22

|  | Example 65 | Example 66 | Example 67 | Example 68 | Example 69 |
|---|---|---|---|---|---|
| Liquid crystal composition | Liquid crystal composition 9 | Liquid crystal composition 9 | Liquid crystal composition 9 | Liquid crystal composition 9 | Liquid crystal composition 9 |
| Sealant | Sealant (1) | Sealant (2) | Sealant (3) | Sealant (4) | Sealant (5) |
| VHR | 99.1 | 99.2 | 99.6 | 99.2 | 99.5 |
| Alignment irregularities | ○ | ○ | ⊙ | ○ | ⊙ |
| Image-sticking | ○ | ○ | ⊙ | ○ | ⊙ |

TABLE 23

|  | Example 70 | Example 71 | Example 72 |
|---|---|---|---|
| Liquid crystal composition | Liquid crystal composition 9 | Liquid crystal composition 9 | Liquid crystal composition 9 |
| Sealant | Sealant (6) | Sealant (7) | Sealant (8) |
| VHR | 99.4 | 99.5 | 99.3 |
| Alignment irregularities | ⊙ | ⊙ | ⊙ |
| Image-sticking | ○ | ⊙ | ○ |

It can be understood that liquid crystal compositions 7 to 9 had a temperature range of the liquid crystal layer practical for use as a liquid crystal composition for TVs, a large absolute dielectric anisotropy, low viscosity, and an appropriate Δn.

The liquid crystal displays of Examples 49 to 72 achieved high VHRs. In the alignment irregularity testing, furthermore, there was no or only a minor and acceptable level of alignment irregularity observed. In the image-sticking testing, likewise, there was no or only a minor and acceptable level of image persistence observed.

Examples 73 to 88

Transparent electrodes were formed on a first substrate, and a black matrix (BM) was formed on a second substrate. After the formation of a horizontal alignment layer (AL-1051) on the facing sides of the respective substrates, alignment was performed. In the same way as in Example 1, liquid crystal compositions 10 and 11 as defined in tables below were sandwiched, FFS liquid crystal displays of Examples 73 to 88 were produced using sealants (1) to (8) ($d_{gap}$=4.0 μm), and their VHRs were measured. The liquid crystal displays were also tested for alignment irregularities and image-sticking. The results are summarized in tables below.

TABLE 24

| Compound | Amount (%) |
|---|---|
| Liquid crystal composition 10 | |
| 3-Cy-Cy-1d0 | 39 |
| 3-Cy-Cy-1d1 | 7 |
| 0d1-Cy-Cy-Ph-1 | 11 |
| 2-Ph—Ph1—Ph-3 | 8 |
| 2-Ph—Ph1—Ph-5 | 8 |
| 3-Ph—Ph3—CFFO—Ph3—F | 10 |
| 3-Cy-Cy-Ph—Ph3—F | 6 |
| 4-Ph—Ph1—Ph3—CFFO—Ph3—F | 11 |
| Tni/° C. | 76.0 |
| Δn | 0.114 |
| Δε | 6.0 |
| γ1/mPa · s | 77 |
| η/mPa · s | 13.3 |
| Liquid crystal composition 11 | |
| 3-Cy-Cy-1d0 | 44 |
| 3-Cy-Cy-1d1 | 3 |
| 2-Ph—Ph-3d1 | 13 |
| 3-Cy-Ph—Ph-2 | 7 |
| 2-Ph—Ph1—Ph-3 | 8 |
| 3-Ph—Ph1—Ph-3 | 7 |
| 3-Ph—Ph1—Ph3—CFFO—Ph3—F | 9 |
| 4-Cy-Cy-Ph1—CFFO—Ph3—F | 3 |
| 3-Cy-Ph3—Ph1—OCFFF | 6 |
| Tni/° C. | 77.9 |
| Δn | 0.131 |
| Δε | 4.6 |
| γ1/mPa · s | 74 |
| η/mPa · s | 12.4 |

TABLE 25

|  | Example 73 | Example 74 | Example 75 | Example 76 | Example 77 |
|---|---|---|---|---|---|
| Liquid crystal composition | Liquid crystal composition 10 | Liquid crystal composition 10 | Liquid crystal composition 10 | Liquid crystal composition 10 | Liquid crystal composition 10 |
| Sealant | Sealant (1) | Sealant (2) | Sealant (3) | Sealant (4) | Sealant (5) |
| VHR | 99.1 | 99.3 | 99.5 | 99.2 | 99.4 |
| Alignment irregularities | ○ | ⊙ | ⊙ | ○ | ⊙ |
| Image-sticking | ○ | ○ | ⊙ | ○ | ⊙ |

TABLE 26

|  | Example 78 | Example 79 | Example 80 |
|---|---|---|---|
| Liquid crystal composition | Liquid crystal composition 10 | Liquid crystal composition 10 | Liquid crystal composition 10 |
| Sealant | Sealant (6) | Sealant (7) | Sealant (8) |
| VHR | 99.4 | 99.5 | 99.3 |
| Alignment irregularities | ⊙ | ⊙ | ⊙ |
| Image-sticking | ○ | ⊙ | ○ |

TABLE 27

|  | Example 81 | Example 82 | Example 83 | Example 84 | Example 85 |
|---|---|---|---|---|---|
| Liquid crystal composition | Liquid crystal composition 11 | Liquid crystal composition 11 | Liquid crystal composition 11 | Liquid crystal composition 11 | Liquid crystal composition 11 |
| Sealant | Sealant (1) | Sealant (2) | Sealant (3) | Sealant (4) | Sealant (5) |
| VHR | 99.2 | 99.3 | 99.6 | 99.3 | 89.5 |
| Alignment irregularities | ○ | ⊙ | ⊙ | ⊙ | ⊙ |
| Image-sticking | ○ | ○ | ⊙ | ○ | ⊙ |

TABLE 28

|  | Example 86 | Example 87 | Example 88 |
|---|---|---|---|
| Liquid crystal composition | Liquid crystal composition 11 | Liquid crystal composition 11 | Liquid crystal composition 11 |
| Sealant | Sealant (6) | Sealant (7) | Sealant (8) |
| VHR | 99.5 | 99.6 | 99.4 |
| Alignment irregularities | ⊙ | ⊙ | ○ |
| Image-sticking | ○ | ⊙ | ○ |

It can be understood that liquid crystal compositions 10 and 11 had a temperature range of the liquid crystal layer practical for use as a liquid crystal composition for TVs, a large absolute dielectric anisotropy, low viscosity, and an appropriate Δn.

The liquid crystal displays of Examples 73 to 88 achieved high VHRs. In the alignment irregularity testing, furthermore, there was no or only a minor and acceptable level of alignment irregularity observed. In the image-sticking testing, likewise, there was no or only a minor and acceptable level of image persistence observed.

Examples 89 to 104

In the same way as in Example 73, liquid crystal compositions 12 and 13 as defined in tables below were sandwiched, liquid crystal displays of Examples 89 to 104 were produced using sealants (1) to (8), and their VHRs were measured. The liquid crystal displays were also tested for alignment irregularities and image-sticking. The results are summarized in tables below.

TABLE 29

| Compound | Amount (%) |
|---|---|
| Liquid crystal composition 12 | |
| 3-Cy-Cy-1d0 | 47 |
| 3-Cy-Cy-1d1 | 9 |
| 3-Cy-Cy-Ph-2 | 7 |
| 2-Ph—Ph1—Ph-3 | 4 |
| 2-Ph—Ph1—Ph-5 | 7 |
| 3-Cy-Ph—Ph-Cy-3 | 2 |

TABLE 29-continued

| Compound | Amount (%) |
|---|---|
| 2-Ph—Ph1—Ph-3 | 6 |
| 3-Ph—Ph1—Ph-3 | 7 |
| 3-Ph—Ph3—CFFO—Ph3—F | 2 |
| 3-Cy-Cy-Ph1—Ph3—F | 2 |
| 3-Cy-Ph—Ph3—Ph1—OCFFF | 7 |
| Tni/° C. | 80.6 |
| Δn | 0.122 |
| Δε | 6.0 |
| γ1/mPa·s | 65 |
| η/mPa·s | 11.1 |
| Liquid crystal composition 13 | |
| 3-Cy-Cy-1d0 | 10 |
| 3-Cy-Cy-1d1 | 6 |
| 3-Cy-Cy-1d1-F | 28 |
| 0d1-Cy-Cy-Ph-1 | 11 |
| 0d3-Cy-Cy-Ph-1 | 10 |
| 2-Ph—Ph1—Ph-3 | 10 |
| 2-Ph—Ph1—Ph-5 | 10 |
| 5-Cy-Ph—Ph1—Ph-2 | 2 |
| 3-Ph—Ph3—CFFO—Ph3—F | 7 |
| 3-Cy-Cy-Ph1—CFFO—Ph3—F | 6 |
| Tni/° C. | 80.0 |
| Δn | 0.110 |
| Δε | 5.9 |
| γ1/mPa·s | 68 |
| η/mPa·s | 11.6 |

TABLE 30

|  | Example 89 | Example 90 | Example 91 | Example 92 | Example 93 |
|---|---|---|---|---|---|
| Liquid crystal composition | Liquid crystal composition 12 | Liquid crystal composition 12 | Liquid crystal composition 12 | Liquid crystal composition 12 | Liquid crystal composition 12 |
| Sealant | Sealant (1) | Sealant (2) | Sealant (3) | Sealant (4) | Sealant (5) |
| VHR | 99.1 | 99.3 | 99.6 | 99.3 | 99.4 |
| Alignment irregularities | ○ | ⊙ | ⊙ | ⊙ | ⊙ |
| Image-sticking | ○ | ⊙ | ⊙ | ○ | ⊙ |

TABLE 31

|  | Example 94 | Example 95 | Example 96 |
|---|---|---|---|
| Liquid crystal composition | Liquid crystal composition 12 | Liquid crystal composition 12 | Liquid crystal composition 12 |
| Sealant | Sealant (6) | Sealant (7) | Sealant (8) |
| VHR | 99.5 | 99.5 | 99.4 |
| Alignment irregularities | ⊙ | ⊙ | ⊙ |
| Image-sticking | ⊙ | ⊙ | ○ |

TABLE 32

|  | Example 97 | Example 98 | Example 99 | Example 100 | Example 101 |
|---|---|---|---|---|---|
| Liquid crystal composition | Liquid crystal composition 13 | Liquid crystal composition 13 | Liquid crystal composition 13 | Liquid crystal composition 13 | Liquid crystal composition 13 |
| Sealant | Sealant (1) | Sealant (2) | Sealant (3) | Sealant (4) | Sealant (5) |
| VHR | 99.0 | 99.3 | 99.5 | 99.1 | 99.4 |
| Alignment irregularities | ○ | ⊙ | ⊙ | ⊙ | ⊙ |
| Image-sticking | ○ | ○ | ⊙ | ○ | ⊙ |

TABLE 33

|  | Example 102 | Example 103 | Example 104 |
|---|---|---|---|
| Liquid crystal composition | Liquid crystal composition 13 | Liquid crystal composition 13 | Liquid crystal composition 13 |
| Sealant | Sealant (6) | Sealant (7) | Sealant (8) |
| VHR | 99.4 | 99.5 | 99.3 |
| Alignment irregularities | ○ | ⊙ | ⊙ |
| Image-sticking | ⊙ | ○ | ○ |

It can be understood that liquid crystal compositions 12 and 13 had a temperature range of the liquid crystal layer practical for use as a liquid crystal composition for TVs, a large absolute dielectric anisotropy, low viscosity, and an appropriate Δn.

The liquid crystal displays of Examples 89 to 104 achieved high VHRs. In the alignment irregularity testing, furthermore, there was no or only a minor and acceptable level of alignment irregularity observed. In the image-sticking testing, likewise, there was no or only a minor and acceptable level of image persistence observed.

Examples 105 to 112

Liquid crystal composition 10, which was used in Example 73, was mixed with 0.3% by mass bismethacrylic acid biphenyl-4,4'-diyl to give liquid crystal composition 14. In the same way as in Example 49, this liquid crystal composition 14 was sandwiched and sealed using sealants (1) to (8). With drive voltage applied across the electrodes, the composition was irradiated with ultraviolet radiation for 600 seconds (3.0 J/cm) for polymerization. TN liquid crystal displays of Examples 105 to 70 were produced in this way, and their VHRs were measured. The liquid crystal displays were also tested for alignment irregularities and image-sticking. The results are summarized in tables below.

TABLE 34

|  | Example 105 | Example 106 | Example 107 | Example 108 | Example 109 |
|---|---|---|---|---|---|
| Liquid crystal composition | Liquid crystal composition 14 | Liquid crystal composition 14 | Liquid crystal composition 14 | Liquid crystal composition 14 | Liquid crystal composition 14 |
| Sealant | Sealant (1) | Sealant (2) | Sealant (3) | Sealant (4) | Sealant (5) |
| VHR | 99.1 | 99.2 | 99.6 | 99.2 | 99.4 |

TABLE 34-continued

|  | Example 105 | Example 106 | Example 107 | Example 108 | Example 109 |
|---|---|---|---|---|---|
| Alignment irregularities | ○ | ⊙ | ⊙ | ○ | ⊙ |
| Image-sticking | ○ | ○ | ⊙ | ⊙ | ⊙ |

TABLE 35

|  | Example 110 | Example 111 | Example 112 |
|---|---|---|---|
| Liquid crystal composition | Liquid crystal composition 14 | Liquid crystal composition 14 | Liquid crystal composition 14 |
| Sealant | Sealant (6) | Sealant (7) | Sealant (8) |
| VHR | 99.3 | 99.5 | 99.4 |
| Alignment irregularities | ⊙ | ⊙ | ○ |
| Image-sticking | ⊙ | ⊙ | ⊙ |

The liquid crystal displays of Examples 105 to 112 achieved high VHRs. In the alignment irregularity testing, furthermore, there was no or only a minor and acceptable level of alignment irregularity observed. In the image-sticking testing, likewise, there was no or only a minor and acceptable level of image persistence observed.

Examples 113 to 120

Liquid crystal composition 8, which was used in Example 62, was mixed with 0.3% by mass bismethacrylic acid biphenyl-4,4'-diyl to give liquid crystal composition 15. In the same way as in Example 1, this liquid crystal composition 15 was sandwiched and sealed using sealants (1) to (8). With drive voltage applied across the electrodes, the composition was irradiated with ultraviolet radiation for 600 seconds (3.0 J/cm$^2$) for polymerization. IPS liquid crystal displays of Examples 113 to 120 were produced in this way, and their VHRs were measured. The liquid crystal displays were also tested for alignment irregularities and image-sticking. The results are summarized in tables below.

TABLE 36

|  | Example 113 | Example 114 | Example 115 | Example 116 | Example 117 |
|---|---|---|---|---|---|
| Liquid crystal composition | Liquid crystal composition 15 | Liquid crystal composition 15 | Liquid crystal composition 15 | Liquid crystal composition 15 | Liquid crystal composition 15 |
| Sealant | Sealant (1) | Sealant (2) | Sealant (3) | Sealant (4) | Sealant (5) |
| VHR | 99.0 | 99.2 | 99.6 | 99.1 | 99.4 |
| Alignment irregularities | ○ | ○ | ⊙ | ○ | ⊙ |
| Image-sticking | ○ | ○ | ⊙ | ○ | ○ |

TABLE 37

|  | Example 118 | Example 119 | Example 120 |
|---|---|---|---|
| Liquid crystal composition | Liquid crystal composition 15 | Liquid crystal composition 15 | Liquid crystal composition 15 |
| Sealant | Sealant (6) | Sealant (7) | Sealant (8) |
| VHR | 99.3 | 99.6 | 99.2 |
| Alignment irregularities | ⊙ | ⊙ | ⊙ |
| Image-sticking | ○ | ⊙ | ○ |

The liquid crystal displays of Examples 113 to 120 achieved high VHRs. In the alignment irregularity testing, furthermore, there was no or only a minor and acceptable level of alignment irregularity observed. In the image-sticking testing, likewise, there was no or only a minor and acceptable level of image persistence observed.

Examples 121 to 128

Liquid crystal composition 6, which was used in Example 41, was mixed with 0.3% by mass bismethacrylic acid 3-fluorobiphenyl-4,4'-diyl to give liquid crystal composition 16. In the same way as in Example 73, this liquid crystal composition 16 was sandwiched and sealed using sealants (1) to (8). With drive voltage applied across the electrodes, the composition was irradiated with ultraviolet radiation for 600 seconds (3.0 J/cm$^2$) for polymerization. FFS liquid crystal displays of Examples 121 to 128 were produced in this way, and their VHRs were measured. The liquid crystal displays were also tested for alignment irregularities and image-sticking. The results are summarized in tables below.

TABLE 38

|  | Example 121 | Example 122 | Example 123 | Example 124 | Example 125 |
|---|---|---|---|---|---|
| Liquid crystal composition | Liquid crystal composition 16 | Liquid crystal composition 16 | Liquid crystal composition 16 | Liquid crystal composition 16 | Liquid crystal composition 16 |
| Sealant | Sealant (1) | Sealant (2) | Sealant (3) | Sealant (4) | Sealant (5) |
| VHR | 99.0 | 99.2 | 99.5 | 99.1 | 99.4 |
| Alignment irregularities | ○ | ⊙ | ⊙ | ○ | ⊙ |
| Image-sticking | ○ | ○ | ⊙ | ○ | ⊙ |

TABLE 39

|  | Example 126 | Example 127 | Example 128 |
|---|---|---|---|
| Liquid crystal composition | Liquid crystal composition 16 | Liquid crystal composition 16 | Liquid crystal composition 16 |
| Sealant | Sealant (6) | Sealant (7) | Sealant (8) |
| VHR | 99.3 | 99.5 | 99.3 |
| Alignment irregularities | ○ | ⊙ | ⊙ |
| Image-sticking | ⊙ | ⊙ | ○ |

The liquid crystal displays of Examples 121 to 128 achieved high VHRs. In the alignment irregularity testing, furthermore, there was no or only a minor and acceptable level of alignment irregularity observed. In the image-sticking testing, likewise, there was no or only a minor and acceptable level of image persistence observed.

TABLE 40

| Comparative liquid crystal composition 1 | |
|---|---|
| Compound | Amount (%) |
| 4-Cy-VO—Ph-1 | 27 |
| 5-Cy-VO—Ph-1 | 20 |
| 5-Cy-VO—Ph-3 | 20 |
| 3-Ph—Ph3—CFFO—Ph3—F | 8 |
| 3-Cy-Cy-CFFO—Ph3—F | 13 |
| 3-Ph—Ph1—Ph3—CFFO—Ph3—F | 12 |
| Tni/° C. | 69.3 |
| Δn | 0.096 |
| Δε | 4.8 |
| η/mPa · s | 30.3 |

TABLE 41

|  | Comparative Example 1 | Comparative Example 2 | Comparative Example 3 | Comparative Example 4 | Comparative Example 5 |
|---|---|---|---|---|---|
| Liquid crystal composition | Comparative liquid crystal composition 1 | Comparative liquid crystal composition 1 | Comparative liquid crystal composition 1 | Comparative liquid crystal composition 1 | Comparative liquid crystal composition 1 |
| Sealant | Sealant (1) | Sealant (2) | Sealant (3) | Sealant (4) | Sealant (5) |
| VHR | 97.3 | 97.6 | 98.1 | 97.5 | 97.9 |
| Alignment irregularities | X | X | Δ | X | Δ |
| Image-sticking | X | X | Δ | X | X |

TABLE 42

|  | Comparative Example 6 | Comparative Example 7 | Comparative Example 8 |
|---|---|---|---|
| Liquid crystal composition | Comparative liquid crystal composition 1 | Comparative liquid crystal composition 1 | Comparative liquid crystal composition 1 |
| Sealant | Sealant (6) | Sealant (7) | Sealant (8) |
| VHR | 97.8 | 98.0 | 97.6 |
| Alignment irregularities | Δ | Δ | X |
| Image-sticking | X | Δ | X |

Comparative Examples 1 to 8

In Example 1, liquid crystal composition 1 was changed to comparative liquid crystal composition 1 below. Except for this, the same procedure was followed to produce IPS liquid crystal displays of Comparative Examples 1 to 8 and measure their VHRs. The liquid crystal displays were also tested for alignment irregularities and image-sticking. The results are summarized in tables below.

The liquid crystal displays of Comparative Examples 1 to 8 had low VHRs compared with those of the present invention. In the alignment irregularity testing, furthermore, unacceptable levels of alignment irregularity were observed. In the image-sticking testing, likewise, unacceptable levels of image persistence were observed.

Comparative Examples 9 to 24

IPS liquid crystal displays of Comparative Examples 9 to 24 were produced in the same way as in Comparative Example 1 except that comparative liquid crystal composition 1 was changed to comparative liquid crystal compositions 2 and 3 below, and their VHRs were measured. The liquid crystal displays were also tested for alignment irregularities and image-sticking. The results are summarized in tables below.

TABLE 43

| Compound | Amount (%) |
|---|---|
| Comparative liquid crystal composition 2 | |
| 2-Cy-Cy-Ph3—F | 12 |
| 3-Cy-Cy-Ph3—F | 10 |
| 5-Cy-Cy-Ph3—F | 6 |
| 2-Cy-Cy-Ph—OCFFF | 9 |
| 3-Cy-Cy-Ph—OCFFF | 8 |
| 4-Cy-Cy-Ph—OCFFF | 7 |
| 2-Cy-Ph1—Ph3—F | 12 |
| 3-Cy-Ph1—Ph3—F | 10 |
| 2-Cy-Py-Cy-CFFO—Ph3—F | 5.5 |
| 2-Ph—Ph1—Ph3—F | 5.5 |
| 0d1-Cy-Cy-CFFO—Ph3—F | 15 |

TABLE 43-continued

| Compound | Amount (%) |
|---|---|
| Tni/° C. | 75.7 |
| $\Delta n$ | 0.093 |
| $\gamma 1$/mPa·s | 146 |
| Comparative liquid crystal composition 3 | |
| 2-Cy-Cy-Ph3—F | 12 |
| 3-Cy-Cy-Ph3—F | 10 |
| 2-Cy-Cy-Ph—OCFFF | 8 |
| 3-Cy-Cy-Ph—OCFFF | 8 |
| 4-Cy-Cy-Ph—OCFFF | 7 |
| 5-Cy-Cy-Ph—OCFFF | 4 |
| 2-Cy-Ph1—Ph3—F | 12 |
| 3-Cy-Ph1—Ph3—F | 4 |
| 2-Cy-Cy-CFFO—Ph3—F | 12 |
| 2-Ph—Ph1—Ph3—F | 8 |
| 0d1-Cy-Cy-CFFO—Ph3—F | 15 |
| Tni/° C. | 75.0 |
| $\Delta n$ | 0.093 |
| $\gamma 1$/mPa·s | 139 |

TABLE 44

| | Comparative Example 9 | Comparative Example 10 | Comparative Example 11 | Comparative Example 12 | Comparative Example 13 |
|---|---|---|---|---|---|
| Liquid crystal composition | Comparative liquid crystal composition 2 | Comparative liquid crystal composition 2 | Comparative liquid crystal composition 2 | Comparative liquid crystal composition 2 | Comparative liquid crystal composition 2 |
| Sealant | Sealant (1) | Sealant (2) | Sealant (3) | Sealant (4) | Sealant (5) |
| VHR | 97.3 | 97.6 | 98.0 | 97.5 | 97.8 |
| Alignment irregularities | X | X | Δ | X | X |
| Image-sticking | X | X | Δ | X | Δ |

TABLE 45

| | Comparative Example 14 | Comparative Example 15 | Comparative Example 16 |
|---|---|---|---|
| Liquid crystal composition | Comparative liquid crystal composition 2 | Comparative liquid crystal composition 2 | Comparative liquid crystal composition 2 |
| Sealant | Sealant (6) | Sealant (7) | Sealant (8) |
| VHR | 97.7 | 98.0 | 97.7 |
| Alignment irregularities | X | Δ | X |
| Image-sticking | Δ | Δ | X |

TABLE 46

| | Comparative Example 17 | Comparative Example 18 | Comparative Example 19 | Comparative Example 20 | Comparative Example 21 |
|---|---|---|---|---|---|
| Liquid crystal composition | Comparative liquid crystal composition 3 | Comparative liquid crystal composition 3 | Comparative liquid crystal composition 3 | Comparative liquid crystal composition 3 | Comparative liquid crystal composition 3 |
| Sealant | Sealant (1) | Sealant (2) | Sealant (3) | Sealant (4) | Sealant (5) |
| VHR | 97.2 | 97.6 | 98.1 | 97.4 | 97.8 |
| Alignment irregularities | X | Δ | Δ | X | Δ |
| Image-sticking | X | X | Δ | X | X |

TABLE 47

|  | Comparative Example 22 | Comparative Example 23 | Comparative Example 24 |
|---|---|---|---|
| Liquid crystal composition | Comparative liquid crystal composition 3 | Comparative liquid crystal composition 3 | Comparative liquid crystal composition 3 |
| Sealant | Sealant (6) | Sealant (7) | Sealant (8) |
| VHR | 97.7 | 98.0 | 97.7 |
| Alignment irregularities | Δ | Δ | X |
| Image-sticking | X | Δ | X |

The liquid crystal displays of Comparative Examples 9 to 24 had low VHRs compared with those of the present invention. In the alignment irregularity testing, furthermore, unacceptable levels of alignment irregularity were observed. In the image-sticking testing, likewise, unacceptable levels of image persistence were observed.

Comparative Examples 25 to 40

IPS liquid crystal displays of Comparative Examples 25 to 40 were produced in the same way as in Comparative Example 1 except that comparative liquid crystal composition 1 was changed to comparative liquid crystal compositions 4 and 5 below, and their VHRs were measured. The liquid crystal displays were also tested for alignment irregularities and image-sticking. The results are summarized in tables below.

TABLE 48

| Compound | Amount (%) |
|---|---|
| Comparative liquid crystal composition 4 | |
| 4-Cy-Cy-1d0 | 15 |
| 0d1-Cy-Cy-Ph-1 | 4 |
| 0d3-Cy-Cy-Ph-1 | 14 |
| 3-Cy-Ph—Ph-Cy-3 | 3 |
| 3-Cy-Ph—Ph1-Cy-3 | 4 |
| 1-Cy-Cy-Ph3—F | 9 |

TABLE 48-continued

| Compound | Amount (%) |
|---|---|
| 2-Cy-Cy-Ph3—F | 10 |
| 3-Cy-Cy-Ph3—F | 10 |
| 5-Cy-Cy-Ph3—F | 5 |
| 3-Cy-Ph1—Ph3—F | 8 |
| 5-Cy-Ph1—Ph3—F | 7 |
| 3-Ph—Ph1—Ph3—F | 3 |
| 3-Cy-Cy-Ph1—Ph3—F | 8 |
| Tni/° C. | 101.0 |
| Δn | 0.095 |
| Δε | 8.2 |
| γ1/mPa · s | 115 |
| η/mPa · s | 23.6 |
| Comparative liquid crystal composition 5 | |
| 2-Cy-Cy-1d0 | 32 |
| 0d1-Cy-Cy-Ph-1 | 4 |
| 2-Ph—Ph1—Ph-3 | 10 |
| 2-Ph—Ph1—Ph-5 | 11 |
| 3-Ph—Ph1—Ph-5 | 7 |
| 2-Cy-Cy-Ph—F | 6 |
| 3-Cy-Cy-Ph—F | 21 |
| 5-Cy-Ph—Ph—F | 7 |
| 3-Cy-Ph—Ph3—F | 2 |
| Tni/° C. | 77.2 |
| Δn | 0.135 |
| Δε | 4.5 |
| γ1/mPa · s | 57 |
| η/mPa · s | 10.5 |

TABLE 49

|  | Comparative Example 25 | Comparative Example 26 | Comparative Example 27 | Comparative Example 28 | Comparative Example 29 |
|---|---|---|---|---|---|
| Liquid crystal composition | Comparative liquid crystal composition 4 | Comparative liquid crystal composition 4 | Comparative liquid crystal composition 4 | Comparative liquid crystal composition 4 | Comparative liquid crystal composition 4 |
| Sealant | Sealant (1) | Sealant (2) | Sealant (3) | Sealant (4) | Sealant (5) |
| VHR | 97.1 | 97.3 | 97.9 | 97.1 | 97.6 |
| Alignment irregularities | X | X | Δ | X | Δ |
| Image-sticking | X | X | Δ | Δ | Δ |

TABLE 50

|  | Comparative Example 30 | Comparative Example 31 | Comparative Example 32 |
|---|---|---|---|
| Liquid crystal composition | Comparative liquid crystal composition 4 | Comparative liquid crystal composition 4 | Comparative liquid crystal composition 4 |
| Sealant | Sealant (6) | Sealant (7) | Sealant (8) |
| VHR | 97.6 | 97.8 | 97.5 |
| Alignment irregularities | Δ | Δ | X |
| Image-sticking | X | X | X |

TABLE 51

|  | Comparative Example 33 | Comparative Example 34 | Comparative Example 35 | Comparative Example 36 | Comparative Example 37 |
|---|---|---|---|---|---|
| Liquid crystal composition | Comparative liquid crystal composition 5 | Comparative liquid crystal composition 5 | Comparative liquid crystal composition 5 | Comparative liquid crystal composition 5 | Comparative liquid crystal composition 5 |
| Sealant | Sealant (1) | Sealant (2) | Sealant (3) | Sealant (4) | Sealant (5) |
| VHR | 97.1 | 97.4 | 98.0 | 97.3 | 97.8 |
| Alignment irregularities | X | X | Δ | X | Δ |
| Image-sticking | X | X | Δ | X | X |

TABLE 52

|  | Comparative Example 38 | Comparative Example 30 | Comparative Example 40 |
|---|---|---|---|
| Liquid crystal composition | Comparative liquid crystal composition 5 | Comparative liquid crystal composition 5 | Comparative liquid crystal composition 5 |
| Sealant | Sealant (6) | Sealant (7) | Sealant (8) |
| VHR | 97.6 | 97.8 | 97.5 |
| Alignment irregularities | Δ | Δ | Δ |
| Image-sticking | Δ | Δ | X |

The liquid crystal displays of Comparative Examples 25 to 40 had low VHRs compared with those of the present invention. In the alignment irregularity testing, furthermore, unacceptable levels of alignment irregularity were observed. In the image-sticking testing, likewise, unacceptable levels of image persistence were observed.

Comparative Examples 41 to 64

IPS liquid crystal displays of Comparative Examples 41 to 64 were produced in the same way as in Comparative Example 1 except that comparative liquid crystal composition 1 was changed to comparative liquid crystal compositions 6 to 8, and their VHRs were measured. The liquid crystal displays were also tested for alignment irregularities and image-sticking. The results are summarized in tables below.

TABLE 53

| Compound | Amount (%) |
|---|---|
| Comparative liquid crystal composition 6 | |
| 4-Cy-Cy-1d0 | 18 |
| 3-Cy-Cy-4 | 15 |
| 0d1-Cy-Cy-Ph-1 | 8 |
| 2-Ph—Ph1—Ph-3 | 10 |
| 2-Ph—Ph1—Ph-5 | 6 |
| 3-Ph—Ph1—Ph-5 | 6 |
| 2-Cy-Cy-Ph—F | 6 |
| 3-Cy-Cy-Ph—F | 10 |
| 5-Cy-Ph—Ph—F | 7 |
| 3-Cy-Ph—Ph3—F | 14 |
| Tni/° C. | 73.5 |
| Δn | 0.126 |
| Δε | 4.9 |
| γ1/mPa · s | 94 |
| η/mPa · s | 16.9 |
| Comparative liquid crystal composition 7 | |
| 4-Cy-Cy-1d0 | 18 |
| 3-Cy-Cy-4 | 15 |
| 0d1-Cy-Cy-Ph-1 | 8 |

TABLE 53-continued

| Compound | Amount (%) |
|---|---|
| 2-Ph—Ph1—Ph-3 | 10 |
| 2-Ph—Ph1—Ph-5 | 6 |
| 3-Ph—Ph1—Ph-5 | 5 |
| 2-Cy-Cy-Ph—F | 6 |
| 3-Cy-Cy-Ph—F | 5 |
| 5-Cy-Ph—Ph—F | 7 |
| 3-Cy-Ph—Ph3—F | 15 |
| 3-Cy-Cy-Ph1—Ph3—F | 5 |
| Tni/° C. | 75.7 |
| Δn | 0.125 |
| Δε | 5.5 |
| γ1/mPa · s | 103 |
| η/mPa · s | 18.4 |
| Comparative liquid crystal composition 8 | |
| 4-Cy-Cy-1d0 | 17 |
| 3-Cy-Cy-4 | 15 |
| 0d3-Cy-Cy-Ph-1 | 8 |
| 3-Cy-Ph—Ph-2 | 10 |
| 2-Ph—Ph1—Ph-5 | 7 |
| 3-Ph—Ph1—Ph-5 | 7 |
| 2-Cy-Cy-Ph—F | 6 |
| 3-Cy-Cy-Ph—F | 5 |
| 5-Cy-Ph—Ph—F | 7 |
| 3-Cy-Ph—Ph3—F | 14 |
| 3-Cy-Cy-Ph1—Ph3—F | 4 |
| Tni/° C. | 85.3 |
| Δn | 0.128 |
| Δε | 4.8 |
| γ1/mPa · s | 107 |
| η/mPa · s | 19.0 |

TABLE 54

|  | Comparative Example 41 | Comparative Example 42 | Comparative Example 43 | Comparative Example 44 | Comparative Example 45 |
|---|---|---|---|---|---|
| Liquid crystal composition | Comparative liquid crystal composition 6 | Comparative liquid crystal composition 6 | Comparative liquid crystal composition 6 | Comparative liquid crystal composition 6 | Comparative liquid crystal composition 6 |
| Sealant | Sealant (1) | Sealant (2) | Sealant (3) | Sealant (4) | Sealant (5) |
| VHR | 97.0 | 97.3 | 97.9 | 97.2 | 97.7 |
| Alignment irregularities | X | X | Δ | X | Δ |
| Image-sticking | X | X | Δ | X | X |

TABLE 55

|  | Comparative Example 46 | Comparative Example 47 | Comparative Example 48 |
|---|---|---|---|
| Liquid crystal composition | Comparative liquid crystal composition 6 | Comparative liquid crystal composition 6 | Comparative liquid crystal composition 6 |
| Sealant | Sealant (6) | Sealant (7) | Sealant (8) |
| VHR | 97.5 | 97.8 | 97.4 |
| Alignment irregularities | Δ | Δ | X |
| Image-sticking | X | Δ | X |

TABLE 56

|  | Comparative Example 49 | Comparative Example 50 | Comparative Example 51 | Comparative Example 52 | Comparative Example 53 |
|---|---|---|---|---|---|
| Liquid crystal composition | Comparative liquid crystal composition 7 | Comparative liquid crystal composition 7 | Comparative liquid crystal composition 7 | Comparative liquid crystal composition 7 | Comparative liquid crystal composition 7 |
| Sealant | Sealant (1) | Sealant (2) | Sealant (3) | Sealant (4) | Sealant (5) |
| VHR | 97.0 | 97.2 | 97.8 | 97.1 | 97.6 |
| Alignment irregularities | X | X | Δ | X | X |
| Image-sticking | X | X | Δ | X | Δ |

TABLE 57

|  | Comparative Example 54 | Comparative Example 55 | Comparative Example 56 |
|---|---|---|---|
| Liquid crystal composition | Comparative liquid crystal composition 7 | Comparative liquid crystal composition 7 | Comparative liquid crystal composition 7 |
| Sealant | Sealant (6) | Sealant (7) | Sealant (8) |
| VHR | 97.6 | 97.7 | 97.4 |
| Alignment irregularities | X | Δ | Δ |
| Image-sticking | X | Δ | X |

TABLE 58

|  | Comparative Example 57 | Comparative Example 58 | Comparative Example 59 | Comparative Example 60 | Comparative Example 61 |
|---|---|---|---|---|---|
| Liquid crystal composition | Comparative liquid crystal composition 8 | Comparative liquid crystal composition 8 | Comparative liquid crystal composition 8 | Comparative liquid crystal composition 8 | Comparative liquid crystal composition 8 |
| Sealant | Sealant (1) | Sealant (2) | Sealant (3) | Sealant (4) | Sealant (5) |
| VHR | 97.1 | 97.3 | 97.9 | 97.2 | 97.8 |
| Alignment irregularities | X | X | Δ | X | Δ |
| Image-sticking | X | X | Δ | X | X |

TABLE 59

|  | Comparative Example 62 | Comparative Example 63 | Comparative Example 64 |
|---|---|---|---|
| Liquid crystal composition | Comparative liquid crystal composition 8 | Comparative liquid crystal composition 8 | Comparative liquid crystal composition 8 |
| Sealant | Sealant (6) | Sealant (7) | Sealant (8) |
| VHR | 97.7 | 97.9 | 97.4 |
| Alignment irregularities | X | Δ | X |
| Image-sticking | Δ | Δ | X |

The liquid crystal displays of Comparative Examples 41 to 64 had low VHRs compared with those of the present invention. In the alignment irregularity testing, furthermore, unacceptable levels of alignment irregularity were observed. In the image-sticking testing, likewise, unacceptable levels of image persistence were observed.

Comparative Examples 65 to 88

IPS liquid crystal displays of Comparative Examples 65 to 88 were produced in the same way as in Comparative Example 1 except that comparative liquid crystal composition 1 was changed to comparative liquid crystal compositions 9 to 11, and their VHRs were measured. The liquid crystal displays were also tested for alignment irregularities and image-sticking. The results are summarized in tables below.

TABLE 60

| Compound | Amount (%) |
|---|---|
| Comparative liquid crystal composition 9 | |
| 2-Cy-Cy-Ph3—F | 10 |
| 0d1-Cy-Cy-Ph1—F | 8 |
| 2-Ph—Ph3—Ph3—F | 10 |
| 3-Cy-Cy-Ph3—F | 10 |
| 3-Cy-Cy-Ph1—Ph3—F | 8 |
| 1-Cy-Cy-Ph3—F | 8 |
| 5-Cy-Cy-Ph3—F | 5 |
| 0d3-Ph-T-Ph-3d0 | 15 |
| 3-Cy-Ph-T-Ph-2 | 14 |
| 0d3-Ph—N—Ph-3d0 | 4 |
| 3-Ph—VO-Cy-VO—Ph-3 | 4 |
| 3-Cy-Cy-VO—Ph-Cy-3 | 3 |
| Tni/° C. | 101.6 |
| Δn | 0.151 |
| Δε | 9.2 |
| γ1/mPa · s | 140 |
| η/mPa · s | 20.7 |
| Comparative liquid crystal composition 10 | |
| 2-Cy-Cy-Ph3—F | 10 |
| 0d1-Cy-Cy-Ph1—F | 8 |
| 2-Ph—Ph3—Ph3—F | 10 |
| 3-Cy-Cy-Ph3—F | 10 |
| 3-Cy-Cy-Ph1—Ph3—F | 8 |
| 1-Cy-Cy-Ph3—F | 8 |
| 5-Cy-Cy-Ph3—F | 5 |
| 0d3-Ph-T-Ph-3d0 | 10 |
| 3-Cy-Ph3-T-Ph9-1 | 4 |
| 4-Ph-T-Ph—O2 | 4 |
| 3-Cy-Ph-T-Ph-2 | 7 |
| 5-Cy-VO—Ph-1 | 5 |
| 3-Ph—VO-Cy-VO—Ph-3 | 7 |
| 3-Cy-Cy-VO—Ph-Cy-3 | 3 |
| Tni/° C. | 96.4 |
| Δn | 0.135 |
| Δε | 8.8 |
| γ1/mPa · s | 135 |
| η/mPa · s | 22.7 |
| Comparative liquid crystal composition 11 | |
| 2-Cy-Cy-Ph3—F | 10 |
| 0d1-Cy-Cy-Ph1—F | 8 |
| 3-Cy-Cy-Ph3—F | 10 |
| 2-Ph—Ph3—Ph3—F | 6 |
| 3-Cy-Cy-Ph1—Ph3—F | 8 |
| 5-Cy-Cy-Ph3—F | 5 |
| 0d3-Ph-T-Ph-3d0 | 10 |
| 3-Cy-Ph3-T-Ph9-1 | 4 |
| 3-Cy-Cy-Ph3—F | 4 |
| 4-Ph-T-Ph—O2 | 4 |
| 5-Cy-Cy-Ph3—F | 9 |
| 5-Cy-VO—Ph-1 | 5 |
| 0d3-Ph—N—Ph-3d0 | 7 |
| 3-Ph—VO-Cy-VO—Ph-3 | 7 |
| 3-Cy-Cy-VO—Ph-Cy-3 | 3 |
| Tni/° C. | 99.1 |
| Δn | 0.135 |
| Δε | 7.6 |
| γ1/mPa · s | 130 |
| η/mPa · s | 24.3 |

TABLE 61

|  | Comparative Example 65 | Comparative Example 66 | Comparative Example 67 | Comparative Example 68 | Comparative Example 69 |
|---|---|---|---|---|---|
| Liquid crystal composition | Comparative liquid crystal composition 9 | Comparative liquid crystal composition 9 | Comparative liquid crystal composition 9 | Comparative liquid crystal composition 9 | Comparative liquid crystal composition 9 |
| Sealant | Sealant (1) | Sealant (2) | Sealant (3) | Sealant (4) | Sealant (5) |
| VHR | 97.2 | 97.4 | 98.0 | 97.3 | 97.8 |
| Alignment irregularities | X | X | Δ | X | Δ |
| Image-sticking | X | X | Δ | X | X |

TABLE 62

|  | Comparative Example 70 | Comparative Example 71 | Comparative Example 72 |
| --- | --- | --- | --- |
| Liquid crystal composition | Comparative liquid crystal composition 9 | Comparative liquid crystal composition 9 | Comparative liquid crystal composition 9 |
| Sealant | Sealant (6) | Sealant (7) | Sealant (8) |
| VHR | 97.7 | 97.9 | 97.6 |
| Alignment irregularities | Δ | Δ | Δ |
| Image-sticking | X | Δ | X |

TABLE 63

|  | Comparative Example 73 | Comparative Example 74 | Comparative Example 75 | Comparative Example 76 | Comparative Example 77 |
| --- | --- | --- | --- | --- | --- |
| Liquid crystal composition | Comparative liquid crystal composition 10 | Comparative liquid crystal composition 10 | Comparative liquid crystal composition 10 | Comparative liquid crystal composition 10 | Comparative liquid crystal composition 10 |
| Sealant | Sealant (1) | Sealant (2) | Sealant (3) | Sealant (4) | Sealant (5) |
| VHR | 97.1 | 97.4 | 97.9 | 97.2 | 97.7 |
| Alignment irregularities | X | X | Δ | X | X |
| Image-sticking | X | X | Δ | X | Δ |

TABLE 64

|  | Comparative Example 78 | Comparative Example 79 | Comparative Example 80 |
| --- | --- | --- | --- |
| Liquid crystal composition | Comparative liquid crystal composition 10 | Comparative liquid crystal composition 10 | Comparative liquid crystal composition 10 |
| Sealant | Sealant (6) | Sealant (7) | Sealant (8) |
| VHR | 97.6 | 97.7 | 97.4 |
| Alignment irregularities | X | Δ | X |
| Image-sticking | X | Δ | Δ |

TABLE 65

|  | Comparative Example 81 | Comparative Example 82 | Comparative Example 83 | Comparative Example 84 | Comparative Example 85 |
| --- | --- | --- | --- | --- | --- |
| Liquid crystal composition | Comparative liquid crystal composition 11 | Comparative liquid crystal composition 11 | Comparative liquid crystal composition 11 | Comparative liquid crystal composition 11 | Comparative liquid crystal composition 11 |
| Sealant | Sealant (1) | Sealant (2) | Sealant (3) | Sealant (4) | Sealant (5) |
| VHR | 97.0 | 97.3 | 97.8 | 97.3 | 97.7 |
| Alignment irregularities | X | Δ | Δ | X | Δ |
| Image-sticking | X | X | Δ | X | Δ |

TABLE 66

|  | Comparative Example 86 | Comparative Example 87 | Comparative Example 88 |
| --- | --- | --- | --- |
| Liquid crystal composition | Comparative liquid crystal composition 11 | Comparative liquid crystal composition 11 | Comparative liquid crystal composition 11 |
| Sealant | Sealant (6) | Sealant (7) | Sealant (8) |
| VHR | 97.5 | 97.8 | 97.5 |
| Alignment irregularities | Δ | Δ | X |
| Image-sticking | X | X | X |

The liquid crystal displays of Comparative Examples 65 to 88 had low VHRs compared with those of the present invention. In the alignment irregularity testing, furthermore, unacceptable levels of alignment irregularity were observed. In the image-sticking testing, likewise, unacceptable levels of image persistence were observed.

Comparative Examples 89 to 102

In Examples 9, 25, 33, 49, 73, 89, and 121, the sealant was changed to comparative sealants (C1) and (C2). Except for this, the same procedure was followed to produce liquid crystal displays of Comparative Examples 89 to 102 and measure their VHRs. The liquid crystal displays were also tested for alignment irregularities and image-sticking. The results are summarized in tables below.

TABLE 67

|   | Comparative Example 89 | Comparative Example 90 | Comparative Example 91 | Comparative Example 92 |
|---|---|---|---|---|
| Liquid crystal composition | Liquid crystal composition 2 | Liquid crystal composition 4 | Liquid crystal composition 5 | Liquid crystal composition 7 |
| Sealant | Comparative sealant (C1) | Comparative sealant (C1) | Comparative sealant (C1) | Comparative sealant (C1) |
| VHR | 97.2 | 97.3 | 97.0 | 97.1 |
| Alignment irregularities | X | X | X | X |
| Image-sticking | X | X | X | X |

TABLE 68

|   | Comparative Example 93 | Comparative Example 94 | Comparative Example 95 |
|---|---|---|---|
| Liquid crystal composition | Liquid crystal composition 10 | Liquid crystal composition 12 | Liquid crystal composition 16 |
| Sealant | Comparative sealant (C1) | Comparative sealant (C1) | Comparative sealant (C1) |
| VHR | 97.2 | 97.2 | 97.0 |
| Alignment irregularities | X | X | X |
| Image-sticking | Δ | X | X |

TABLE 69

|   | Comparative Example 96 | Comparative Example 97 | Comparative Example 98 | Comparative Example 99 |
|---|---|---|---|---|
| Liquid crystal composition | Liquid crystal composition 2 | Liquid crystal composition 4 | Liquid crystal composition 5 | Liquid crystal composition 7 |
| Sealant | Comparative sealant (C2) | Comparative sealant (C2) | Comparative sealant (C2) | Comparative sealant (C2) |
| VHR | 97.2 | 97.3 | 97.0 | 97.1 |
| Alignment irregularities | X | X | X | X |
| Image-sticking | X | X | X | X |

TABLE 70

|   | Comparative Example 100 | Comparative Example 101 | Comparative Example 102 |
|---|---|---|---|
| Liquid crystal composition | Liquid crystal composition 10 | Liquid crystal composition 12 | Liquid crystal composition 16 |
| Sealant | Comparative sealant (C2) | Comparative sealant (C2) | Comparative sealant (C2) |
| VHR | 97.1 | 97.0 | 96.9 |
| Alignment irregularities | X | X | X |
| Image-sticking | X | X | X |

The liquid crystal displays of Comparative Examples 89 to 102 had low VHRs compared with those of the present invention. In the alignment irregularity testing, furthermore, unacceptable levels of alignment irregularity were observed. In the image-sticking testing, likewise, unacceptable levels of image persistence were observed.

The invention claimed is:

1. A liquid crystal display comprising a first substrate, a second substrate, a liquid crystal layer sandwiched between the first and second substrates and containing a liquid crystal composition, and a cured form of a curable resin composition that cures when heated joining the first and second substrates together, the liquid crystal composition containing one or two or more compounds represented by general formula (I):

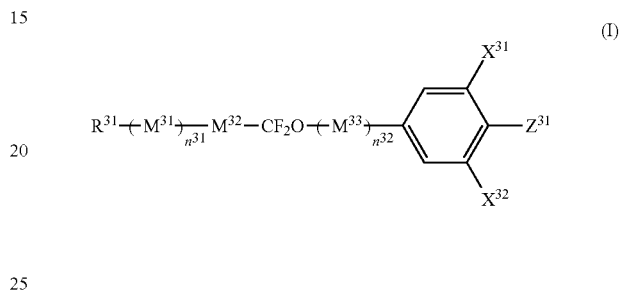

(where $R^{31}$ designates an alkyl or alkoxy group having one to ten carbon atoms or an alkenyl or alkenyloxy group having two to ten carbon atoms, $M^{31}$ to $M^{33}$ independently of one another designate trans-1,4-cyclohexylene or 1,4-phenylene, wherein one or two —$CH_2$-s in the trans-1,4-cyclohexylene are optionally substituted with an —O— unless an oxygen atom is directly next to another and wherein one or two hydrogen atoms in the phenylene are optionally substituted with fluorine, $X^{31}$ and $X^{32}$ independently of each other designate hydrogen or fluorine, $Z^{31}$ designates fluorine, trifluoromethoxy, or trifluoromethyl, $n^{31}$ and $n^{32}$ independently of each other designate 0, 1, or 2, $n^{31}+n^{32}$ designates 0, 1, or 2, and if there are a plurality of $M^{31}$s or $M^{33}$s, the $M^{31}$s or $M^{33}$s may be the same or different) and one or two or more compounds selected from the group consisting of compounds represented by general formulae (II-a) to (II-f):

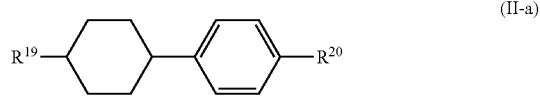

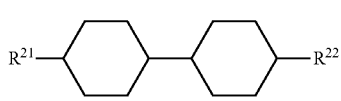
(II-b)

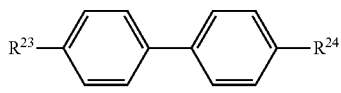
(II-c)

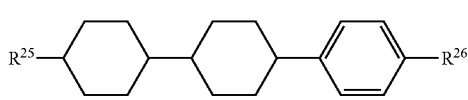
(II-d)

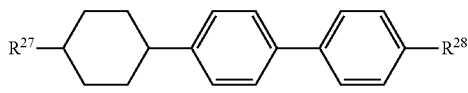
(II-e)

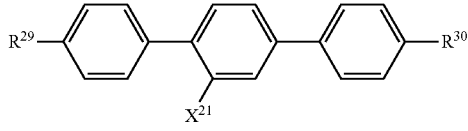
(II-f)

(where $R^{19}$ to $R^{30}$ independently of one another designate an alkyl group having one to ten carbon atoms, an alkoxy group having one to ten carbon atoms, or an alkenyl group having two to ten carbon atoms, and $X^{21}$ designates hydrogen or fluorine), the curable resin composition containing at least one compound that has at least one epoxy group per molecule and a weight average molecular weight of 300 to 10000.

2. The liquid crystal display according to claim 1, wherein the curable resin composition contains a heat-activated hardener.

3. The liquid crystal display according to claim 1, wherein the curable resin composition contains a silane coupling agent.

4. The liquid crystal display according to claim 1, wherein the curable resin composition contains filler.

5. The liquid crystal display according to claim 1, wherein the curable resin composition contains fine particles of resin.

6. The liquid crystal display according to claim 1, wherein the curable resin composition has a hydrogen-bonding functional group value of $1\times10^{-4}$ to $5\times10^{-2}$ mol/g.

7. The liquid crystal display according to claim 1, wherein the at least one compound that has at least one epoxy group per molecule and a weight average molecular weight of 300 to 10000 has at least one ethylenic unsaturated bond per molecule.

8. The liquid crystal display according to claim 7, wherein the at least one compound that has at least one epoxy group per molecule and a weight average molecular weight of 300 to 10000 has at least one (meth)acrylic group per molecule.

9. The liquid crystal display according to claim 8, wherein the at least one compound that has at least one (meth)acrylic group and at least one epoxy group per molecule is a (meth)acrylic acid-modified epoxy resin and/or a urethane-modified (meth)acrylic epoxy resin.

10. The liquid crystal display according to claim 1, wherein the curable resin composition contains a compound that has an ethylenic unsaturated bond.

11. The liquid crystal display according to claim 10, wherein the curable resin composition contains a (meth)acryloyloxy-bearing compound.

12. The liquid crystal display according to claim 7, wherein the curable resin composition has a carbon-carbon double bond content of $1\times10^{-3}$ mol/g to $6\times10^{-3}$ mol/g or less.

13. The liquid crystal display according to claim 8, wherein the curable resin composition has a (meth)acrylic-to-epoxy equivalent weight ratio of 15:85 to 95:5.

14. The liquid crystal display according to claim 1, wherein the compounds represented by general formula (I) are compounds represented by general formulae (I-a) to (I-f):

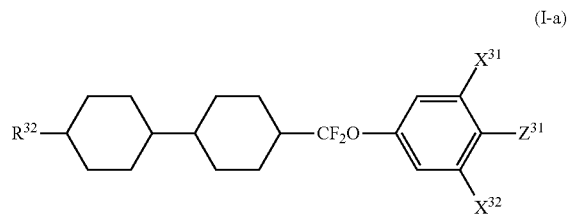
(I-a)

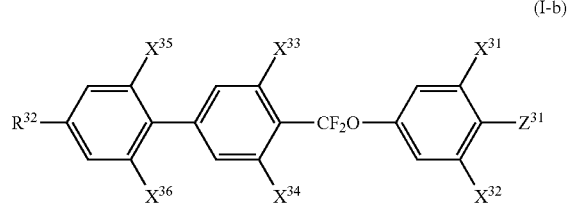
(I-b)

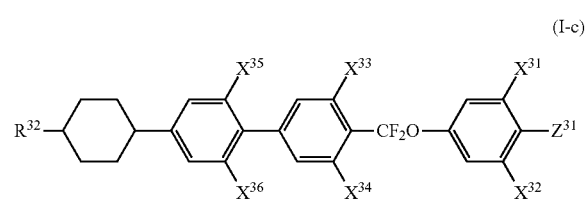
(I-c)

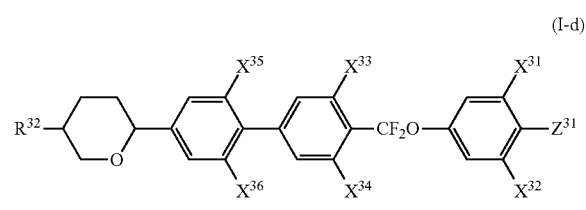
(I-d)

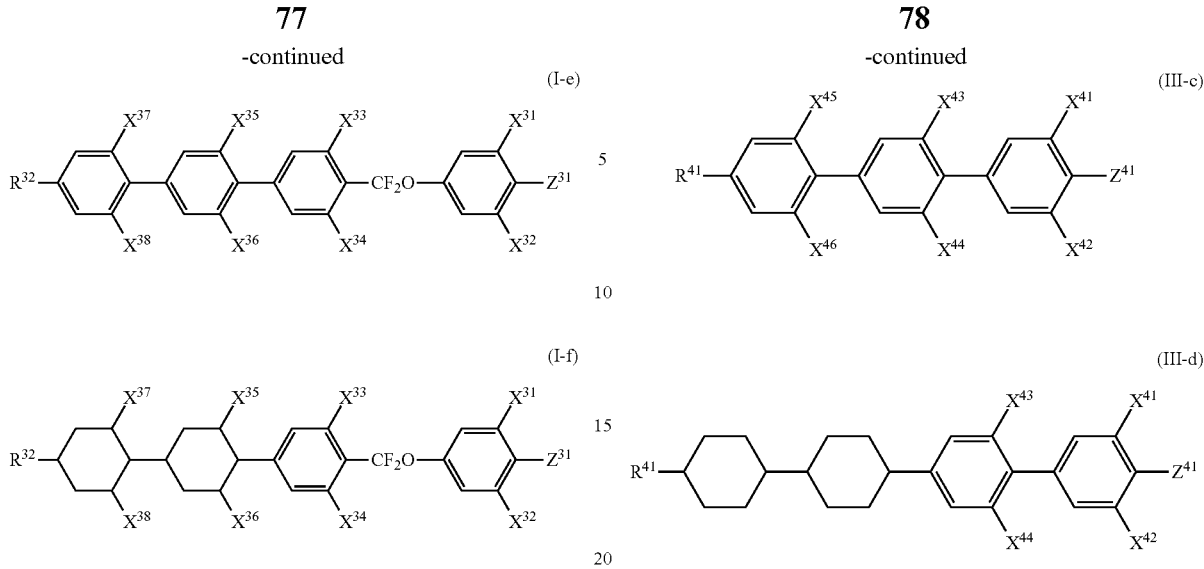

(where R³² designates an alkyl group having one to ten carbon atoms, an alkoxy group having one to ten carbon atoms, an alkenyl group having two to ten carbon atoms, or an alkenyloxy group having two to ten carbon atoms, X³¹ to X³⁸ independently of one another designated hydrogen or fluorine, and Z³¹ designates fluorine, trifluoromethoxy, or trifluoromethyl).

15. The liquid crystal display according to claim 1, wherein the liquid crystal composition layer contains one or two or more compounds selected from the group of compounds represented by general formulae (III-a) to (III-f):

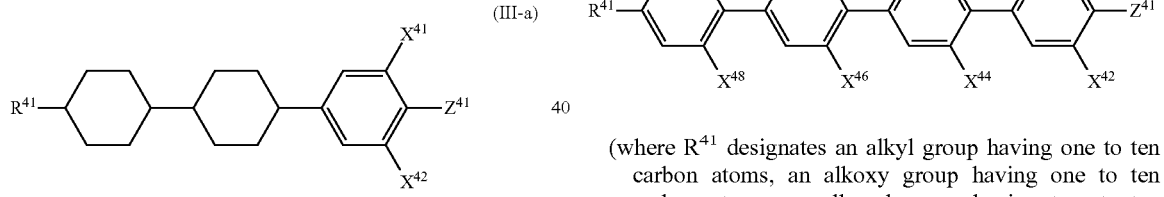

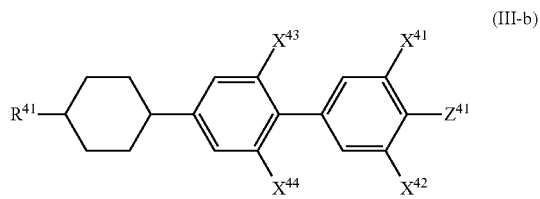

(where R⁴¹ designates an alkyl group having one to ten carbon atoms, an alkoxy group having one to ten carbon atoms, an alkenyl group having two to ten carbon atoms, or an alkenyloxy group having two to ten carbon atoms, X⁴¹ to X⁴⁸ independently of one another designate hydrogen or fluorine, and Z⁴¹ designates fluorine, trifluoromethoxy, or trifluoromethyl).

16. The liquid crystal display according to claim 1, made of a polymer resulting from polymerization of a liquid crystal composition that contains one or two or more polymerizable compounds in the liquid crystal composition layer.

17. The liquid crystal display according to claim 1, wherein the liquid crystal composition layer contains a bifunctional monomer represented by general formula (V):

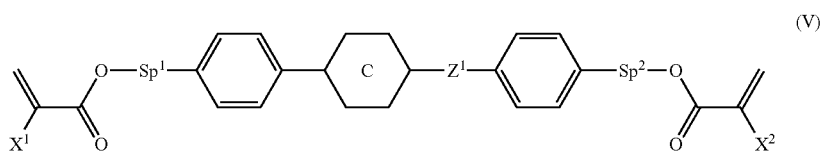

(where $X^1$ and $X^2$ each independently designate hydrogen or methyl, $Sp^1$ and $Sp^2$ each independently designate a single bond, an alkylene group having one to eight carbon atoms, or —O—$(CH_2)_s$— (where s designates an integer of 2 to 7, and the oxygen binds to the aromatic ring), $Z^1$ designates —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$— (where $Y^1$ and $Y^2$ each independently designates fluorine or hydrogen), —C≡C—, or a single bond, C designates 1,4-phenylene, trans-1,4-cyclohexylene, or a single bond, and for all 1,4-phenylene groups in the formula, any hydrogen atom may be substituted with fluorine).

\* \* \* \* \*